United States Patent [19]

Nishizawa et al.

[11] Patent Number: 5,063,445

[45] Date of Patent: Nov. 5, 1991

[54] MULTIPLE SUB-SAMPLING TRANSMITTING/RECEIVING SYSTEM PERFORMING INTERFIELD AND INTERFRAME OFFSET SUB-SAMPLING OF A BROAD BANDWIDTH TELEVISION SIGNAL

[75] Inventors: Taiji Nishizawa; Yutaka Tanaka; Seiichi Gohshi; Junji Kumada; Yuichi Iwadate; Kazuhiko Shibuya; Toshihiko Susaki; Yukihiro Nishida; Minoru Honda; Taiichiro Kurita; Yoshinori Izumi; Makoto Okui; Isao Kondo; Ryoichi Yajima; Jun'ichi Ishida, all of Tokyo, Japan

[73] Assignee: Nippon Hoso Kyokai, Tokyo, Japan

[21] Appl. No.: 511,374

[22] Filed: Apr. 19, 1990

[51] Int. Cl.[5] .............................................. H04N 7/12
[52] U.S. Cl. ..................................... 358/138; 358/12; 358/141

[58] Field of Search ............... 358/140, 133, 138, 141, 358/11, 12

[56] References Cited

U.S. PATENT DOCUMENTS

| | | | |
|---|---|---|---|
| 4,692,801 | 9/1987 | Ninomiya et al. | 358/135 X |
| 4,745,459 | 5/1988 | Ninomiya et al. | 358/138 X |
| 4,882,614 | 11/1989 | Kageyama et al. | 358/141 X |
| 4,949,168 | 8/1990 | Ninomiya et al. | 358/141 X |
| 4,979,037 | 12/1990 | Mizutani et al. | 358/136 X |

Primary Examiner—Victor R. Kostak
Attorney, Agent, or Firm—Rothwell, Figg, Ernst & Kurz

[57] ABSTRACT

A multiple sub-sampling encoding/decoding system performing interfield and interframe offset sub-sampling of a broad bandwidth television signal. The system compresses the television signal to fit, for example, to the transmission bandwidth of the standard television systems, compensates the transmission characteristics, and achieves the optimal frequency allocation of the modulated transmission signal.

55 Claims, 39 Drawing Sheets

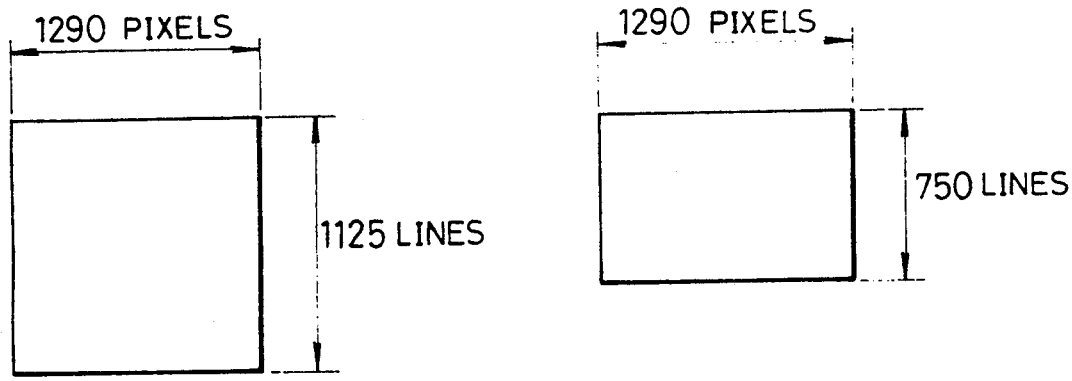
FIG.6A
FIG.6B
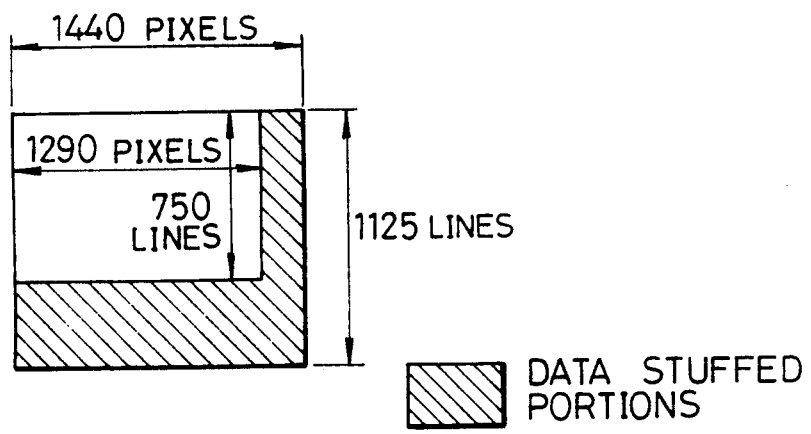
FIG.6C

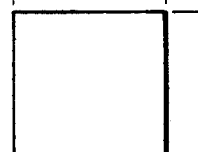
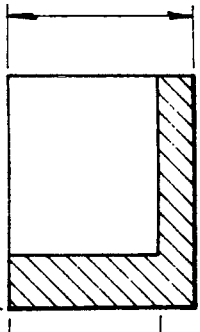
FIG.9A
FIG.9B
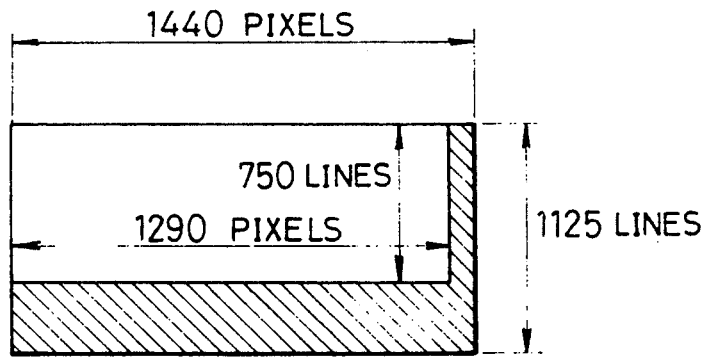
FIG.9C
FIG.9D (E)

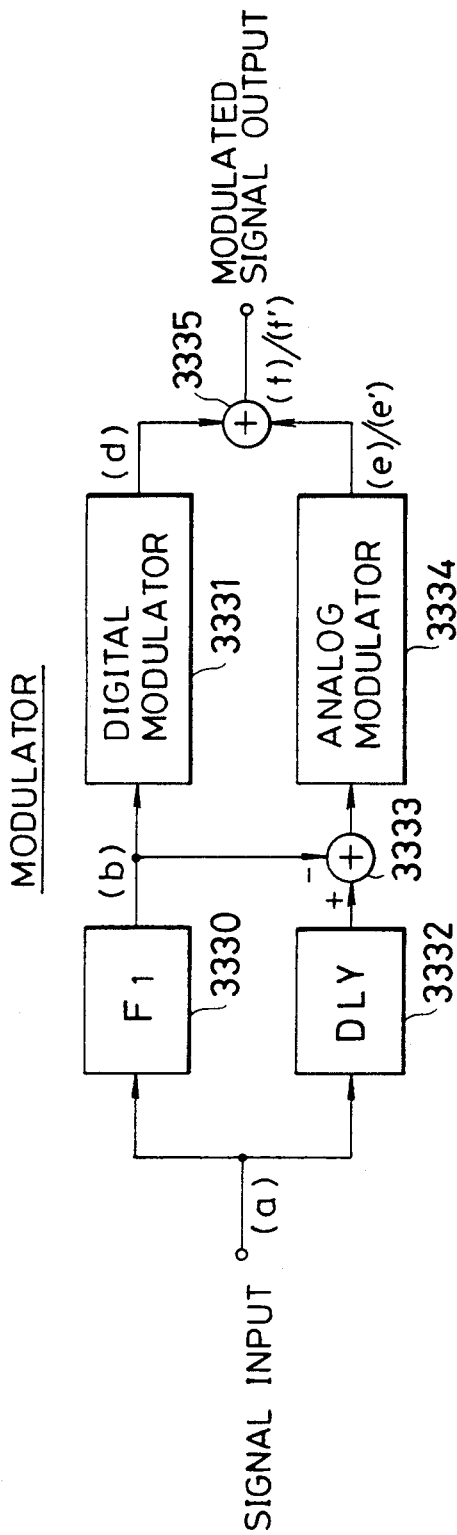
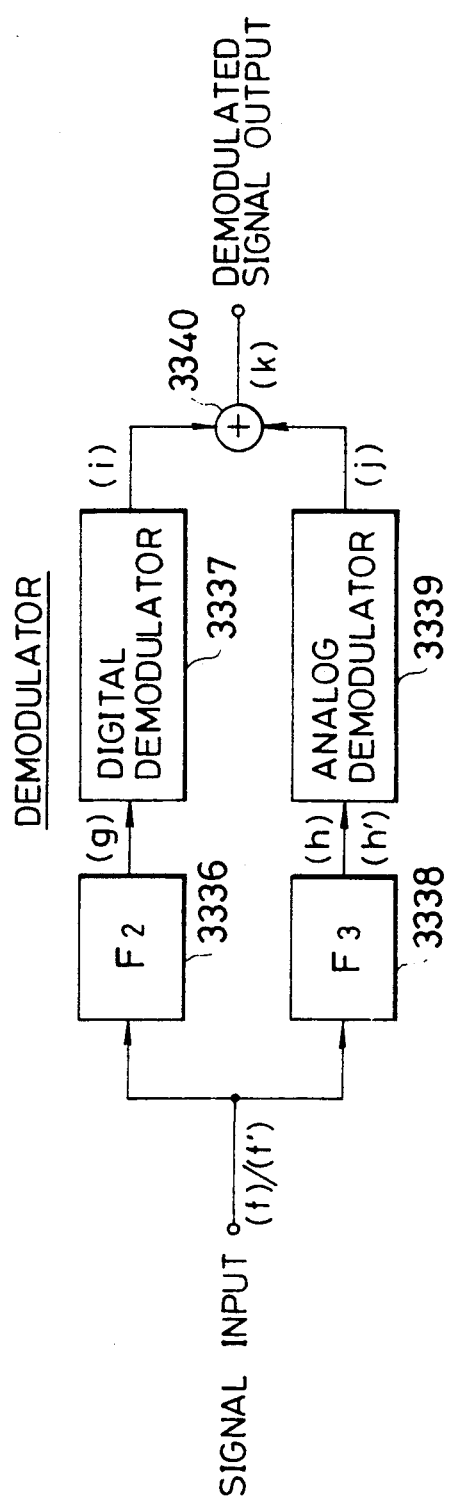
FIG. 33A
FIG. 33B

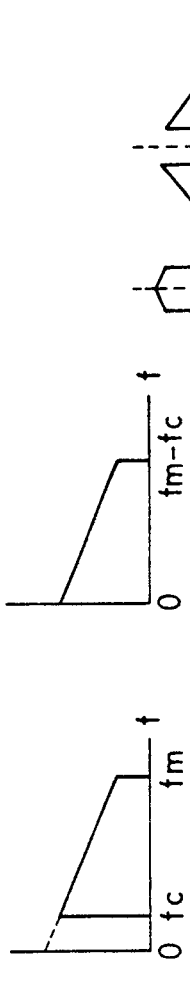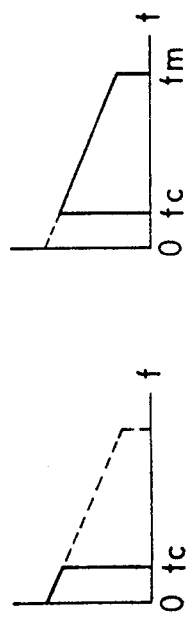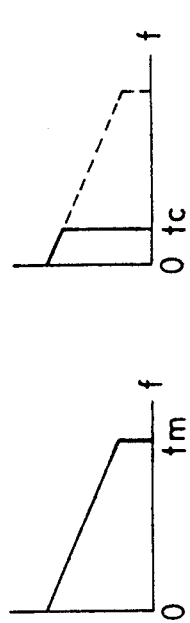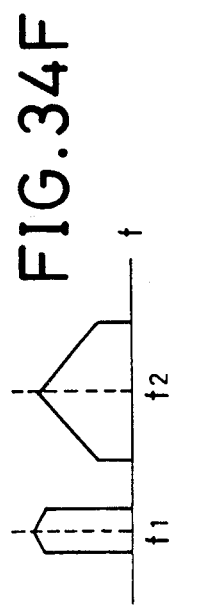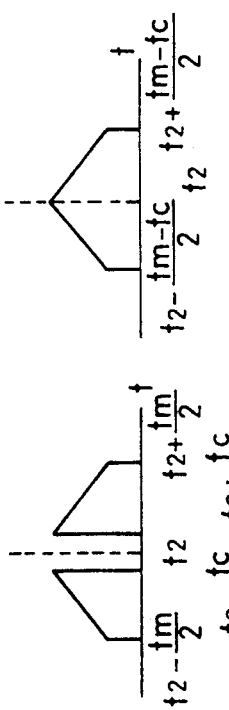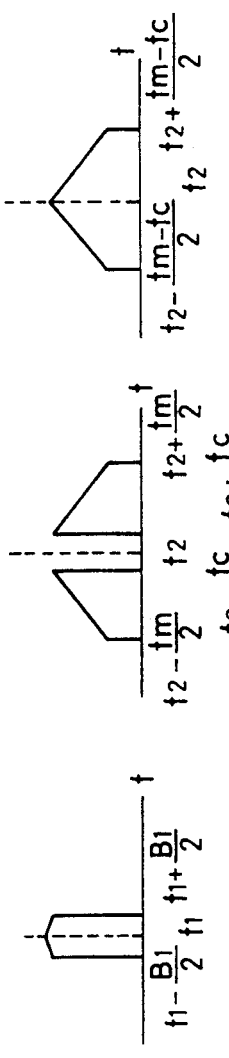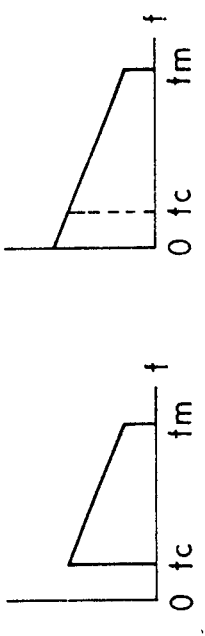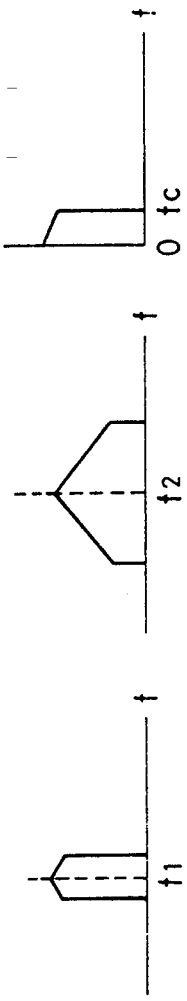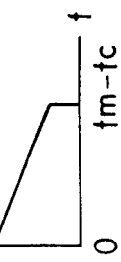

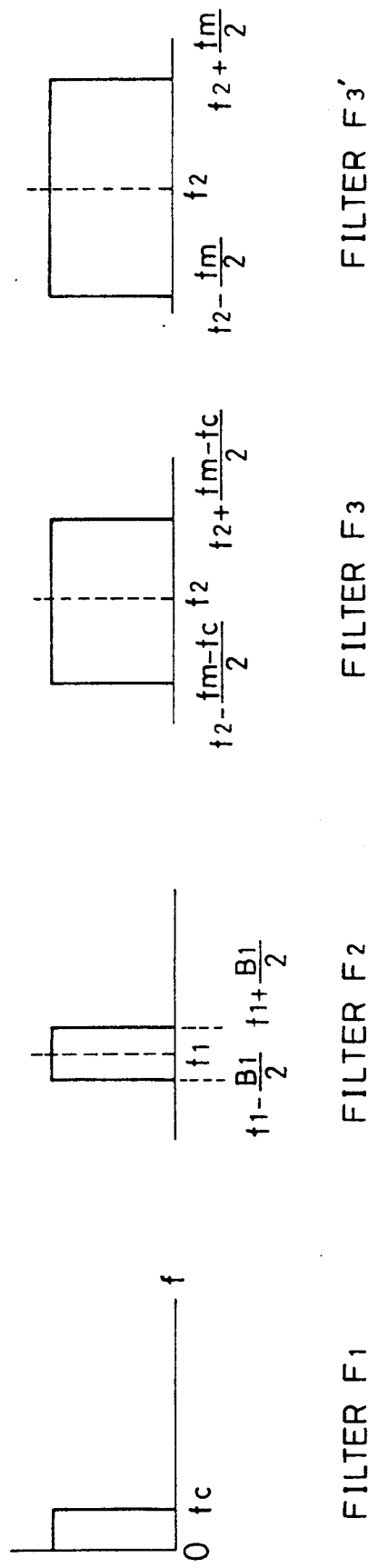

MULTIPLE SUB-SAMPLING TRANSMITTING/RECEIVING SYSTEM PERFORMING INTERFIELD AND INTERFRAME OFFSET SUB-SAMPLING OF A BROAD BANDWIDTH TELEVISION SIGNAL

FIELD OF THE INVENTION

The present invention generally relates to video signal encoding/decoding systems and more particularly relates to an encoding/decoding system which converts a high definition video signal having high frequency components and a large number of scanning lines per frame into a video signal which can be transmitted on a narrow band channel, for instance, a standard television system such as an NTSC (National Television System Committee) system.

More specifically, the present invention relates to a multiple sub-sampling encoding/decoding system that performs interfield and interframe offset sub-sampling of a broad bandwidth television signal. In particular, it relates to a method and system for transmitting and receiving the television signal, which compresses the television signal so as to fit, for example, to the transmission bandwidth of the standard television systems, compensates the transmission characteristics, and makes the optimal frequency allocation of the modulated transmission signals.

BACKGROUND OF THE INVENTION

As a system for compressing the bandwidth of a television signal, a multiple sub-sampling encoding/decoding system is known. MUSE (Multiple Sub-Nyquist-Sampling Encoding) is one of such multiple sub-sampling sampling encoding/decoding systems which can effectively compress and transmit the broad bandwidth television signal.

The outline of the bandwidth compression technique by MUSE is as follows: first, the broad bandwidth television signal is A/D (analog-to-digital) converted at a sampling frequency of 48.6 MHz; second, the resultant digital signal undergoes the interfield offset sub-sampling; third, the interfield offset sub-sampled signal undergoes the interframe offset sub-sampling to form a transmission signal after the interfield offset sub-sampled signal is filtered by a low-pass filter, the cutoff frequency of which is lower than the sampling frequency of the interframe offset sub-sampling. In this processing, it is preferable that the interfield offset sub-sampling frequency is set at 24.3 MHz, the interframe offset sub-sampling frequency is set at 16.2 MHz, and the cutoff frequency is set at 12.15 MHz, the ratio of the interfield to interframe offset sub-sampling frequency being 3:2. A MUSE encoder and a MUSE decoder, which are used in the present invention and will be described later, are preferable examples that satisfy the above requirements.

Details of the MUSE system are described in U.S. Pat. No. 4,745,459, and U.S. Pat. No. 4,692,801, and in "Concept of the MUSE System And Its Protocol" in NHK Laboratories Note Ser. No. 348 published by the assignee of the present invention, which are incorporated herein by reference.

This system, i.e., the 1125/60 high definition television system proposed by NHK (Nippon Hoso Kyokai or Japan Broadcasting Corporation), is characterized by having 1125 scanning lines, an aspect ratio of 16:9, and 2:1 interlace scanning, with a field frequency of 60 Hz. The luminance signal bandwidth is about 20 MHz, while the chrominance signal bandwidth is approximately 7.0 MHz.

A system for the transmission of such a high definition color television signal is disclosed in U.S. Pat. No. 4,745,459 issued May 17, 1988, incorporated herein by reference. This system provides bandwidth reduction of the high definition video signal from approximately 26 MHz to 8.1 MHz. However, such a system cannot be used for terrestrial broadcast over single conventional transmission channels which are limited to 6 MHz in bandwidth. Even further, the high definition television signal of the type referred to is a time compressed and time division multiplexed signal in which luminance and chrominance signals are multiplexed in time to eliminate interference between the chrominance and luminance signals. Therefore, even if such a signal required a bandwidth less than 6 MHz, it could not be decoded and displayed on a conventional receiver such as an NTSC receiver, since the NTSC television signal is a composite signal in which a luminance signal is frequency multiplexed with a color subcarrier which is itself modulated by a chrominance signal and the two signal formats are thus not compatible with each other.

In referring to high definition television systems proposed for use in the United States and where compatibility with the existing NTSC system is the object, it has become a practice to designate such systems as "channel compatible" and/or "receiver compatible". A channel compatible system is said to be one in which the high definition signal can be encoded and broadcast transmitted with the presently assigned 6 MHz bandwidth frequency channels of the NTSC system. A receiver compatible system is one in which the signal can be decoded by and displayed by a conventional NTSC television receiver.

The baseband width of the MUSE system is set at 8 MHz because the MUSE system was originally developed for the broad bandwidth television broadcasting called "Hi-vision" which utilizes a satellite broadcast. The video signal is subjected to the bandwidth compression so as to be transmitted within a band of 8 MHz, and the audio signal is multiplexed into the vertical retrace interval using the Near-instantaneous compressing type DPCM (Differential Pulse-Code Modulation). Consequently, the broad bandwidth television signal must be further compressed to be transmitted by an earth station, for example, by the NTSC system using 6 MHz transmission bandwidth. Furthermore, a method for compensating the transmission characteristics must be considered.

As a bandwidth compression method, i.e., a way to reduce the amount of information to be transmitted, the following are possible: the reduction in the number of transmitted pixels in the horizontal direction; and/or the reduction in the number of scanning lines in the vertical direction. Considering the advantage of using, as a basic bandwidth compression method, an algorithm similar to the MUSE system that has already been developed as a bandwidth compression algorithm, reduction in the sampling frequency of the video signal from 48.6 MHz of the MUSE system to 43.74 MHz, together with reduction in the number of scanning lines in the vertical direction from 1125 to 750, for example, makes it possible for the transmission bandwidth to be reduced to less than 6 MHz which is compatible with the NTSC system. The sampling frequency of 3.74 MHz and the number of scanning lines of 750 are not the essential restrictions. However, they are considered to be reasonable values because the ratio 1125:750 reduces to a simple integer ratio 3:2, which approximately corresponds to the Kell factor.

Once the sampling frequency and the number of scanning lines have been specified, a novel encoder and decoder relating to this method can be designed by using the MUSE technique already developed. However, the sampling frequency and the number of scanning lines are different from those of the MUSE system, and hence, the interfield offset sampling frequency, interframe offset sampling frequency, and the characteristics of prefilters handling those sampling frequencies are different from those of the MUSE encoder and decoder. Consequently, entirely new design and fabrication of a system including a scanning line number converter and a scanning line number reverse converter are required, which necessitates great amount of cost and labor because of its complicated arrangement as clearly seen from the block diagrams of MUSE encoders and MUSE decoders described in the documents mentioned above. In particular, considering the fact that practical apparatus are constructed by using integrated circuits, designing and fabrication require a great amount of cost and labor.

SUMMARY OF THE INVENTION

It is therefore a first object of the present invention to provide a narrow band multiple sub-sampling transmission method for compressing the bandwidth of the broad bandwidth television signal, which can solve the above problems and compress the transmission bandwidth to the bandwidth compatible with that of the NTSC standard system, and further to provide an encoder and decoder which can be used for carrying out the method and can be easily implemented. Incidentally, the "encoder", in contrast with a "MUSE encoder", includes the MUSE encoder in conjunction with a line converter and interface circuits as shown in FIG. 3A, and the "decoder" also includes a line converter, a "MUSE decoder", and interface circuits as shown in FIG. 3B.

A second object of the present invention is to provide a transmission characteristic compensation circuit that enables a high quality signal transmission and reception in the signal format of the narrow band multiple sub-sampling transmission and eliminates waveform distortions and noise interferences. The compensation circuit, in particular, makes it possible to perform characteristic compensation for a plurality of frequency bands.

A third object of the present invention is to provide a method to achieve a good frequency allocation of modulated transmission signals when the narrow band multiple sub-sampling transmission is carried out by utilizing an idle channel not used by the conventional television broadcasting stations of that geographical area so as to reduce the interference to a conventional television broadcasting station in another area using the same channel.

To accomplish the first object of the present invention, a narrow band multiple sub-sampling transmission system of the present invention, which transmits a television signal which is bandwidth compressed by interfield and interframe offset sampling, is provided at the transmission side with an encoder having a line number converter for reducing the number of scanning lines, a horizontal-and-vertical data stuff unit, a MUSE encoder for a multiple sub-sampling transmission system having a broader bandwidth than this system of the present invention, and a transmission rate converter for reducing the transmission rate, and the television signal is transmitted by narrowing the broader bandwidth to a predetermined bandwidth by the encoder thus constructed by arranging the parameters of the elements other than the MUSE encoder. The present invention is also provided at the receiving end with a decoder having a reverse transmission rate converter for recovering the transmission rate, a horizontal-and-vertical data stuff unit, a MUSE encoder pairing with the MUSE decoder, and a reverse line converter for recovering the number of the scanning lines, and the television signal which is transmitted by this system is received and decoded by the decoder thus constructed by arranging the parameters of the elements other than the MUSE decoder.

According to one aspect of the present invention, there is provided an encoder at the transmitting end, which is used by the narrow band multiple sub-sampling transmission system of the present invention, the encoder comprising:

multiple sub-sampling encoding means for converting, with bandwidth compression, a fourth television signal into a fifth television signal by using the multiple sub-sampling time division multiplexing technique, the fourth television signal having a greater number of horizontal scanning lines and broader frequency bandwidth than those of a second television signal, the fifth television signal having broader bandwidth than that of a first television signal and narrower bandwidth than that of the fourth television signal;

first converting means for converting the second television signal inputted to the first converting means into a sixth television signal having a signal format conforming to that of the fourth television signal, and for supplying the converted signal to the multiple sub-sampling encoding means; and second converting means for converting the fifth television signal outputted from the multiple sub-sampling encoding means into a third television signal.

According to another aspect of the present invention, there is provided a decoder at the receiving end, which is used by the narrow band multiple sub-sampling transmission system of the present invention, the decoder comprising:

multiple sub-sampling decoding means for decoding the sixth television signal from the fifth television signal which is bandwidth compressed by using the multiple sub-sampling time division multiplexing technique;

third converting means for converting the third television signal inputted thereto into the fifth television signal, and for supplying the converted signal to the multiple sub-sampling decoding means; and fourth converting means for converting the sixth television signal outputted from the multiple sub-sampling decoding means into the second television signal.

The above and other objects, effects, features and advantages of the present invention will become more apparent from the following description of embodiments thereof taken in conjunction with the accompanying drawings.

BRIEF DESCRIPTION OF THE DRAWINGS

FIGS. 6A-6C are views illustrating one frame structure at various stages of the encoder;

FIGS. 9A-9D are views illustrating one frame structure at various stages of the decoder;

FIGS. 22A-22H are waveform charts illustrating the waveforms at various portions of the filters shown in FIG. 20A and 20B;

FIGS. 33A and 33B are block diagrams showing arrangements of a modulator and a demodulator, respectively, of the fifth embodiment of the present invention;

FIGS. 34A-34K illustrate one-dimensional spectra of various portions A-K shown in FIGS. 33A and 33B;

FIGS. 35A-35D illustrate the characteristics of filters F1, F2, F3 and F3' shown in FIGS. 33A and 33B;

DESCRIPTION OF THE PREFERRED EMBODIMENTS

The invention will now be described with reference to the accompanying drawings.

1. DESCRIPTION OF THE GENERAL ARRANGEMENT OF THE PRESENT INVENTION

Figure 1A:
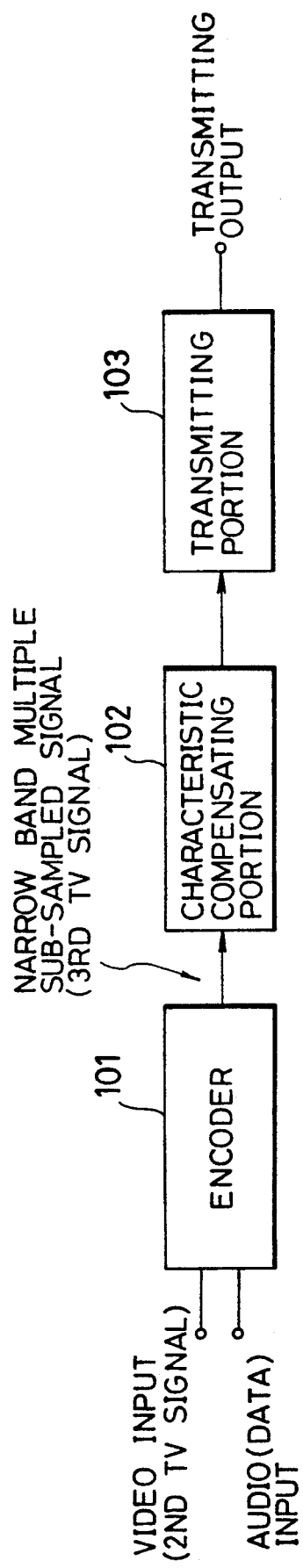
FIGS. 1A and 1B are block diagrams showing the entire arrangements of the transmitting and receiving ends of a transmission system according to the present invention, respectively.
Figure 1B:
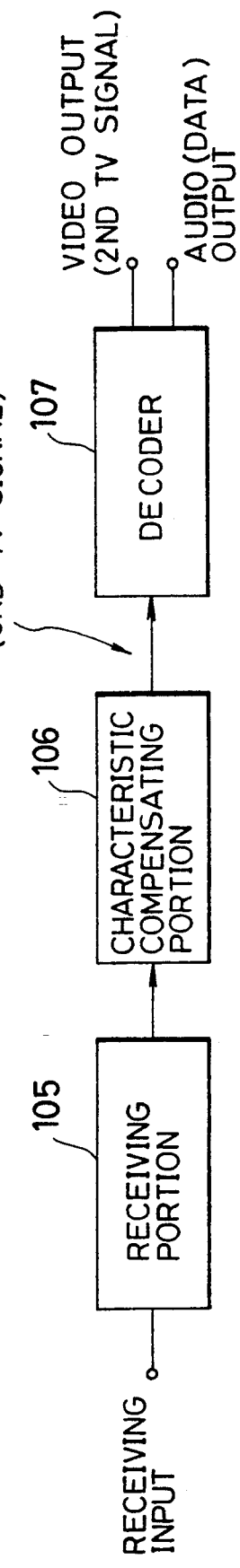

FIGS. 1A and 1B are block diagrams showing an embodiment of the entire arrangement of the transmitting and receiving ends of a transmission system for achieving the objects of the present invention.

Here, a television signal having the same bandwidth as the conventional NTSC television signal is referred to the first television signal. A baseband high resolution, high frequency content video signal, such as an 1125/60 color video signal is referred to as the fourth television signal.

In FIG. 1A, the video signal (second television signal) and audio signal of a broad band television system are applied to an encoder 101 which encodes these signals into a narrow band multiple sub-sampled signal compressed to a bandwidth of less than 6 MHz. The narrow band multiple sub-sampled signal (third television signal) is supplied to a characteristic compensating portion 102 that compensates the characteristics in a plurality of frequency bands associated with waveform distortions and interference noises on the transmission line. The compensated signal is fed to a transmitter 103 that modulates the signal by allocating the frequencies of the modulated signal in such a manner that the interference between the modulated signal and other transmission signals in the same channel is reduced to a minimum. The transmission signal thus produced is transmitted from the transmitter 103.

FIG. 1B shows an arrangement of the receiving end. The signal transmitted by the transmitter 103 in FIG. 1A is received by a receiver 105. The receiver 105 demodulates the signal and produces the video signal by reversing the frequency allocation provided by the transmitter 103 and by eliminating interference signals. The demodulated signal is applied to a characteristic compensating portion 106 which performs the reverse compensation executed by the characteristic compensating portion 102. Thus, waveform distortions and interference noises added on the transmission line are reduced, and the high quality narrow band multiple sub-sampled signal is produced. The narrow band multiple sub-sampled signal is applied to a decoder 107 which decodes the signal into the video signal and audio signal of the broad band television system.

2. ENCODER AND DECODER OF THE NARROW BAND MULTIPLE SUB-SAMPLING SYSTEM

The details of the MUSE system are described in the above patent publications and documents. Here, the general description about an encoder of the MUSE system will be presented as far as the encoder relates to the present invention.

Figure 2:
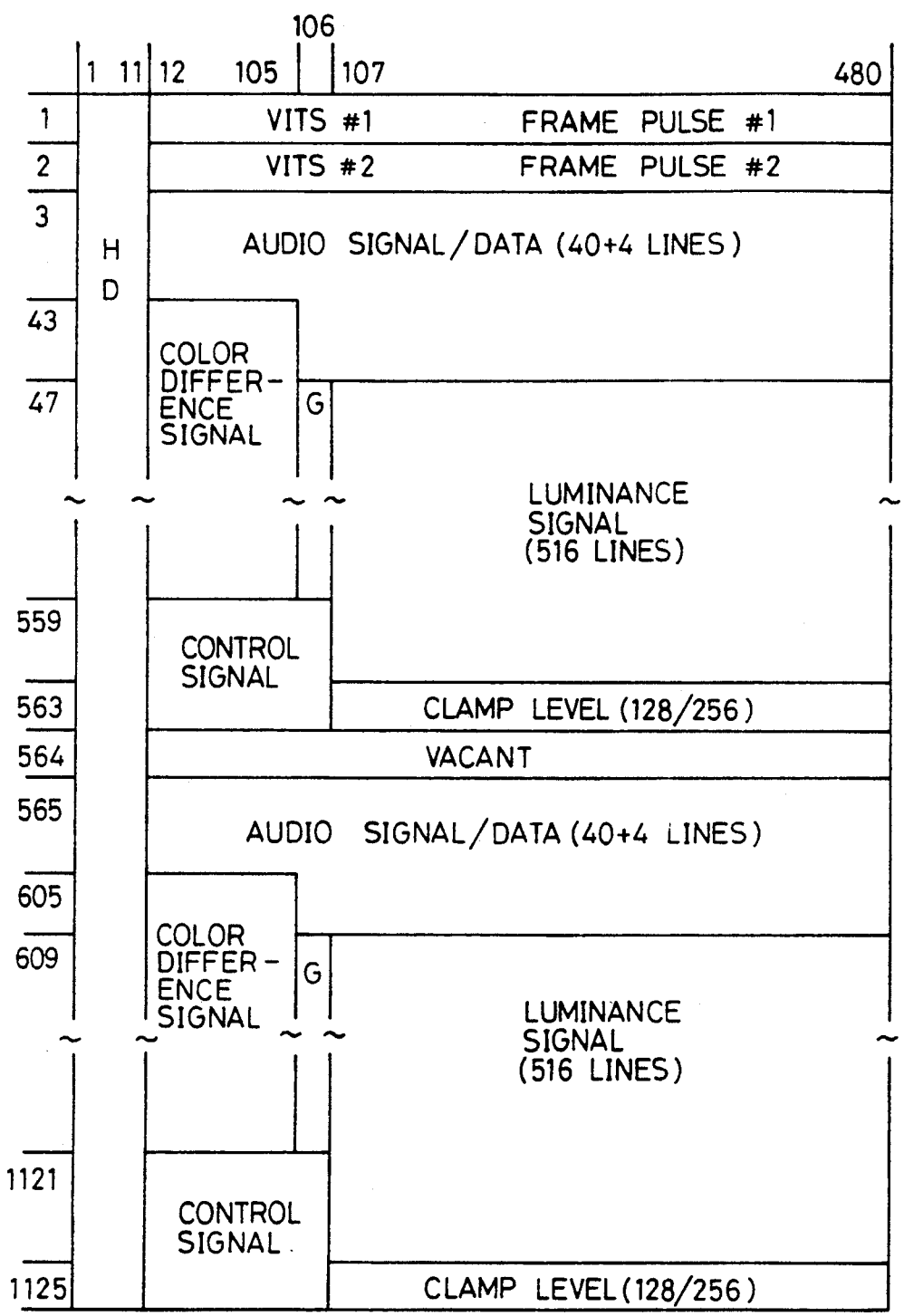
FIG. 2 is a diagram illustrating a MUSE signal format.

The Hi-vision signal, which includes 1125 scanning lines per one frame and 60 fields per one second, (at 2 fields per frame) arranges a frame of 1125 lines as shown in FIG. 2. Each of the 516 effective scanning lines of a field of the video signal of the Hi-vision system includes a color difference signal and a luminance signal multiplexed and time compressed by a time division multiplexing technique called TCI (Time Compression Integration). The multiplexed and time compressed video signal is further subjected to bandwidth compression by the multiple sub-sampling technique, and arranged as shown in FIG. 2.

Numbers at the top of FIG. 2 show the sampling number, the sum total of which per second is 16,200,000 (=480×1125×30) that corresponds to the bandwidth of 8.1 MHz of the MUSE signal Incidentally, the sampling number of the input signal is three times the total sampling number, 48,600,000, and so the sampling frequency is 48.6 MHz.

To compress the bandwidth of such a signal to less than 6 MHz while maintaining the above format, it is necessary to reduce the sampling number and the number of effective scanning lines. However, to adopt the encoder of MUSE system which has already been developed, the input signal to the encoder must be conformed to the Hi-vision signal format. Thus, a signal converter for this purpose is required.

Figure 3A:
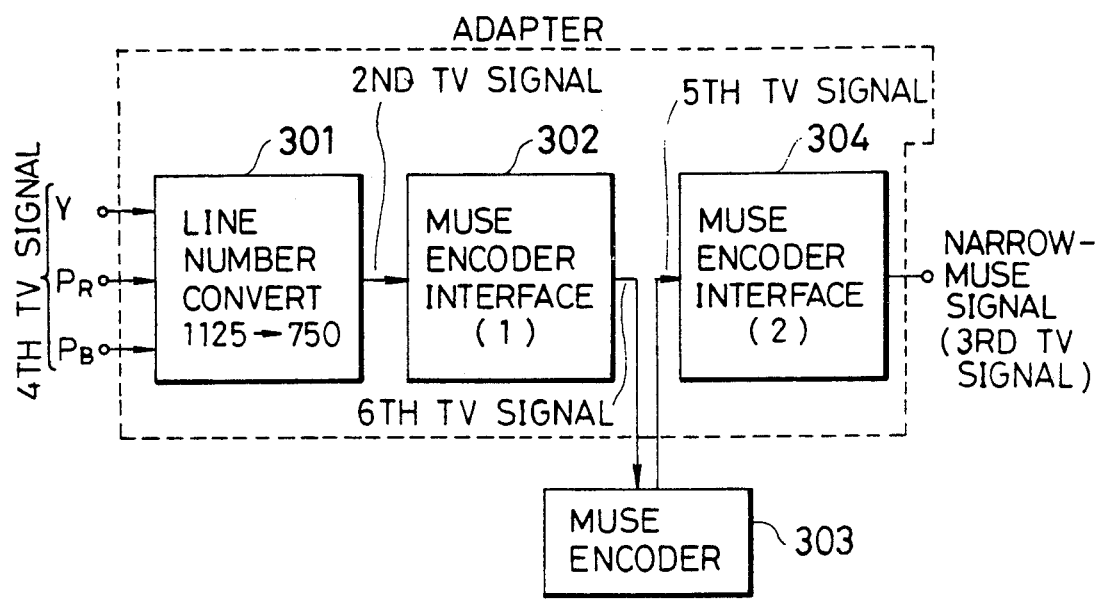
FIGS. 3A and 3B are block diagrams showing embodiments of the encoder 101 in FIG. 1A and decoder 107 in FIG. 1B, respectively.
Figure 3B:
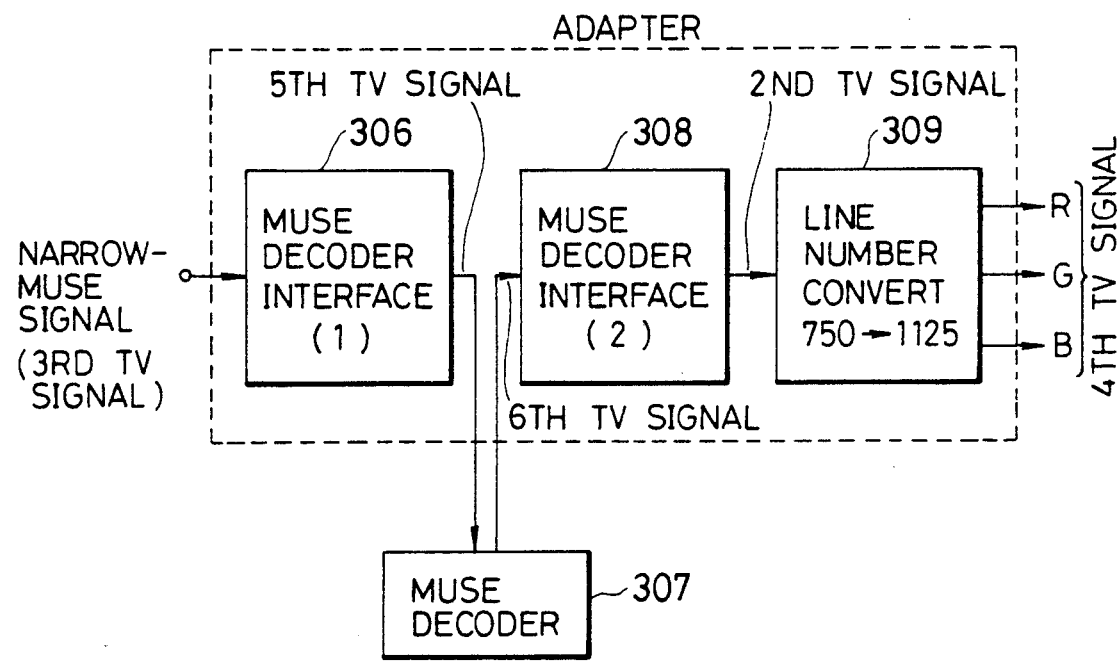

FIGS. 3A and 3B show embodiments of the encoder 101 in FIG. 1A and decoder 107 in FIG. 1B, respectively. These embodiments are provided with respective adapters that enable the adoption of a MUSE encoder 303 and a MUSE decoder 307 that have already been developed: the adapter in FIG. 3A is provided with a line converter 301, a first interface 302, and a second interface 304, and is connected to the encoder 303 as shown in this figure; the adapter in FIG. 3B is provided with a first interface 306, a second interface 308, and a line converter 309, and is connected to the decoder 307 as shown in this figure.

Figure 4:
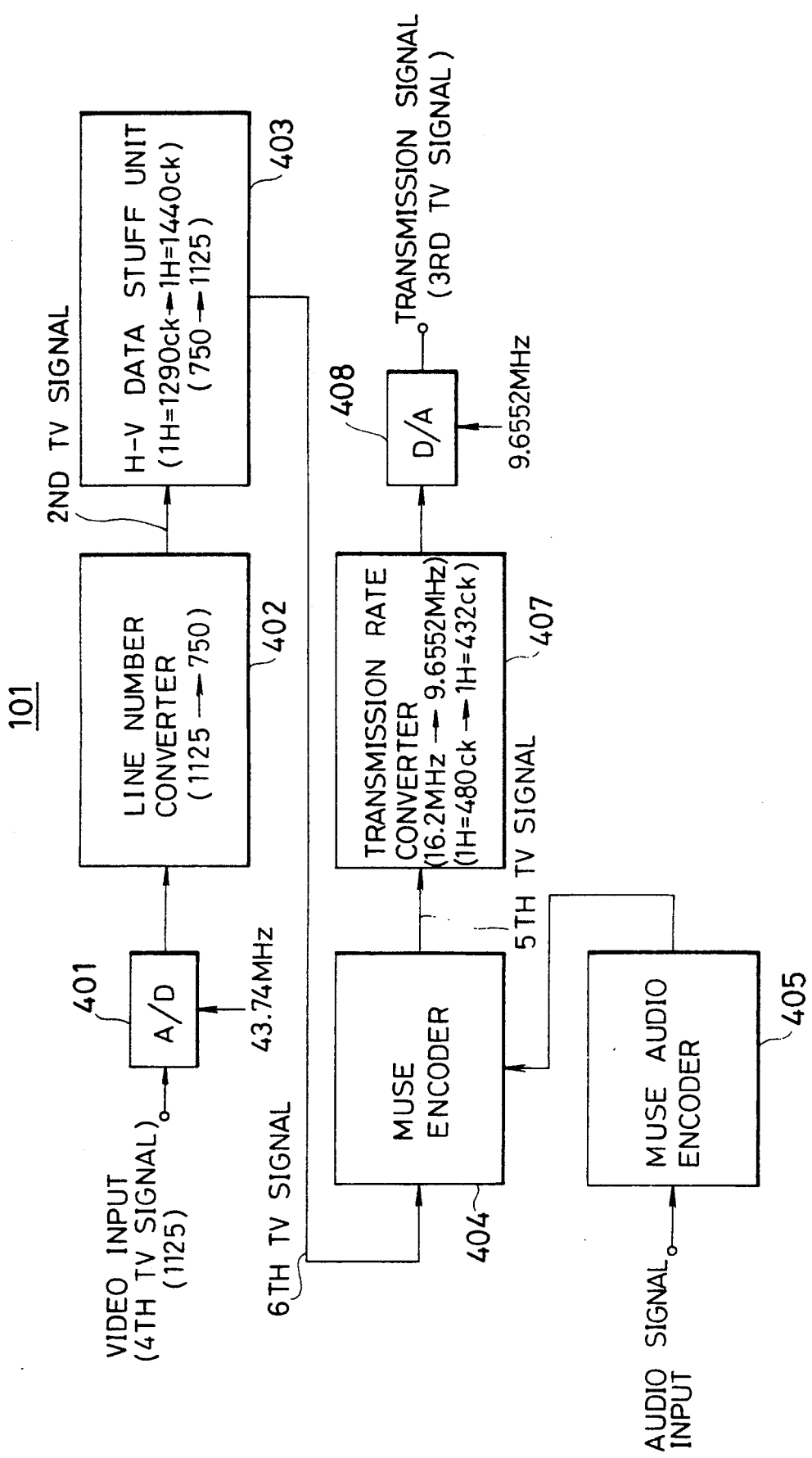
FIG. 4 is a block diagram showing a more specific arrangement of the encoder 101.
Figure 5:
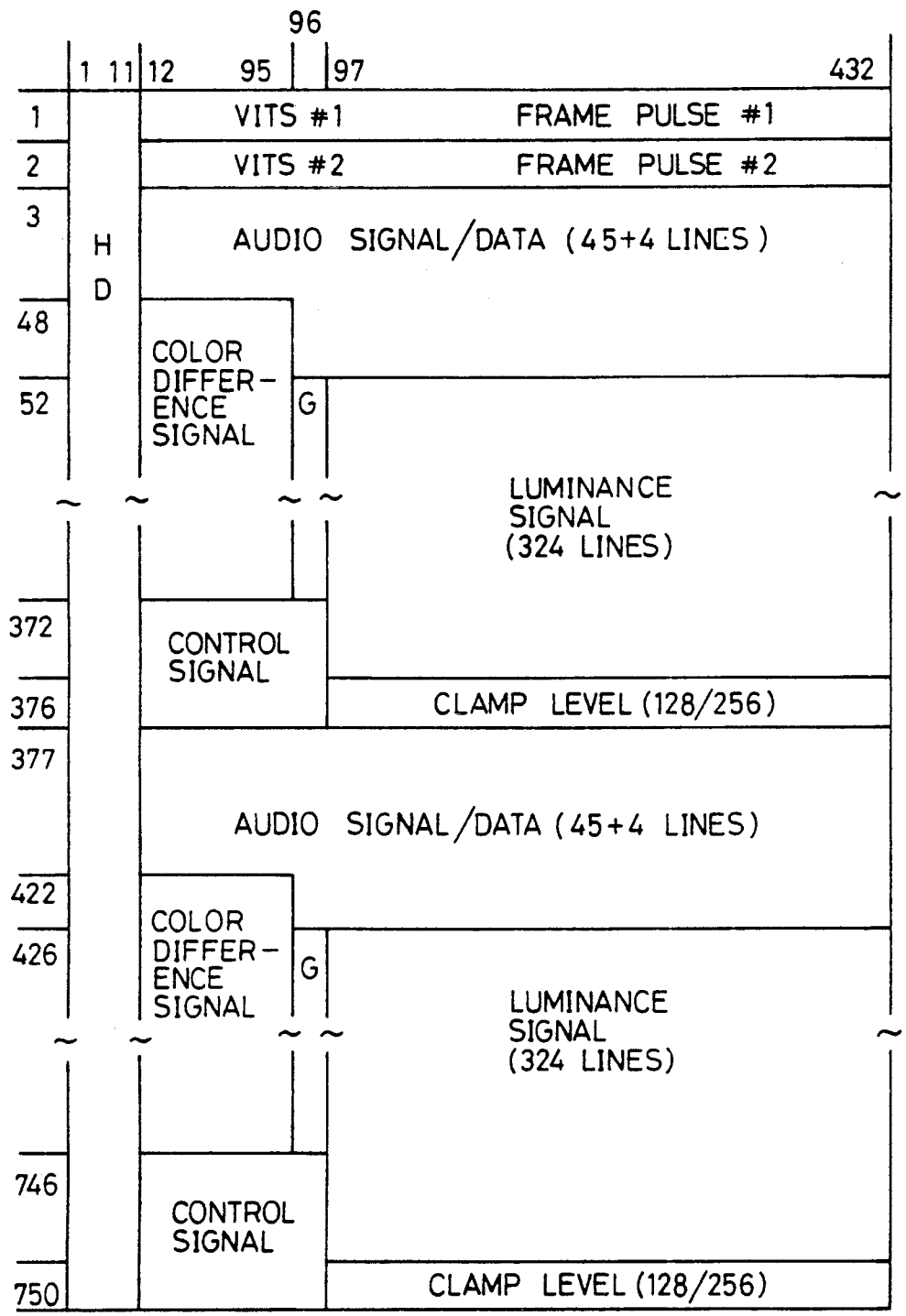
FIG. 5 is a diagram illustrating a Narrow MUSE signal format.

FIG. 4 shows a more specific arrangement of the encoder 101. The MUSE encoder 404 in FIG. 4 handles 480 pixels per one horizontal scanning line, and 1125 scanning lines per one frame. In contrast, the transmission system of the present invention deals with 432 pixels per one scanning line, and 750 scanning lines per one frame as shown in FIG. 5 to reduce the transmission bandwidth. The value 750 is selected so as to yield a simple ratio 2:3 with the 1125 lines as mentioned above. However, the number of scanning lines is not restricted to 750 lines. As shown in FIG. 2, the MUSE system assigns 1032 (=516×2) lines per one frame to the color difference signal and luminance signal, and so it is reasonable that the present invention correspondingly assigns 648 (=324×2) lines per one frame as shown in FIG. 5.

In FIG. 4, the Hi-vision signal (fourth television signal) of 1125 lines is supplied to an A/D converter 401 as a broad band video input signal. One frame will be composed of 1290×1125 pixels when the A/D converter 401 converts the video signal at the sampling frequency of 43.74 MHz. This is shown in FIG. 6A. The digital data thus produced undergoes the line conversion by a line number converter (1125 to 750) 402 to reduce the line number from 1125 to 750, thus producing the second television signal. This is shown in FIG. 6B. The MUSE encoder 404 at the later stage shown in FIG. 4, can accept 1140×1125 pixels per one frame, and so a dummy signal of a constant value (zero, for example) must be added to the signal shown in FIG. 6B to produce the signal (sixth television signal) that conforms to the acceptable form shown in FIG. 6C. This is performed by a horizontal-vertical data stuff unit 403 that increases the number of clocks per one line from 1290 to 1440 clocks, and increases the number of scanning lines per one frame from 750 to 1125 lines, thereby adjusting the proper format for the signal to the MUSE encoder 404.

The output of the horizontal-vertical data stuff unit 403 (sixth television signal) is supplied to the MUSE encoder 404, which produces a signal (fifth television signal) having a format whose transmission rate is 16.2 MHz. The output signal of the encoder 404, however, includes the dummy signal mentioned above. Because the dummy signal portion need not be transmitted, the final transmission rate can be reduced to 9.6552 MHz. The conversion of the transmission rate is achieved by a transmission rate converter 407 having a memory with read write functions. A D/A converter 408 converts the output of the transmission rate converter 407 into an analog signal, thus producing the transmitted signal (third television signal).

Figure 7:
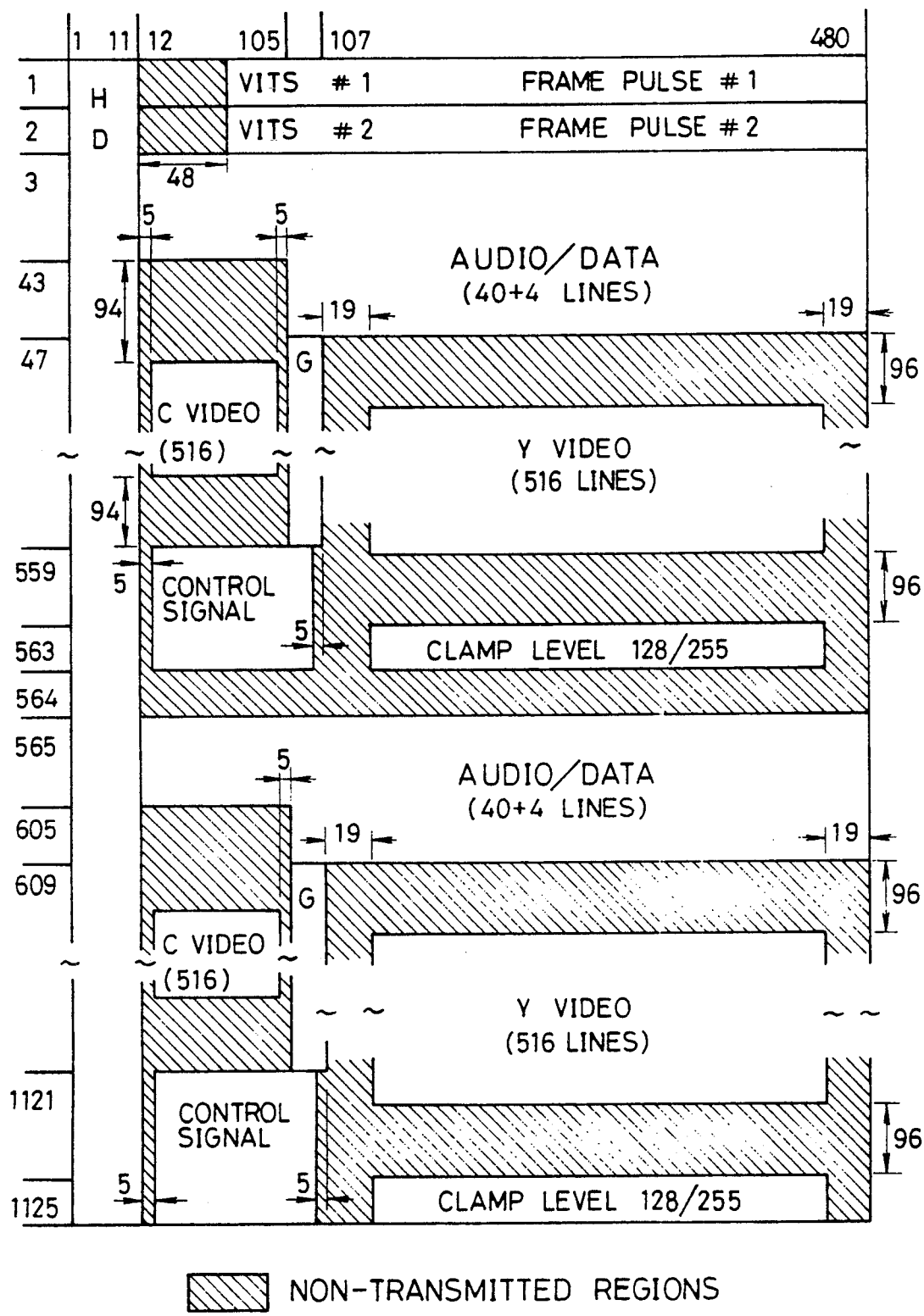
FIG. 7 is a diagram illustrating a data format of the Narrow MUSE signal in the MUSE system.

FIG. 7 shows the signal transmission format produced from the MUSE encoder 404, where the hatched portions indicate the regions which are not transmitted by the system of the present invention, i.e., the regions to which the dummy signal is superposed. As clearly seen from FIG. 7, the audio input signal has already been multiplexed into the vertical retrace interval of the video signal because the audio signal is supplied to the MUSE encoder 404 via a MUSE audio encoder 405.

In the signal transmission format shown in FIGS. 2, 5 and 7, VITS #1 and VITS #2 designate frame pulse lines #1 and #2, respectively. These lines include vertical interval test signal, which is used as a reference signal for detecting distortions added on the transmission line at the decoder side. A character G designates a guardband signal.

Figure 8:
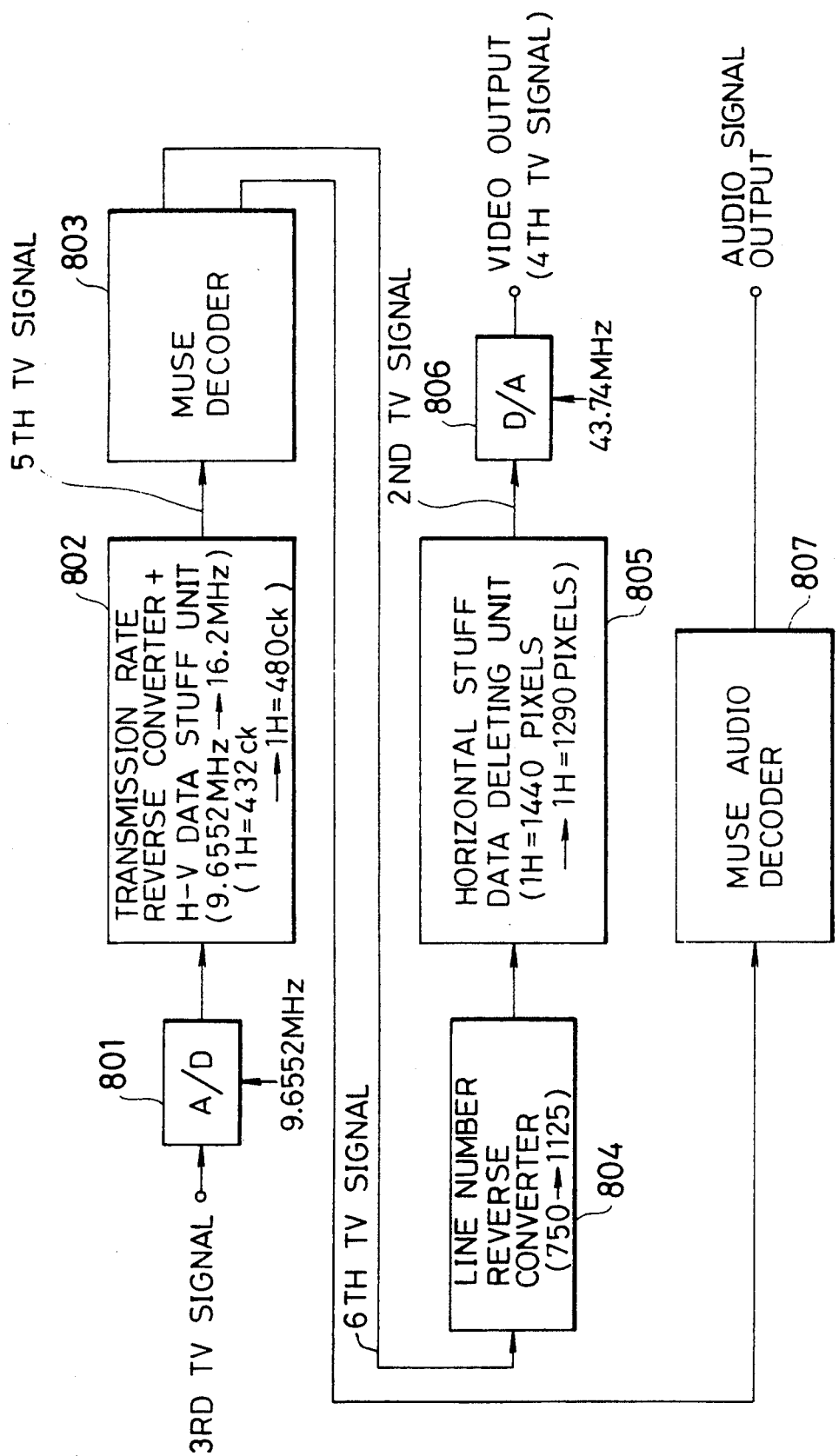
FIG. 8 is a block diagram showing a more specific arrangement of the decoder 107 shown in FIG. 3B.

FIG. 8 shows a more specific arrangement of the decoder 107 shown in FIG. 3B. The decoder 107 is arranged to handle the signal in the order reverse to that of the encoder 101 shown in FIG. 4. The received analog signal (third television signal) is converted into digital data by an A/D converter 801 at the sampling frequency of 9.6552 MHz. The digital data must be transformed to the format of 80×1125 pixels which a MUSE decoder 803 can accept. The received data has the format shown in FIG. 9A. Accordingly, by adding dummy data of a constant value (for example, of zero) as in the encoder 101, a frame of 432×750 pixels is converted into a frame of 480×1125 pixels. This is performed by a transmission rate reverse converter and horizontal-vertical data stuff unit 802. The configurations of frames before and after this process are shown in FIGS. 9A and 9B, respectively. The output (fifth television signal) from the data stuff unit 802 is decoded by the MUSE decoder 803. FIG. 9C shows the configuration of the output (sixth television signal) of the MUSE decoder 803. This output is applied to a line number reverse converter 804 for reversely converting the number of scanning lines from 750 to 1125. FIG. 9D shows the configuration of the output of the line number reverse converter 804. Here, the effective number of pixels on a scanning line is 1290 pixels out of 1440 pixels. Hence, the unnecessary data must be removed by a horizontal stuff data deleting unit 805 so that the number of pixels on a scanning line is reduced from 1440 pixels to 1290 pixels. The output of the deleting unit 805 (second television signal) is converted by a D/A converter 806 at the frequency of 43.74 MHz, and the original Hi-vision video signal (fourth television signal) can be reproduced. In FIGS. 9B–9D, the hatched portions indicate dummy portions or unnecessary data portions. The audio signal is simultaneously decoded by the MUSE decoder 803. The audio output of the MUSE decoder 803 is supplied to a MUSE audio decoder 807, and the audio output can be obtained therefrom.

As described above, the encoder and decoder of the narrow band multiple sub-sampling transmission system can be arranged by integrating simple additional elements with existing MUSE encoder and MUSE decoder, respectively. Consequently, the present invention can provide the encoder and decoder compatible with the MUSE system with simple configuration, thus facilitating compatibility of the two systems. As a result, the broad bandwidth television signal can be transmitted through the transmission bandwidth compatible with the standard television systems such as NTSC. In particular, the decoders, which will be mass-produced, have a greater advantage if they are originally designed and manufactured to be compatible with both systems, which enables the decoders to be produced on the same production line as the conventional one in an IC manufacturing factory.

3. DESCRIPTION OF TRANSMISSION CHARACTERISTIC COMPENSATING PORTION

To accomplish the second object of the present invention, the narrow band multiple sub-sampled signal produced by the encoder 101 undergoes the compensation by the characteristic compensating portion 102 for compensating the characteristics of the transmission line, and then undergoes the reverse compensation by the characteristic compensating portion 106. Because the narrow band multiple sampled signal has a special signal format as described above, the characteristic compensation is carried out in a plurality of frequency bands of the signal so that the high-quality decoding of the received signal can be achieved at the receiving end, and that the greater improvement in S/N ratio can be achieved by reducing the transmission distortion.

3.1. THE FIRST EMBODIMENT

In light of this, the system of the present invention is provided with a plurality of cascade connection circuits each having at least a coefficient multiplier connected to an edge detecting circuit including a delay element and a subtracter. The outputs of respective cascaded connection circuits are added, thus constituting a characteristic compensation circuit. This arrangement of the present invention makes it possible to maintain high degree of freedom of frequency characteristics, to improve S/N ratio by reducing transmission noises such as truncation noises interfering during the FM transmission, to prevent waveform distortions, and to facilitate circuit arrangement by using a more stable digital circuit as hardware.

First, a conventional arrangement of a characteristic compensation circuit using a unit delay element will be described with reference to FIGS. 12A and B. Each $z^{-1}$ represents a unit delay element 1201, and k, 1-k, and 1/(1-k) represent a coefficient multiplier 1214, 15, and 1216, respectively. Here, k is defined as a positive number less than 1. As shown in FIG. 13A, the compensation circuit at the transmitting end exhibits a high-band emphasis, whereas the compensation circuit at the receiving end exhibits a high-band deemphasis as shown in FIG. 13B. The two circuits thus have inverse characteristics. Defining the delay time by the unit delay element 1201 as t, the characteristic compensation is carried out with regard to the frequency band centered at the frequency of $$f_o = \tfrac{1}{2} t \qquad (1)$$

It suggests that the change of frequency characteristics has only a limited degree of freedom (for example, in FIGS. 13A and 13B, only variable a can be altered), which prevents the optimum design of the characteristic compensation circuit with regard to the spectra of the transmitted signal and transmission noises.

Figure 10A:
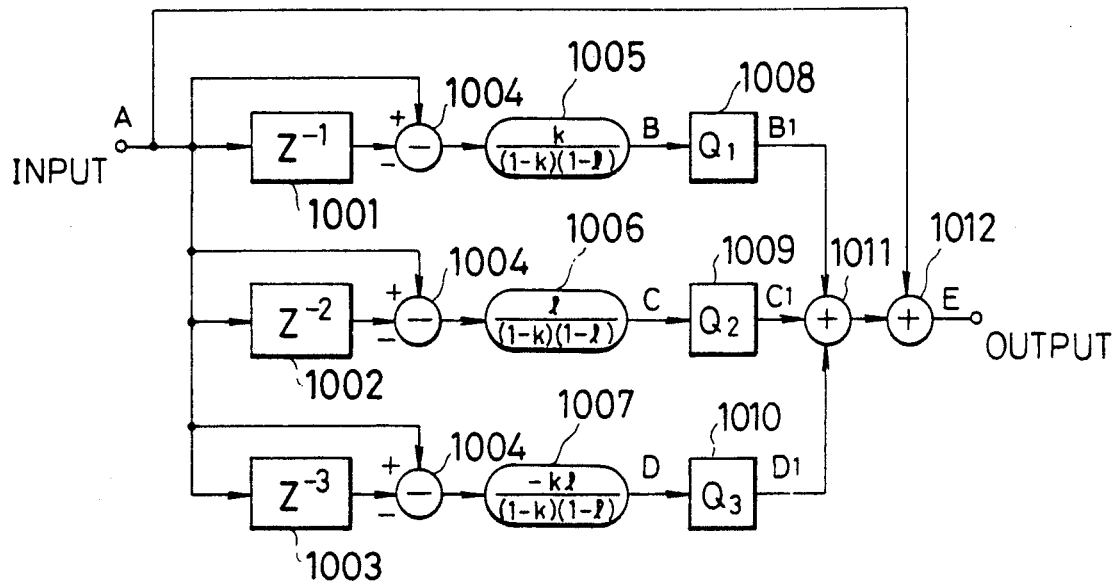
FIGS. 10A and 10B are block diagrams showing the characteristic compensation circuit of an embodiment of the present invention.
Figure 10B:
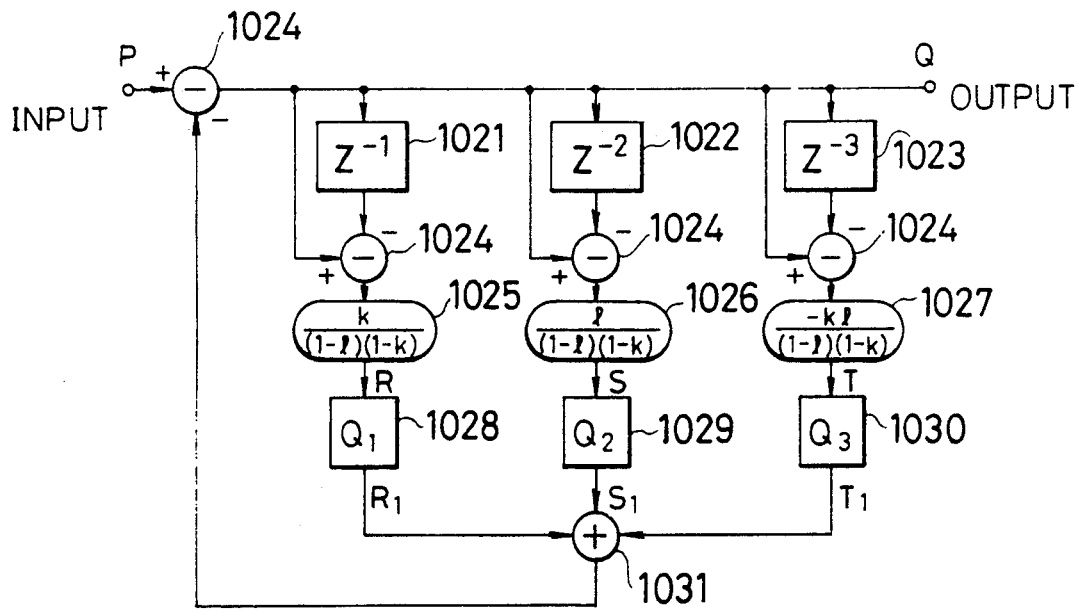

FIGS. 10A and 10B show the characteristic compensation circuits of an embodiment of the present invention, which can solve the above problem.

First, a nonlinear emphasis circuit in FIG. 10A comprises: a first edge processing circuit including an edge extracting circuit having a unit delay element 1001 and a subtracter 1004, a coefficient multiplier 1005 the coefficient value of which is k/(1-k)(1-l), and a first nonlinear circuit (Q1) 1008 serially connected to the coefficient multiplier 1005; a second edge processing circuit including an edge extracting circuit having a two sampling period delay element 1002 including two cascade connected unit delay elements, a coefficient multiplier the coefficient value of which is 1/(1-k)(1-l), and a second nonlinear circuit (Q2) 1009 serially connected to the coefficient multiplier 1006; a third edge processing circuit including an edge extracting circuit having a three sampling period delay element 1003, a coefficient multiplier 1007 the coefficient value of which is −kl/(1-k)(1-l), and a third nonlinear circuit (Q3) 1010; an adder 1011 that adds the outputs of the respective edge processing circuits; and an adder 1012 that adds the output of the adder 11 and the input signal to the compensation circuit.

On the other hand, the nonlinear deemphasis circuit shown in FIG. 10B is provided with edge processing circuits having the identical arrangement of those of the emphasis circuit described above, configuring a recursive nonlinear deemphasis circuit.

Figure 12A:
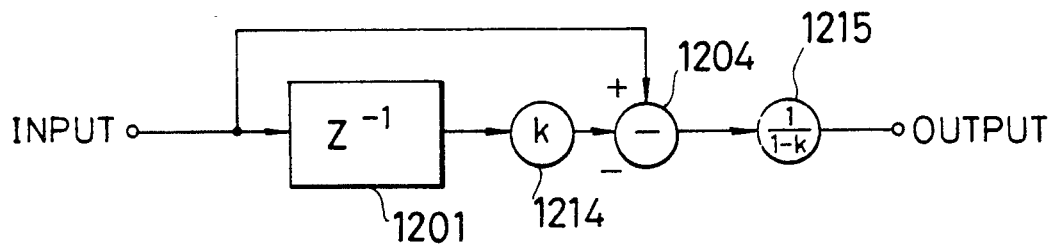
FIGS. 12A and 12B are block diagrams showing conventional compensation circuits for emphasis and deemphasis, respectively.
Figure 12B:
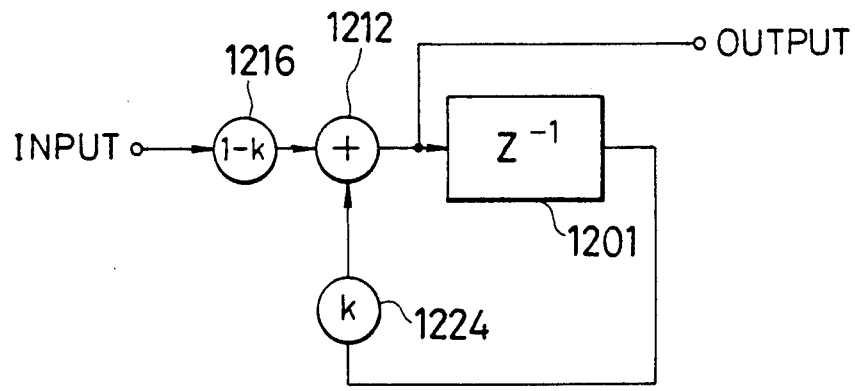
Figure 13A:
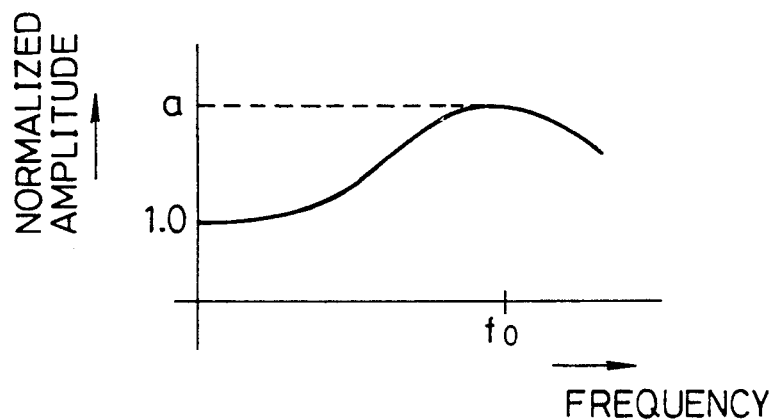
FIGS. 13A and 13B are graphs illustrating the characteristics of the circuits in FIGS. 12A and 12B.
Figure 13B:
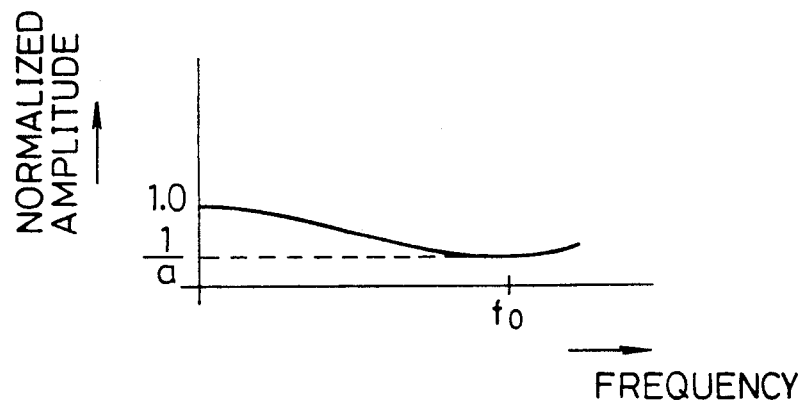

The transfer functions of the conventional compensation circuits shown in FIGS. 12A and 12B are expressed by the following equations.

$$H(z) = \frac{1}{1-k}(1 - kz^{-1}) \quad (2)$$

$$H^{-1}(z) = \frac{1}{H(z)} = \frac{1-k}{1-kz^{-1}}$$

$$0 \leq k < 1$$

H(z): transfer function of the conventional emphasis circuit $H^{-1}(z)$: transfer function of the conventional deemphasis circuit The zero and pole of the H(z) are expressed as follows:
zero: z=k (<1)
pole: z=0

Both the zero and pole are located within the unit circle on the complex plane, and the H(z) satisfies the minimum phase condition. This suggests that a stable reverse filter the transfer function of which is $H^{-1}(z)$ exists, and that the emphasis and deemphasis circuits in FIGS. 12A and 12B can be practically achieved as stable hardware. Thus, the emphasis and deemphasis circuits of the present invention must satisfy the minimum phase requirement as described here.

First, the general form of emphasis and deemphasis circuits having no nonlinear circuit is explained.

The transfer function H(z) of the emphasis circuit that gives the minimum phase filtering characteristics can be obtained by extending the equation (2), and is expressed as follows.

$$H(z) = \frac{1}{1-k_1}(1 - k_1 z^{-1}) \frac{1}{1-k_2}(1 - k_2 z^{-2}) \quad (3)$$

$$\frac{1}{1-k_3}(1 - k_3 z^{-3}) \ldots$$

$$= \prod_{n=1}^{N} \frac{1}{1-k_n}(1 - k_n z^{-n})$$

$$0 \leq k_n < 1$$

$$N = \text{positive integer}$$

that is, the zero and pole of the H(z) are expressed as follows.

$$\text{Zero: } z = \sqrt[n]{K_n} < 1$$

$$\text{Pole: } z = 0 < 1$$

Thus, the H(z) satisfies the minimum phase requirement, which suggest the existence of a stable reverse filter the transfer function $H^{-1}(z)$ of which is expressed by the following equation.

$$H^{-1} = \frac{1}{H(z)} = \prod_{n=1}^{N} \frac{1 - k_n}{1 - k_n z^{-n}} \quad (4)$$

This represents the transfer function of the deemphasis circuit.

Second, a nonlinear circuit, which is provided for suppressing waveform distortions such as truncation noises generating at the edge portions, must give effect only to the edge portions. The H(z) is changed and defined as follows.

$$H(z) \triangleq \frac{Y(z)}{X(z)}$$

$$= \prod_{n=1}^{N} \frac{1}{1-k_n}(1 - k_n z^{-n})$$

$$Y(z) = \left[ \prod_{n=1}^{N} \frac{1}{1-k_n}(1 - k_n z^{-n}) \right] \cdot X(z)$$

$$= X(z) +$$

$$\left\{ -X(z) + \left[ \prod_{n=1}^{N} \frac{1}{1-k_n}(1 - k_n z^{-n}) \right] \cdot X(z) \right\}$$

$$= X(z) + \prod_{n=1}^{N} \frac{1}{1-k_n} \left\{ - \prod_{n=1}^{N} (1 - k_n) \cdot X(z) + \prod_{n=1}^{N} (1 - k_n z^{-n}) \cdot X(z) \right\}$$

when the approximation $$\prod_{n=1}^{N} (1 - k_n z^{-n}) \triangleq 1 + a_1 z^{-1} + a_2 z^{-2} + \ldots + a_{\frac{N(N+1)}{2}} \cdot z^{-\frac{N(N+1)}{2}} \quad (5)$$

is used, the equation $$\prod_{n=1}^{N}(1 - k_n) = 1 + a_1 + a_2 + \ldots + a_{\frac{N(N+1)}{2}} \quad (6)$$

holds. Hence $$Y(z) = X(z) + \left[\prod_{n=1}^{N}\frac{1}{1-k_n}\right] \cdot \quad (7)$$

$$\left[-\sum_{m=1}^{\frac{N(N+1)}{2}} a_m \{X(z) - X(z)z^{-m}\}\right]$$

where

X(z): z transform of the input signal
Y(z): z transform of the output signal

The second term $\{X(z)-X(z)z^{-m}\}$ of the right-hand side of equation (7) represents the edge extraction of the signal. Hence, the equation considering the effect of the nonlinear circuit is expressed as follows.

$$Y(z) = X(z) + \quad (8)$$

$$\left[-\sum_{m=1}^{\frac{N(N+1)}{2}} Q_m \cdot \left[\prod_{n=1}^{N}\frac{1}{1-k_n}\right] \cdot a_m \{X(z) - X(z)z^{-m}\}\right]$$

by substituting $$k_1 = k, \ k_2 = l \quad (9)$$

the equation (8) is expressed by $$Y(z) = X(z) + \{Q_1 \cdot k\alpha[X(z) - X(z)z^{-1}] + \quad (10)$$
$$Q_2 \cdot l \cdot \alpha[X(z) - X(z)z^{-2}] +$$
$$Q_3 \cdot (-kl) \cdot \alpha[X(z) - X(z)z^{-3}]$$

where $\alpha = \dfrac{1}{(1-k)(1-l)}$

This is implemented by the circuit shown in FIG. 10A of the first embodiment. On the other hand, $H^{-1}(z)$ is approximated by the following equation.

$$H(z) \triangleq \frac{Y(z)}{X(z)}$$

$$= \prod_{n=1}^{N}\frac{1-k_n}{1-k_n z^{-n}}$$

$$\therefore Y(z) = X(z) - \left\{-Y(z) + \left[\prod_{n=1}^{N}\frac{1}{1-k_n}(1-k_n z^{-n})\right]\right\} \quad (11)$$

Analogous to the change of equations concerning H(z).

$$Y(z) = X(z) - \left[\prod_{n=1}^{N}\frac{1}{1-k_n}\right] \cdot \quad (12)$$

$$\left[-\sum_{m=1}^{\frac{N(N+1)}{2}} a_m \{Y(z) - Y(z)z^{-m}\}\right]$$

The equation considering the effect of the non-linear circuit is expressed as follows.

$$Y(z) = X(z) - \quad (13)$$

$$\left[-\sum_{m=1}^{\frac{N(N+1)}{2}} Q_m \cdot \left[\prod_{n=1}^{N}\frac{1}{1-k_n}\right] \cdot a_m \{Y(z) - Y(z)z^{-m}\}\right]$$

By replacing $k_1 = k$, $k_2 = l$ $$Y(z) = X(z) - \{Q_1 \cdot k\alpha[Y(z) - Y(z)z^{-1}] + \quad (14)$$
$$Q_2 \cdot l \cdot \alpha[Y(z) - Y(z)z^{-2}] +$$
$$Q_3 \cdot (-kl) \cdot \alpha[Y(z) - Y(z)z^{-3}]\}$$

Figure 11:
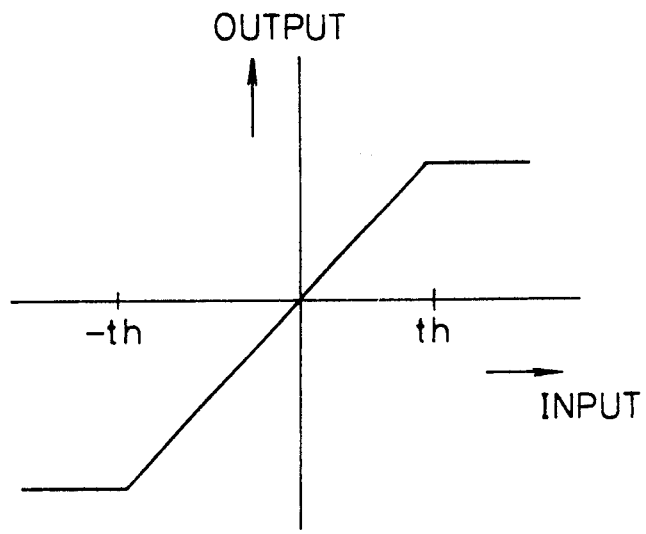
FIG. 11 is a graph illustrating the characteristics of the nonlinear circuit, which exhibits the clipping characteristics above the clipping level th and below the clipping level -th.

This is realized by the arrangement in FIG. 10B. FIG. 11 shows the characteristics of the nonlinear circuits (Q1-Q3) 1008, 1009, 1010, 1028, 1029 and 1030, which exhibits the clipping characteristics above the clipping level th and below the clipping level -th. As the nonlinear circuit, a general purpose nonlinear circuit can be used.

Figure 14:
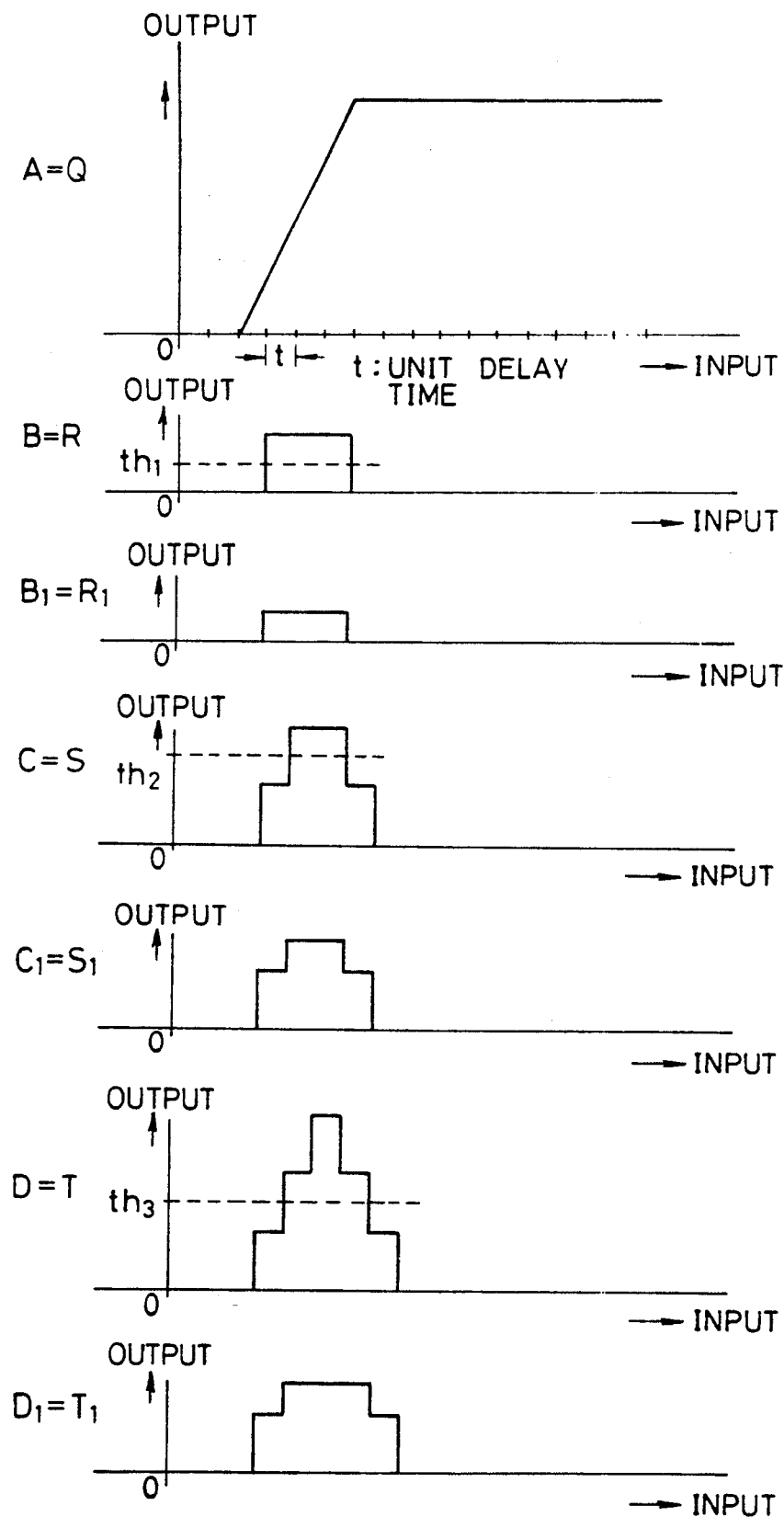
FIG. 14 is a waveform chart illustrating step function responses at various portions of the emphasis circuit and deemphasis circuit in FIGS. 10A and 10B.

FIG. 14 shows the waveforms at various points of the emphasis and deemphasis circuits of the first embodiment shown in FIGS. 10A and 10B when a step function is inputted to these circuits. The characters th1-th3 represent the threshold values of the nonlinear circuits Q1-Q3, respectively.

The edge processing portions of the emphasis and deemphasis circuits in FIGS. 10A and 10B have the same configurations. Consequently, the output signal from the deemphasis circuit is identical to the input signal to the emphasis circuit as can be seen from FIG. 14, thus producing no distortion. The threshold values th1-th3 are set to such values that does not generate truncation noises. The signal E (=P) on the transmission line is expressed by the following equation, using the symbols in FIG. 14.

$$E = P = A + (B1 + C1 + D1) \quad (15)$$

A VARIATION OF THE FIRST EMBODIMENT

Figure 15A:
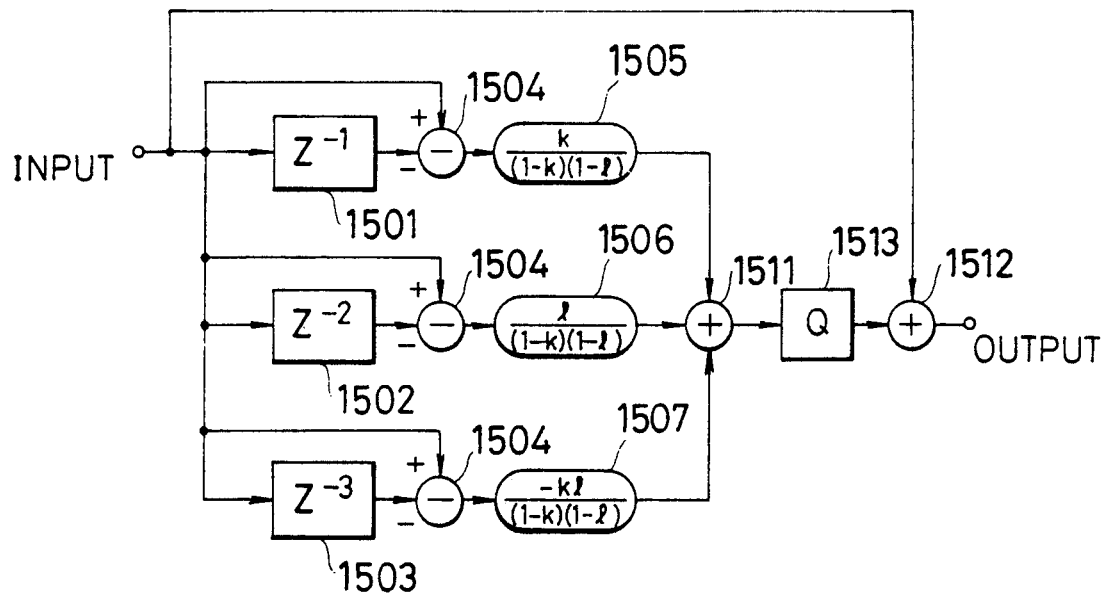
FIGS. 15A and 15B are block diagrams showing the arrangements of the emphasis circuit and deemphasis circuit of a variation of the first embodiment which have simpler configurations than those shown in FIGS. 10A and 10B.
Figure 15B:
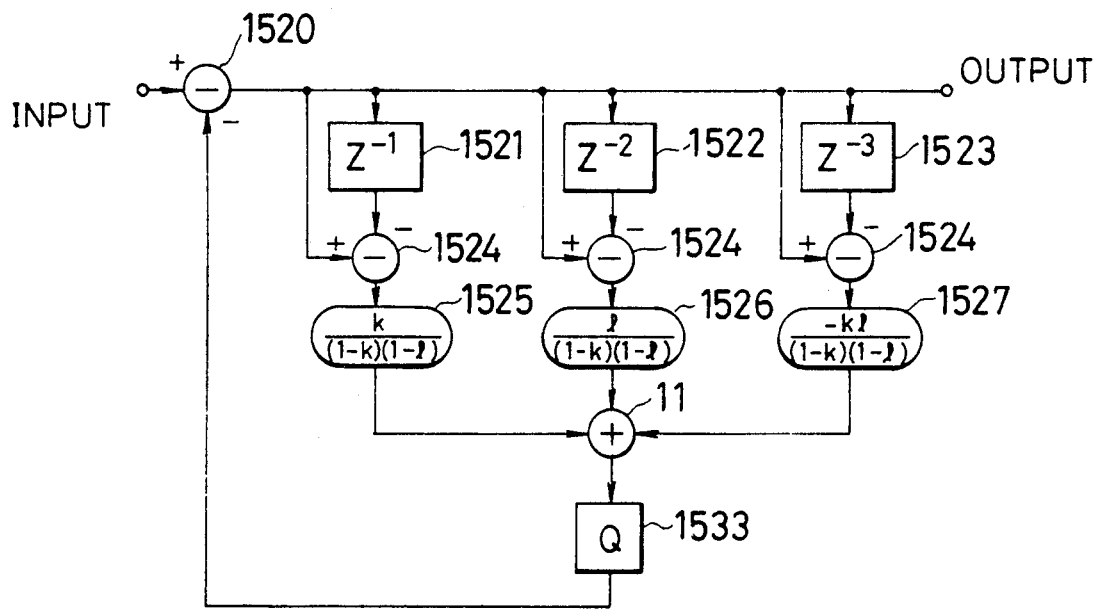

FIGS. 15A and 15B show a variation of the first embodiment which has simpler configurations than those shown in FIGS. 10A and 10B. The circuit in FIG. 15A (15B) differs from that in FIG. 10A (10B) in that the former circuit has only one nonlinear circuit 1513 (1533), and that the adder 1511 (1531) adds the outputs of all the edge processing portions before the sum total of the outputs is supplied to the nonlinear circuit 1513 (1533). Although this will restrict the degree of freedom in designing the circuits, it has an advantage that the circuit arrangements become simpler. The characteristic of the nonlinear circuit 1513 (1533) is as shown in FIG. 11, and the threshold value th is set at such a value that does not generate truncation noises.

Incidentally, although three delay elements are used in the arrangements in FIGS. 10A, 10B, 15A and 15B, the number of the delay elements is not restricted to three as indicated by the equations (8) and (13).

The present invention is provided with a pair of filters having stable reverse filtering characteristics, and a number of parameters, thus resulting in a great degree of freedom in designing. Furthermore, because the filters are provided with nonlinear circuits in the edge processing portions, the S/N ratio is greatly improved by suppressing the waveform distortions such as truncation noises interfering during FM transmission or the like. In addition, the filters are reliable because they are configured by digital circuit elements.

3.2. SECOND EMBODIMENT

The second embodiment of transmission characteristic compensation circuit will be described.

The first embodiment performs appropriate characteristic compensations mainly to a plurality of frequency bands in the horizontal direction. In contrast, the second embodiment performs characteristic compensations with emphasis and deemphasis circuits having responses in a plurality of frequency bands corresponding to the temporal domain.

More specifically, the second embodiment is provided with a temporal high-band emphasis filter, a temporal high-band deemphasis filter: these filters use frame memories or delay circuits the delay time of which is a multiple of the frame period. This makes it possible to reduce the truncation noises, and hence to prevent the deterioration of picture quality in the still picture domain, thus improving the S/N ratio.

Conventionally, the high-band components of the horizontal frequency characteristics of the video signal are emphasized at the transmitting end, and deemphasized at the receiving end as shown in FIGS. 13A and 13B. This greatly suppresses noises in the high-frequency band, resulting in the improvement in the S/N ratio.

The conventional technique is based on the assumption that the high-band components of the video signal to be transmitted are smaller than the low-band components. However, the frequency characteristics of the video signal to be transmitted do not necessarily satisfy this condition. In particular, the video signals of still pictures often include large high-band components, which will increase the truncation noises during the FM transmission. This is because still pictures do not induce the reduction of the high-band components caused by the charge-storage effect of a television camera. Consequently, the improvement in S/N ratio by emphasis and deemphasis of the horizontal high-band components has its due limit, resulting in insufficient improvement in the S/N ratio.

Accordingly, an object of the second embodiment is to provide a great improvement in the S/N ratio by suppressing the truncation noises or the like without affecting the still picture frequency band in the television signal transmission using a rather simple circuit arrangement.

To accomplish this object the second embodiment is provided at the transmitting end with a horizontal low-pass filter, horizontal high-pass filter and a temporal high-band emphasis filter, and is also provided at the receiving end with a horizontal low-pass filter, horizontal high-pass filter, and a temporal high-band deemphasis filter, so as to suppress the noises interfering during the transmission, without deteriorating the quality of still pictures.

DESCRIPTION OF THE SECOND EMBODIMENT

A second embodiment of the present invention will now be described with reference to the accompanying drawings.

Figure 16A:
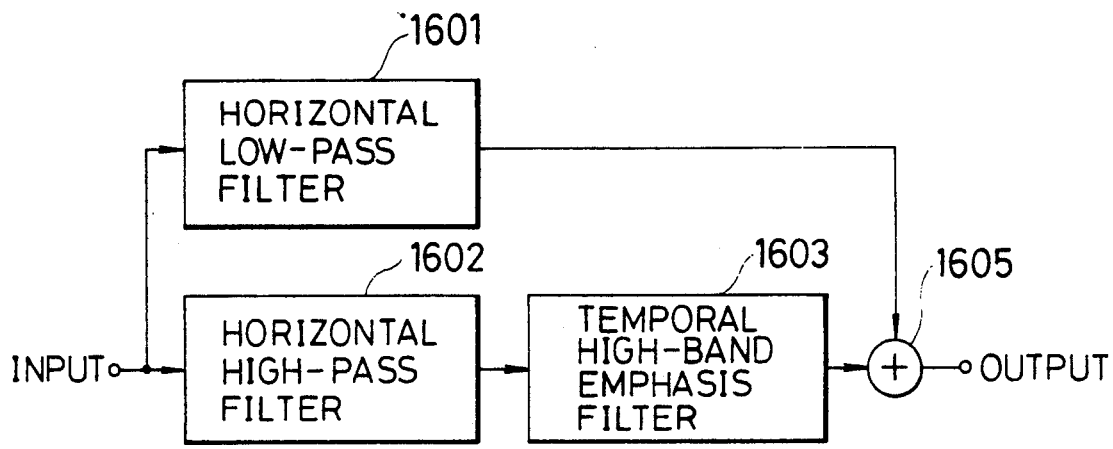
FIGS. 16A and 16B are block diagrams showing basic arrangements of the emphasis circuit and deemphasis circuit of the second embodiment, respectively.
Figure 16B:
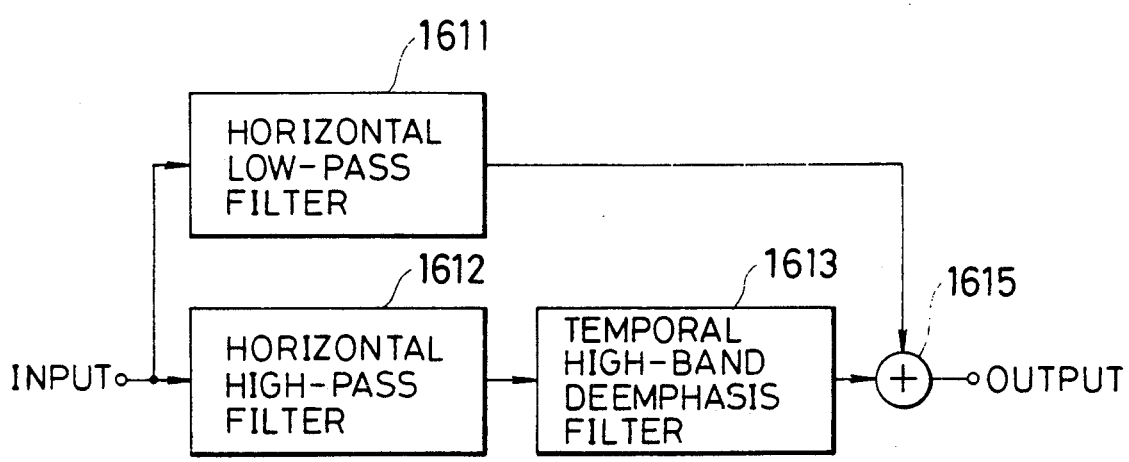

FIGS. 16A and 16B are block diagrams showing basic arrangements of the second embodiment. The emphasis circuit includes a horizontal low-pass filter 1601, a horizontal high-pass filter 1602, and a temporal high-band emphasis filter 1603. The deemphasis circuit includes a horizontal low-pass filter 1611, a horizontal high-pass filter 1612, and a temporal high-band deemphasis filter 1613.

The emphasis and deemphasis processing of this embodiment is characterized in that it operates with regard to the high-band components in the time domain, and this exerts an effect only on the horizontal high-band components.

In the emphasis circuit, the low-band components of the video signal are outputted without change through the horizontal low-pass filter 1601. In contrast, the high-band components are first separated by the horizontal high-pass filter 1602, and then emphasized only in the time domain by using the temporal high-band emphasis filter 1603.

In the deemphasis circuit, the horizontal low-band components are outputted without change through the horizontal low-pass filter 1611. The horizontal high-band components, on the other hand, are separated by horizontal high pass filter 1612 and are deemphasized by the temporal high-band deemphasis filter 1613 which is the reverse filter of the temporal high-band emphasis filter 1603. Thus, the video signal is decoded with the reduced transmission noises.

Figure 17:
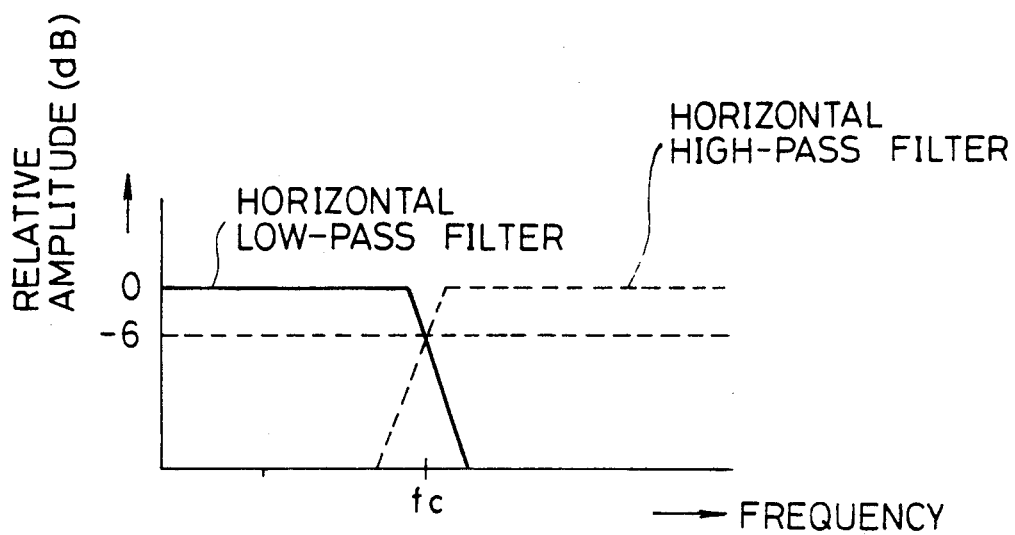
FIG. 17 illustrates the characteristics of the horizontal low-pass filters 1601 and 1611, and the horizontal high-pass filters 1602 and 1612, the cut-off frequency of which is fc.

FIG. 17 illustrates the characteristics of the horizontal low-pass filters 1601 and 1611, and the horizontal high-pass filters 1602 and 1612, the cutoff frequency of which is fc.

Figure 18:
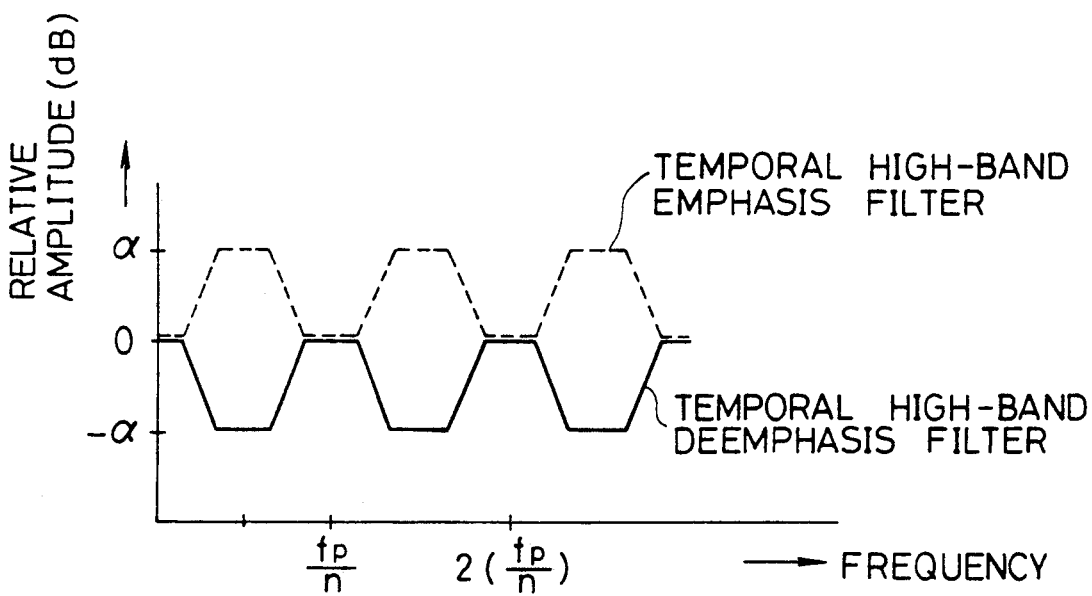
FIG. 18 illustrates the characteristics of the temporal high-band emphasis filter 1603 and the temporal high-band deemphasis filter 1613.

FIG. 18 illustrates the characteristics of the temporal high-band emphasis filter 1603 and the temporal high-band deemphasis filter 1613. In these figures, fp represents the frame frequency and n represents an integer. The emphasis in the time domain is restricted to the horizontal high-band components. This is because even images of low spatial resolution which will occur in such occasions as switching of images, panning and tilting of a camera, may cause a signal having large amplitude in the time domain, which will generate the truncation noises.

As is seen from FIG. 18 showing the characteristics of the temporal high-band emphasis and deemphasis filters 1603 and 1613 in FIGS. 16A and 16B, the relative amplitudes of these filters are set to 0 dB at frequencies equal to the frame frequency fp multiplied by integers. The reason of this is as follows: the spectrum of the television signal in a still picture domain is composed of line spectra appearing at frequencies equal to the frame frequency fp multiplied by integers; and so, to prevent the temporal emphasis from affecting the video signal in the still picture domain, the above setting is required. As a result, a great high-band emphasis on other spectra (this corresponds to increase $\alpha$ in FIG. 18) does not cause the truncation noises, resulting in a greater emphasis and deemphasis effect. In particular, in the motion picture domain, the high-band components of the video signal are reduced because of the charge-storage effect and afterimage characteristics of a television camera, which in turn reduces the influence of the temporal high-band emphasis and the probability of occurrence of the truncation noises.

Figure 19A:
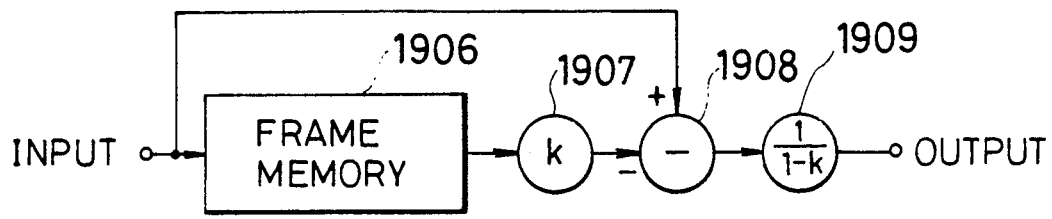
FIGS. 19A and 19B are block diagrams showing examples of the temporal high-band emphasis filter and the temporal high-band deemphasis filter, respectively.
Figure 19B:
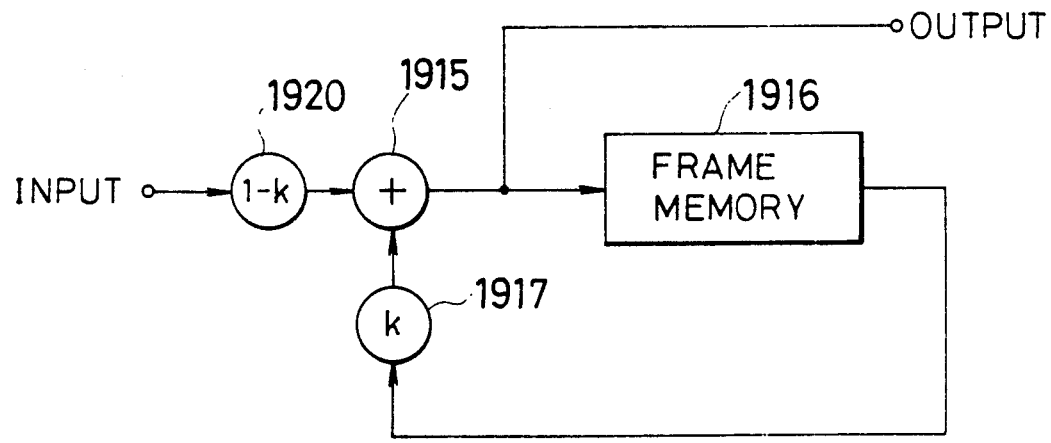

FIGS. 19A and 19B are block diagrams showing examples of the temporal high-band emphasis filter and the temporal high-band deemphasis filter, respectively. These filters use frame memory 1906 and 1916, and so the characteristics of the filters correspond to the characteristics when n=1 in FIG. 18. The respective transfer functions H(z) and H$^{-1}$(z) of the high-band emphasis filter 1603 and the high-band deemphasis filter 1613 are expressed as follows by using the equations (3) and (4).

$$H(z) = \frac{1}{1-k}(1 - Kz^{-1}) \tag{16}$$

$$H^{-1}(z) = \frac{1}{H(z)} = \frac{1-k}{1-Kz^{-1}} \tag{17}$$

where k: a gain function value (generally,

0<k<1)

z$^{-1}$ an operator expressing the frame delay

Figure 20A:
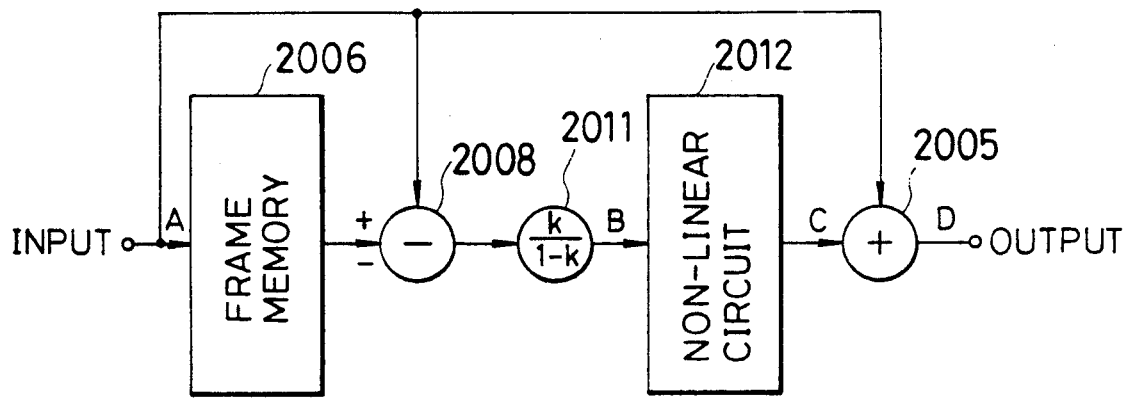
FIGS. 20A and 20B are block diagrams showing other examples of the temporal high-band emphasis filter 1603 and temporal high-band deemphasis filter 1613, respectively.
Figure 20B:
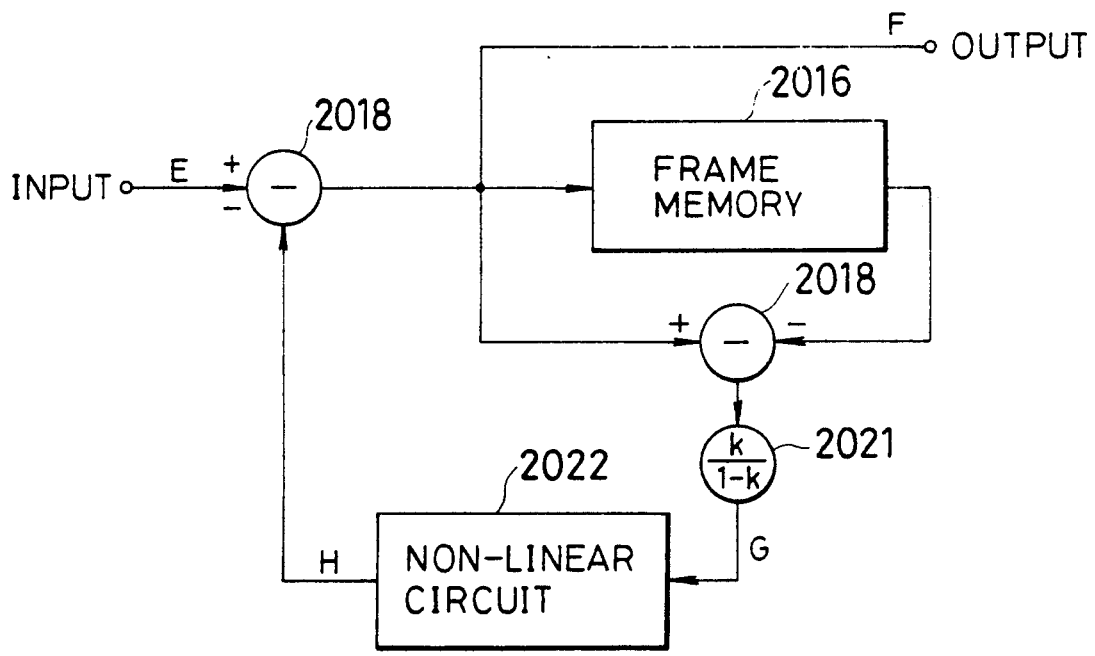

FIG. 20A shows another example of the temporal high-band emphasis filter 1603, and FIG. 20B shows another example of the temporal high-band deemphasis filter 1613. In these figures, k/(1- k) represents a coefficient of a gain coefficient multipliers 2011 and 2021. If each of the nonlinear circuits 2012 and 2022 is replaced by a linear circuit, the transfer functions of the high-band emphasis filter and high-band deemphasis filter would be identical to those in FIGS. 19A and 19B, respectively.

Figure 21:
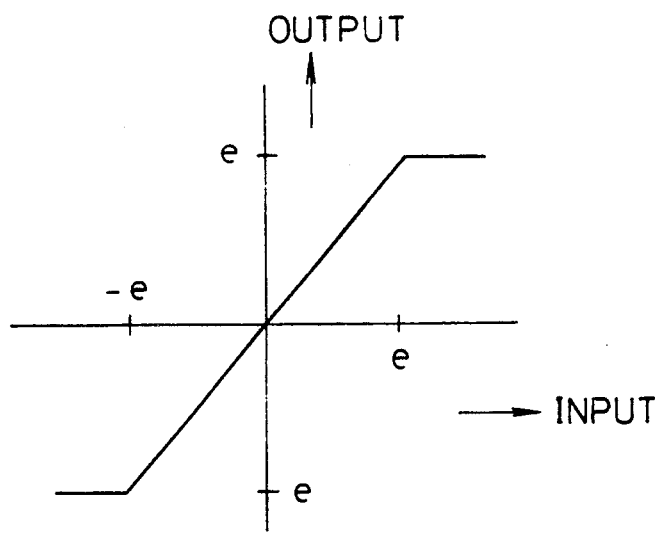
FIG. 21 is a graph illustrating the characteristics of the nonlinear circuits 2012 and 2022.

FIG. 21 shows the characteristics of the nonlinear circuits 2012 and 2022. It exhibits limiter characteristics that limit the output levels when the absolute value of the input exceeds e. The value e is set at the threshold value beyond which the truncation noises will occur.

Referring now to FIGS. 22A-22H, prevention of the truncation noises and decoding of the signal will be described. FIGS. 22A-22H correspond to the locations indicated by the characters A-H in FIGS. 20A and 20B, and represent the waveforms of signals of these locations, respectively.

Figure 22A:
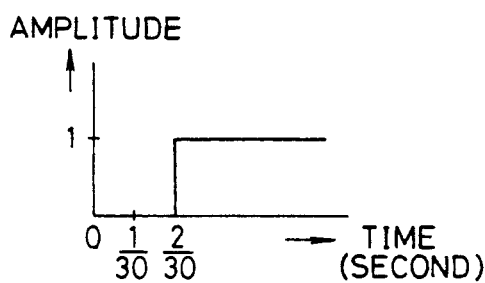
Figure 22F:
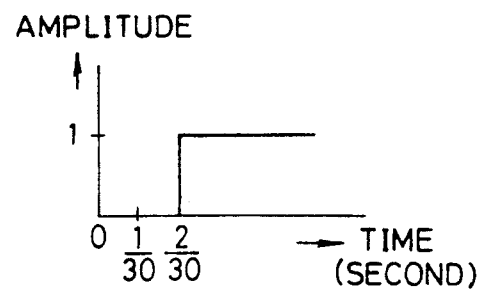
Figure 22B:
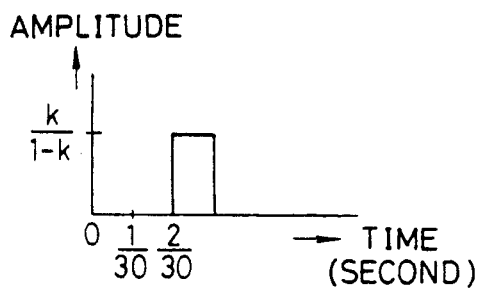
Figure 22G:
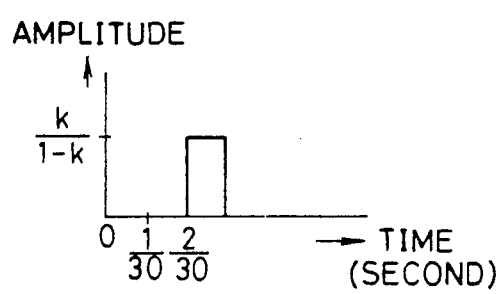
Figure 22C:
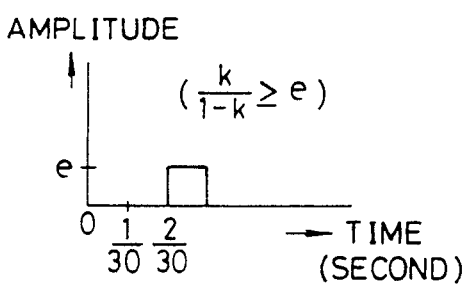
Figure 22H:
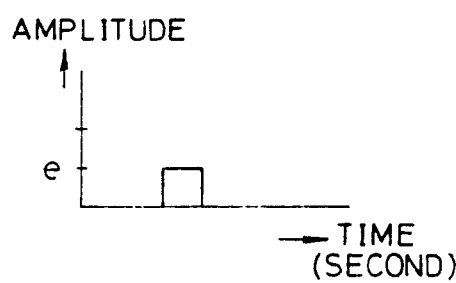

When the unit step function shown in FIG. 22A is fed to the emphasis circuit, the frame difference signal multiplied by the coefficient value becomes a pulse signal shown in FIG. 22B, the pulse width of which is one frame period (1/30 sec). When the amplitude of the signal in FIG. 22B is very large, it is limited by the nonlinear circuit 2012 to produce a signal shown in FIG. 22C. The signal in FIG. 22C is added to the input signal in FIG. 22A to produce the output signal in FIG. 22D of the emphasis circuit.

Figure 22D:
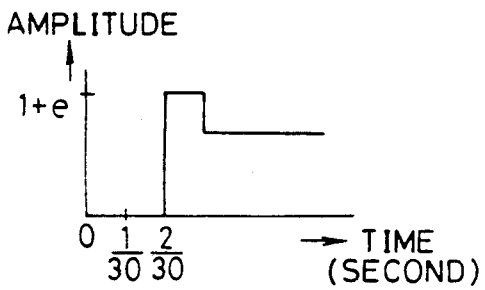

On the other hand, in the deemphasis circuit, the signal shown in FIG. 22D becomes signal in FIG. 22E. The signal at the nodes F, G, and H have identical waveforms to those at the nodes A, B, and C, respectively. This means that the output signal at F of the deemphasis circuit is identical to the input signal at A of the emphasis circuit. Thus, no truncation noise occurs and the signal is decoded without deterioration. In this example, the amplitude of the frame difference signal is so large that the amplitude is limited by the nonlinear circuit. When the amplitude of the frame difference signal is small, it is clear that the output of the deemphasis circuit is the original video signal because the emphasis and deemphasis circuits have the reverse filtering relationship.

Incidentally, the transfer function explained here is a mere example to carry out the present invention, and so other transfer functions can also be used. Similarly, the characteristics of the nonlinear circuit are not restricted to the amplitude limiting characteristics shown in FIG. 21. For example, soft limiting characteristics that gradually limit the amplitude can also be used.

The second embodiment can improve the S/N ratio by reducing the truncation noises or the like. However, a large temporal signal will occur in such cases as image switching, panning or tilting of a camera, which will cause the truncation noises even when only the horizontal high-band components are emphasized.

A VARIATION OF THE SECOND EMBODIMENT

Figure 23A:
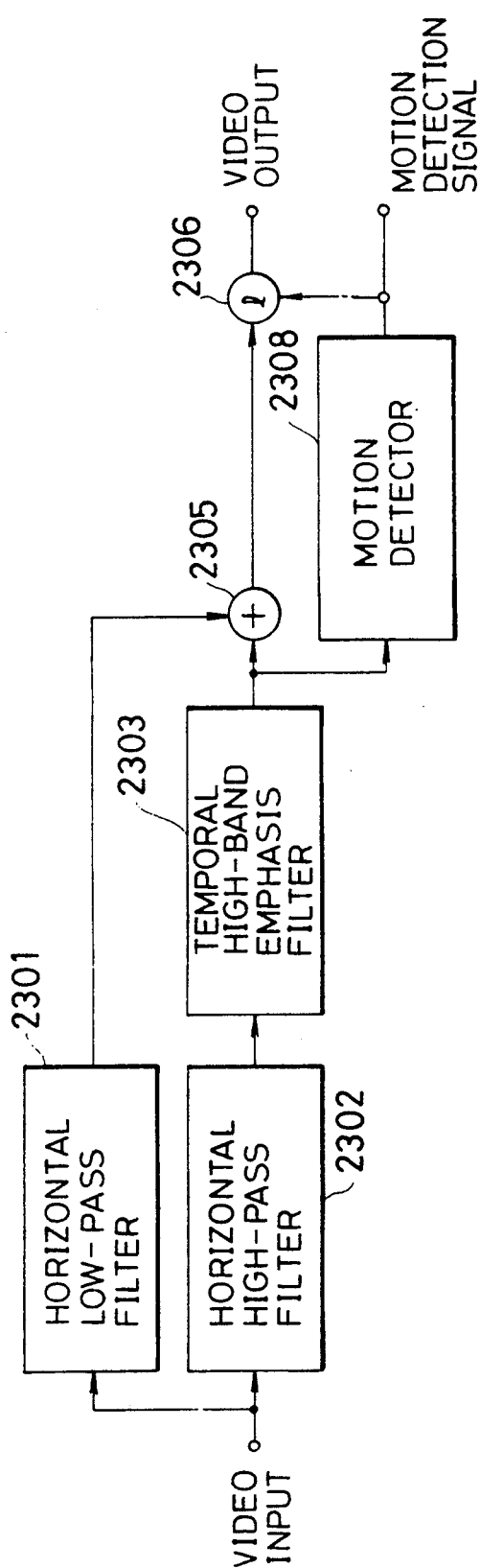
FIGS. 23A and 23B are block diagrams showing arrangements of the emphasis circuit and deemphasis circuit of a variation of the second embodiment, respectively, which can reduce the truncation noises.
Figure 23B:
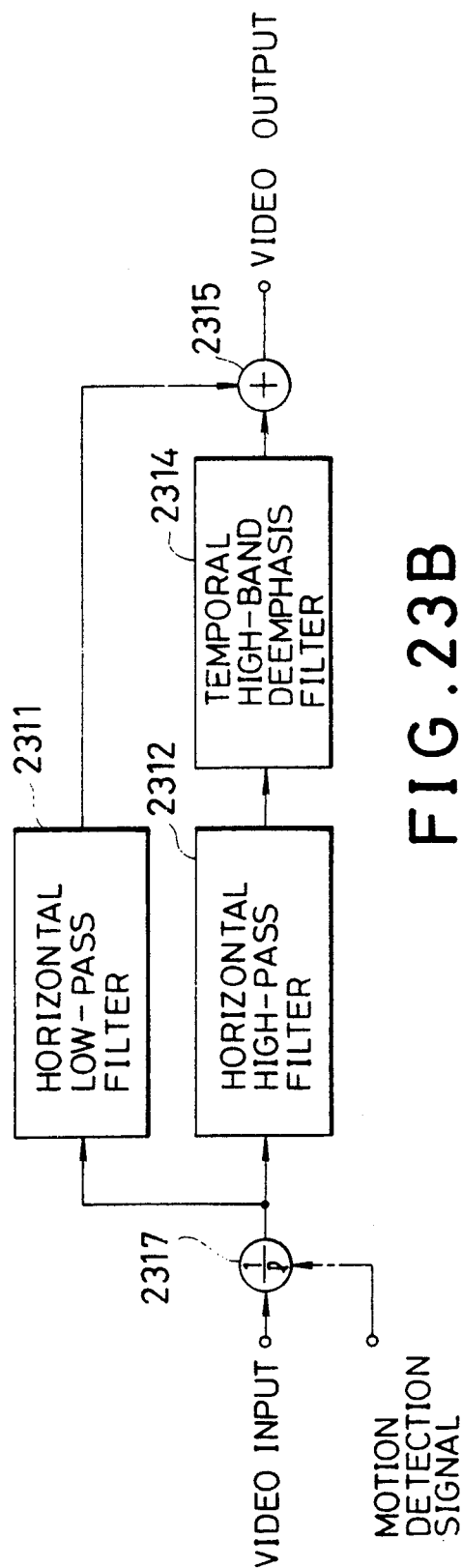

FIGS. 23A and 23B show an improved arrangement of the second embodiment, which can reduce the truncation noises in such cases. The emphasis circuit has a horizontal low-band filter (low-pass filter) 2301, a horizontal high-band filter (high-pass filter) 2302, a temporal high-band emphasis filter 2303, and an adder 2305 like the emphasis circuit of the second embodiment in FIG. 16A. In addition, the emphasis circuit in FIG. 23A is provided with a motion detector 2308 and motion-adaptable level adjuster 2306 responsive to the motion detection signal from the motion detector 2308. Likewise, the deemphasis circuit has a horizontal low-band filter 2311, a horizontal high-band filter 2312, a temporal high-band deemphasis filter 2313, and an adder 2315 like the deemphasis circuit of the second embodiment in FIG. 16B. In addition, the deemphasis circuit in FIG. 23B is provided with a motion-adaptable level adjuster 2317. The motion detection signal produced by the motion detector 2308 is transmitted in conjunction with the video signal, and controls the motion-adaptable level adjuster 2317.

In the emphasis circuit, the low-band components of the video signal are fed to the adder 2305 through the horizontal low-pass filter 2301. At the same time, the horizontal high-band components separated by the horizontal high-band filter 2302 are temporal emphasized by the temporal high-band emphasis filter 2303. The moving level will be included in the output of the high-band emphasis filter 2303 because the filter 2303 has a temporal high-band filter characteristic, and so produces large amplitude signals in connection with moving images and changes of scenes.

The output of the motion detector 2308 controls the motion-adaptable level adjuster 2308: a large output of the motion detector 2308 decreases the gain of the level adjuster 2308 to less than 1; whereas a small output increases the gain. For example, changes in scenes increase the output of the high-band emphasis filter 2303, which will in turn increase the probability of occurrence of the truncation noises. In such a case, the level adjuster 2306, the gain of which is normally maintained at 1, reduces its gain to such a level that the truncation noises will not occur.

The output of the motion detector 2308 is transmitted to the deemphasis side as a motion detection signal.

Here, the period of the output signal of the motion detector 2308 can take values corresponding to pixel, block, frame, and two frames, etc. However, a frame unit period is preferable for preventing the truncation noises associated with the overall composition of a picture such as changes of scenes, because the circuit arrangement becomes simpler. The small amount of information of the motion detection signal makes it possible to be transmitted by using various known techniques: not only by another line, but also by time multiplexing the motion detection signal into the retrace interval of the video signal.

In the deemphasis circuit, the motion-adaptable level adjuster 2317 controls the gain of the input signal in response to the motion detection signal. The gain of the level adjuster 2317 has a complementary relationship with that of the level adjuster 2306 at the emphasis side so that the video signal is not subjected to distortions. Thus, when the gain of the level adjuster 2306 is 1, the gain of the level adjuster 2317 is set at 1/1. The input signal passing through the level adjuster 2317 is applied to the horizontal low-band filter 2311 and horizontal high-band filter 2312: the low-band components are outputted without change from the low-band filter 2311; and the horizontal high-band components are deemphasized by the temporal high-band deemphasis filter 2314 which is a reverse filter of the temporal high-band emphasis filter 2303. Thus, the video signal is reproduced and the transmission noises are suppressed.

The emphasis and deemphasis circuits of the first embodiment handle only horizontal components. As a result, the transmission signal can be subjected to waveform distortions such as the truncation noises or the like during the FM transmission of the high definition images, and hence, it is impossible for the emphasis circuit to achieve large emphasis. This restricts the improvement of the S/N ratio.

In contrast, the second embodiment and the improved variation thereof have an advantage that it can greatly improve the S/N ratio by suppressing the truncation noises because it does not deteriorate the video signal in the still picture domain where a high resolution is required. Moreover, further improvement in S/N ratio can be achieved by simultaneously using the horizontal emphasis and deemphasis circuits.

4. DESCRIPTION OF TRANSMITTING/RECEIVING PORTIONS FOR REDUCING INTERFERENCE

As shown in FIG. 1A, the broad bandwidth television signal (second television signal) is converted into the narrow band multiple sub-sampled signal (third television signal) by the encoder 101, and then compensated by the characteristic compensating portion 102 according to the characteristics of the transmission line. The compensated signal is supplied to the transmitting portion 103, which arranges the frequency allocation of the modulated transmission signals so as to reduce the interference, and transmits the signals. At the receiving end shown in FIG. 1B, the receiving portion 105 demodulates the received signal having the above frequency allocation.

This adjustment of the transmission frequency allocation is carried out for the following reason: when the broad bandwidth television signal is transmitted by a terrestrial broadcasting system, an idle channel of the conventional television broadcasting system (for example, NTSC system) may be used; in such a case, the interference between the broad bandwidth television signal and a conventional television signal transmitted from another station through the same channel will occur; and so the interference must be reduced by some measures.

To accomplish this, the following steps are taken when producing the transmission signals by modulating the narrow band multiple sub-sampled signal (called HDTV signal, hereafter), i.e., the narrow band signal of the broad bandwidth television signal such as HDTV (High Definition Television).

(1) A blank domain is provided near the video carrier of the conventional broadcasting system (NTSC system).

(2) The high-band and low-band components of the sub-sampled signal are allocated to both the upper and lower frequency bands of the blank domain.

(3) The carrier frequency modulated by the sub-sampled signal is specified different from those of the video and audio signals of the conventional television system.

The transmitting portion 103 carries out the modulation to satisfy the above frequency allocation. This will reduce the interference between the HDTV RF signal and the conventional RF television signal broadcasted by the same channel.

As conventional methods for reducing the interference between signals transmitted by the same channel of the terrestrial television broadcasting system, the VSB-AM (Vestigial Sideband Amplitude Modulation) system, and the HDTV system ("Spectrum Compatible HDTV System") of Zenith Corporation proposed as one of the HDTV terrestrial broadcasting systems in the United State are known.

The VSB-AM system uses "offset carrier system" which reduces the interference by slightly shifting the respective carrier frequencies. The Zenith system, on the other hand, reduces the interference of signals of the same channel as follows: the low-band components of the modulated signal are converted into digital data, and then time division multiplexed to the vertical retrace interval; the high-band components undergo quadrature modulation using the carrier located at the center of the channel. Furthermore, to mask the interference of the digital data onto the NTSC broadcasting of the same channel, the digital data are frame synchronized with the NTSC television signal so that the period of interference by the digital data coincides with the vertical retrace interval of the NTSC signal.

The terrestrial broadcasting systems of the conventional television systems use every other channel for transmission to prevent interference in the same channel.

The conventional offset carrier system has a drawback that it cannot solve the interference between the HDTV broadcasting and the conventional broadcasting in the same channel when the television broadcasting such as HDTV is carried out by using an idle channel. More specifically, to achieve the effective reduction of the interference of the same channel by the offset carrier system, the line frequency and field frequency of the two systems must be equal. However, these are different in the conventional broadcasting system and in the HDTV system, and hence, the effective reduction of interference is small in the offset carrier system.

On the other hand, in the Zenith system, the television signals must be frame locked with each other: if not, the interference image corresponding to the digital data appears on the screen. To prevent the interference among three or more stations, all the television signals must be frame locked. This suggests that improvement of the interference by the frame synchronization can be achieved only when one other station uses the same channel, but cannot be achieved when two or more stations uses the same channel.

Furthermore, the major components of interference from the NTSC signal, that is, the low-band components of the NTSC signal, interferes with the frequency 1.75 MHz apart from the carrier frequency of the HDTV broadcasting.

As described above, the Zenith system cannot deal with the interference from two or more conventional broadcasting stations because this system necessitates the frame phase synchronization between the HDTV and the conventional broadcasting.

Moreover, the Zenith system presents a problem that it cannot sufficiently improve the interference caused by the low-band components of the HDTV signal and added to the conventional broadcasting. This is because the improvement is mainly executed by utilizing the characteristics of vision.

In light of this, the present invention provides a system that can reduce the interference by using the modulation processing or the like to achieve the above-mentioned frequency allocation with a rather simple circuit arrangement, and makes it possible to transmit the HDTV television signal or the like by employing an idle channel of the conventional broadcasting system.

Moreover, the present invention provides a system which requires no coincidence of the line frequency or field frequency, or no frame locking, and which does not suffer from the interference from the low-band components of the NTSC signals.

Furthermore, the present invention provides a system that can reduce the interference irrespective of the line frequency, field frequency, etc., by attenuating the interference components.

Embodiments of the transmission frequency allocation method and system according to the present invention will now be described.

4.1 THE THIRD EMBODIMENT AND VARIATIONS THEREOF

The third embodiment is characterized in that it separates the low band and high band of the input television signal, and reverses the spectrum of the low band in the course of frequency multiplexing so that the low band components of the television signal are located at the lowest part of the television channel, thus reducing the interference with the NTSC broadcasting of the same channel.

DESCRIPTION OF THE THIRD EMBODIMENT

The third embodiment will be described with reference to the accompanying drawings.

Figure 24A:
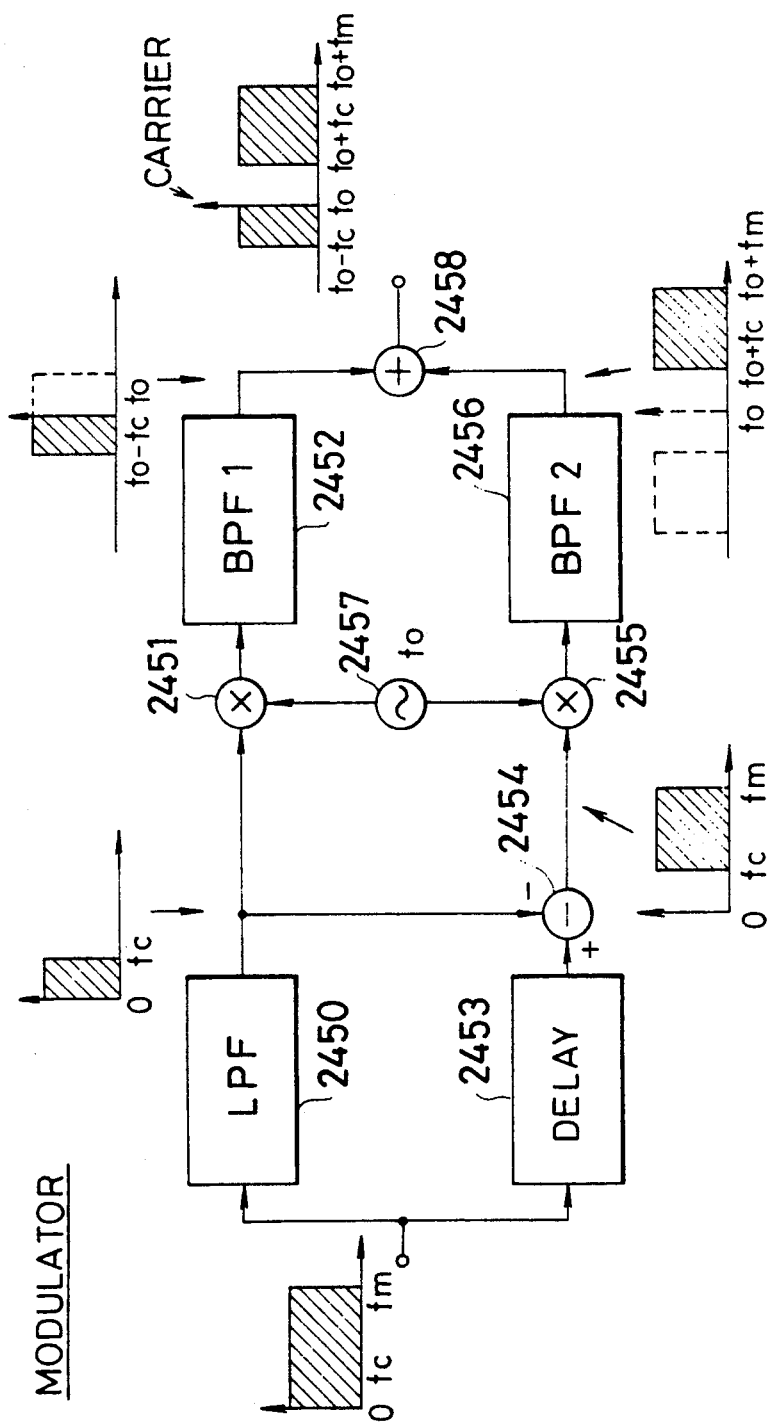
FIGS. 24A and 24B are block diagrams showing arrangements of the modulator and demodulator, respectively, of the third embodiment according to the present invention.
Figure 24B:
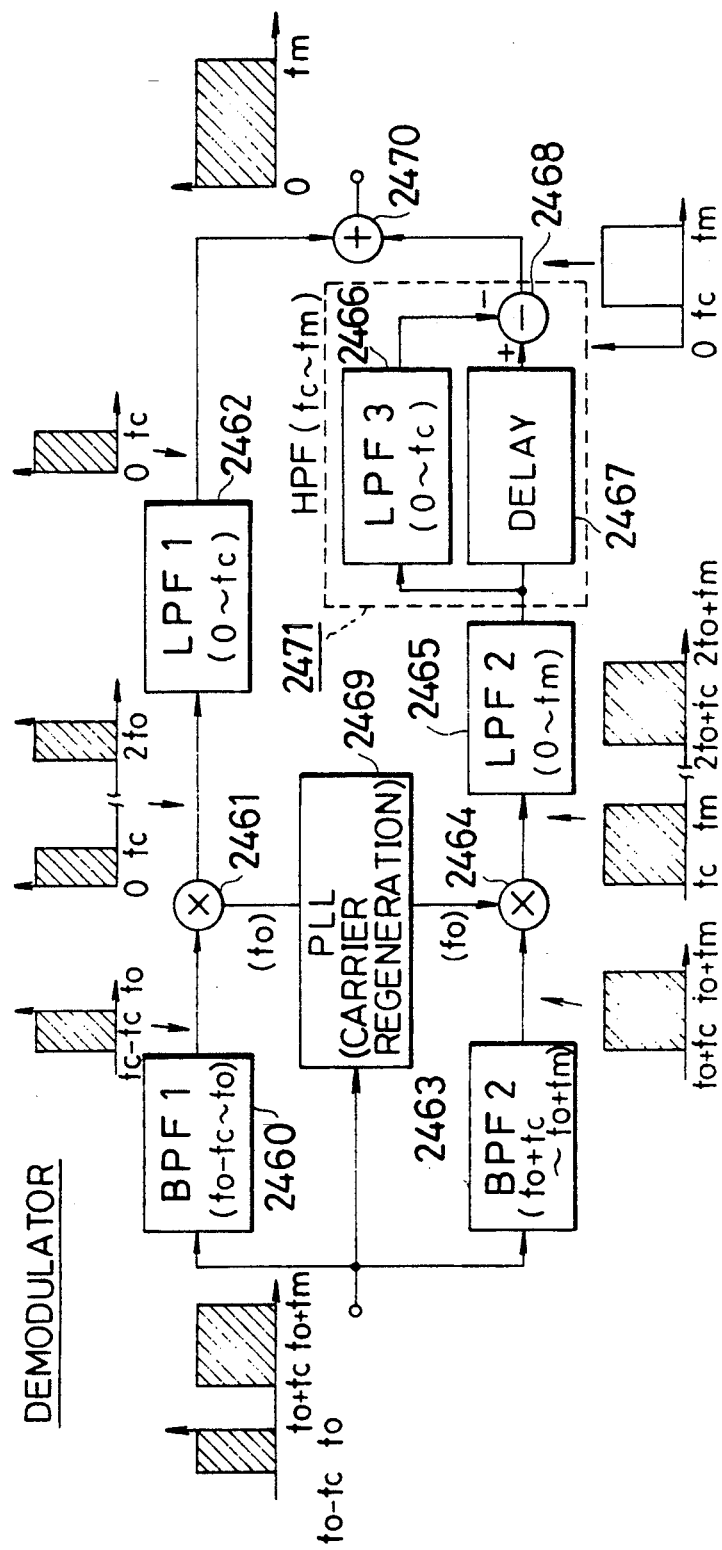
Figure 25A:
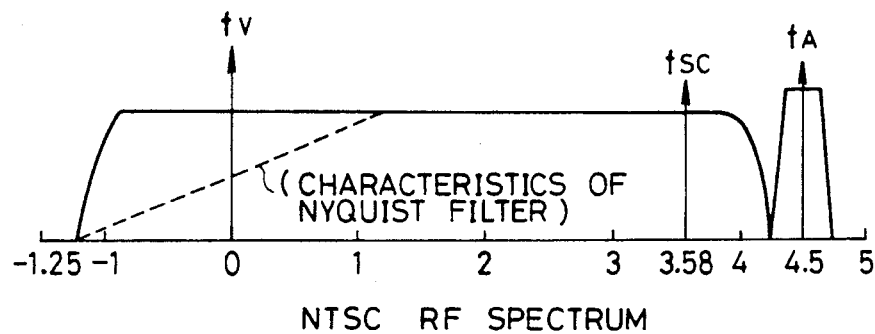
FIGS. 25A-25D illustrate the channel interference that takes place between the HDTV RF signal and the NTSC broadcasting signals of the same channel when the HDTV signal is transmitted by using the modulator and demodulator shown in FIGS. 24A and 24B.
Figure 25B:
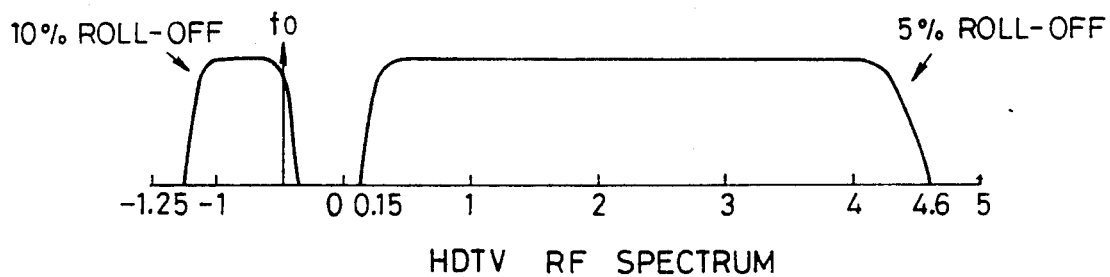
Figure 25C:
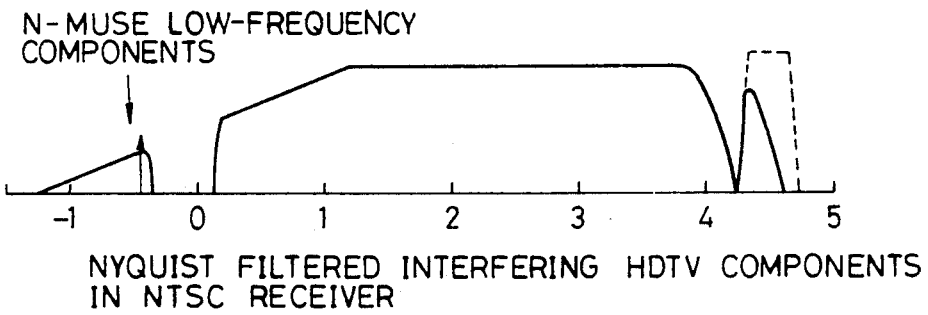
Figure 25D:
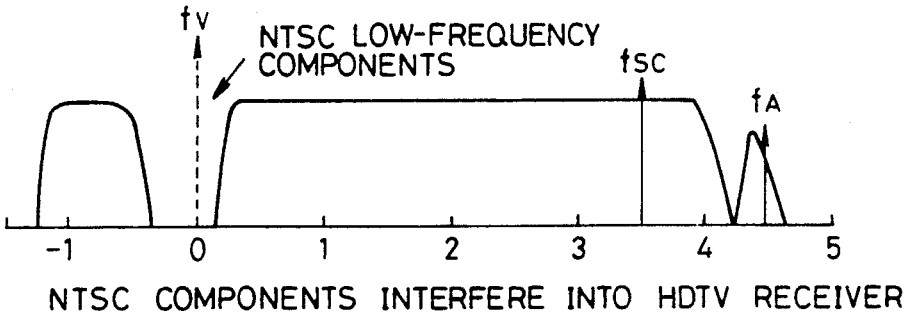

FIGS. 24A and 24B are block diagrams of the modulator and demodulator, respectively, to which the present invention is applied. In this embodiment, a BEF (Band-Elimination Filter) is constructed by using an LPF (Low-Pass Filter) and a BPF (Band-Pass Filter) to facilitate the manufacturing. However, it is possible to arrange the modulator by using a VSB-AM modulator and a BEF.

The modulator shown in FIG. 24A, separately handles the low-band components and high-band components of the input television signal. The low-band components extracted by a LPF 2450 are modulated onto the carrier of frequency $f_o$, and then enter a first BPF 2452 which filters out the upper sideband and passes the lower sideband. On the other hand, the high-band components, which are obtained as the difference between the input and output of the LPF 2450, are modulated onto the identical carrier used by the low-band components, and then enter a second BPF 2456 which filters out the lower sideband and passes the upper sideband. The two sidebands are frequency multiplexed.

The demodulator shown in FIG. 24B operates in the order reverse to that of the modulator shown in FIG. 24B. The carrier used for synchronizing demodulation is reproduced by a PLL circuit 2469.

FIGS. 25A–25D illustrate the channel interference that takes place between the HDTV and NTSC broadcasting RF signals of the same channel when the HDTV signal is transmitted by the modulator and demodulator shown in FIGS. 24A and 24B.

First, the interference from the HDTV RF broadcasting signal to the NTSC RF broadcasting signals is described. The low-band components which are the major factor of the interference are attenuated by approximately 10 dB through a Nyquist filter included in an NTSC receiver, thus reducing the interference. With regard to the audio signal band, although the highest-band components of the HDTV RF broadcasting signal enter the NTSC audio signal band, the former does not interfere with the latter because the amplitude of the former is negligibly small.

In contrast with this, the interference from the NTSC broadcasting RF signal to the HDTV broadcasting signal can be greatly reduced because the low-band components of the NTSC broadcasting RF signals are suppressed by a first HPF 2471 shown in FIG. 24B. Moreover the interference from the audio carriers of the NTSC RF broadcasting signals are reduced by a second low-pass filter 2465.

A FIRST VARIATION OF THE THIRD EMBODIMENT

Figure 26A:
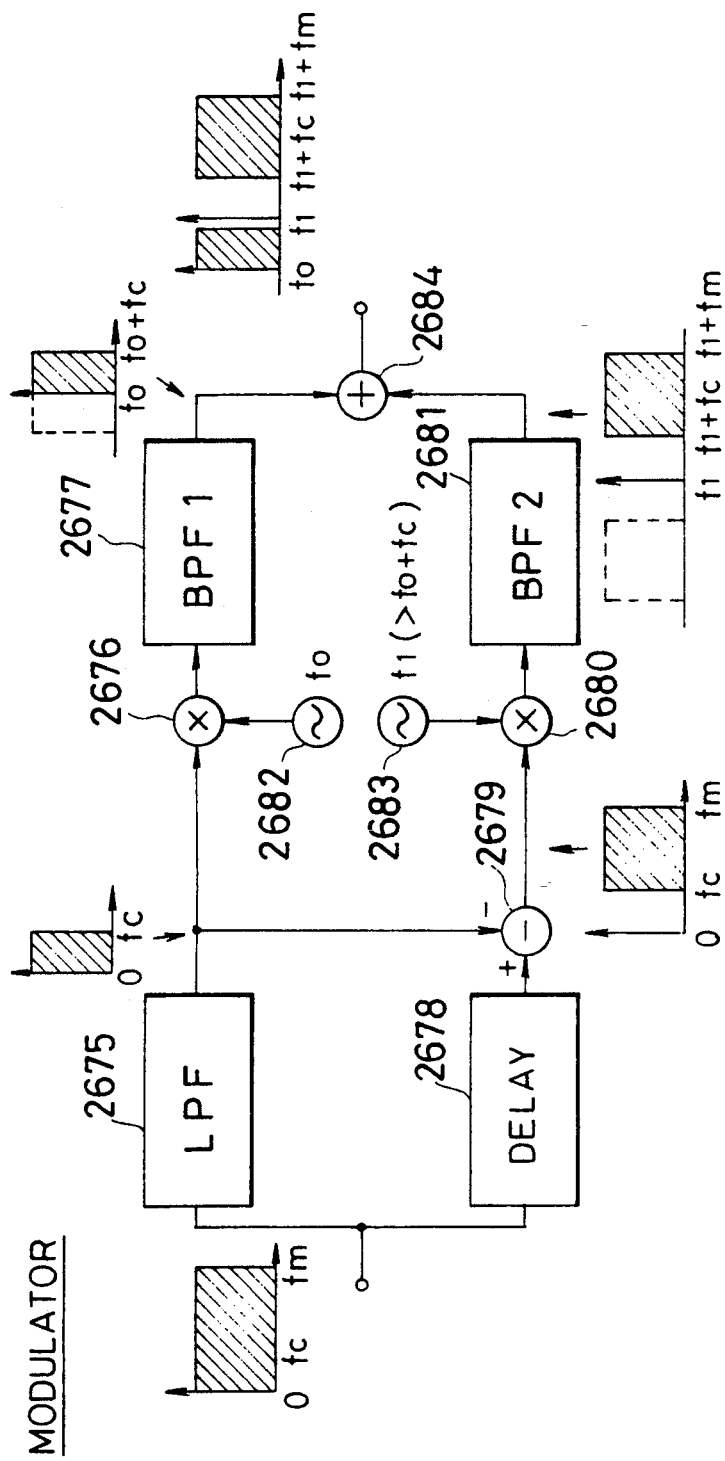
FIGS. 26A and 26B are block diagrams showing arrangements of the modulation and demodulation, respectively, of a first variation of the third embodiment.
Figure 26B:
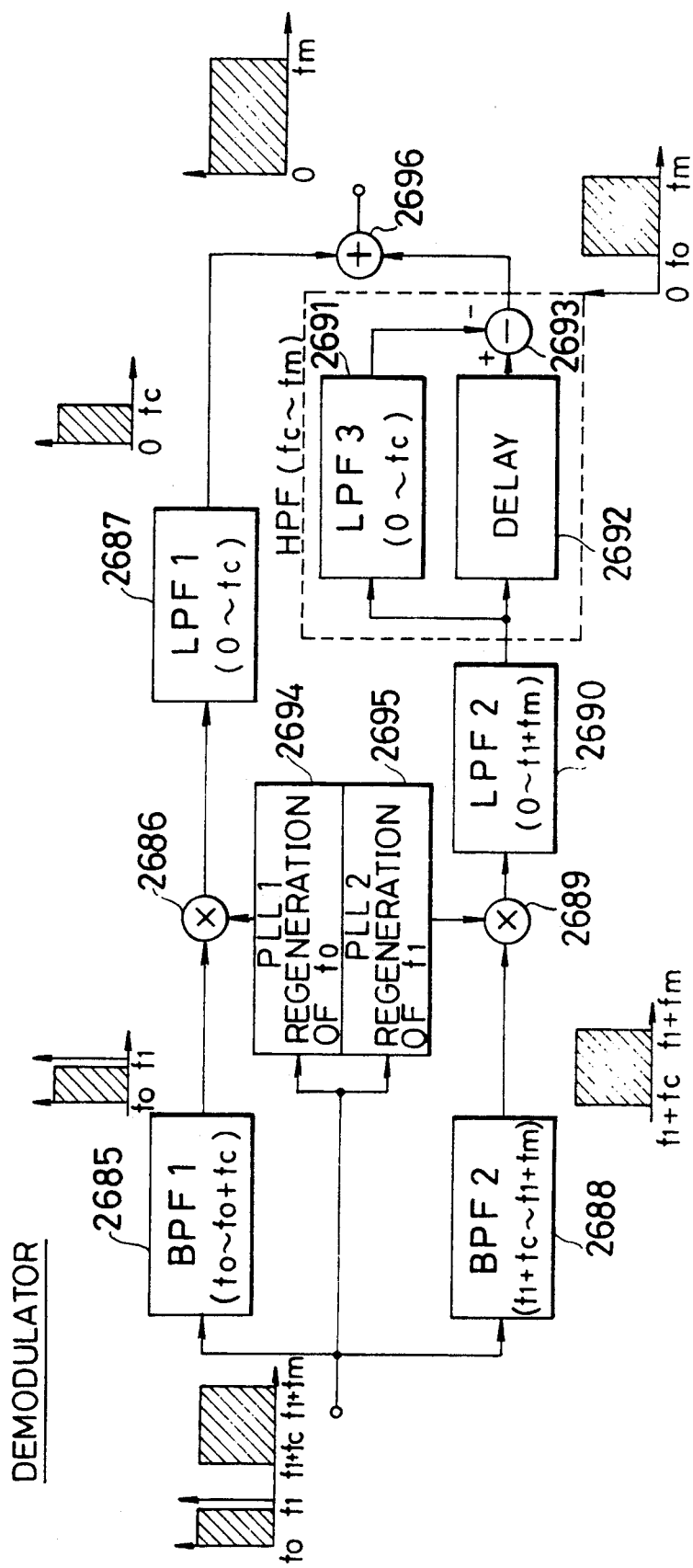
Figure 27A:
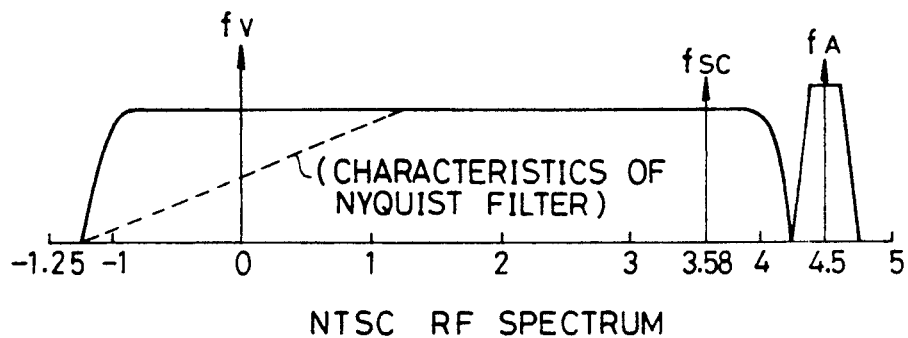
FIGS. 27A-27D illustrate the channel interference that takes place between the HDTV broadcasting RF signal and the NTSC broadcasting RF signals of the same channel when the HDTV signal is transmitted by using the modulator and demodulator shown in FIGS. 26A and 26B.
Figure 27B:
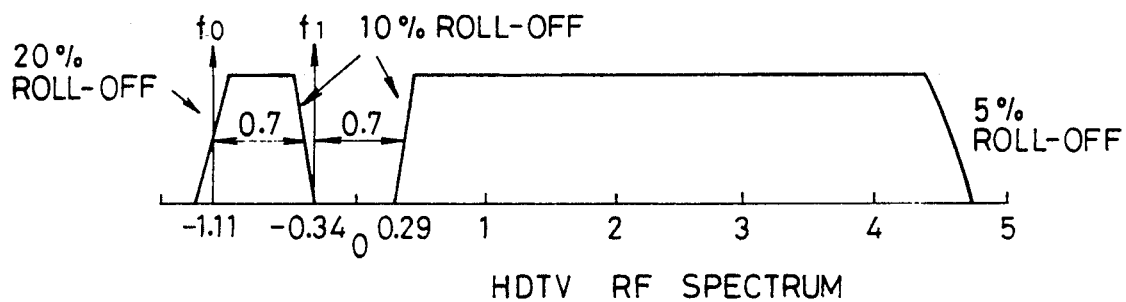
Figure 27C:
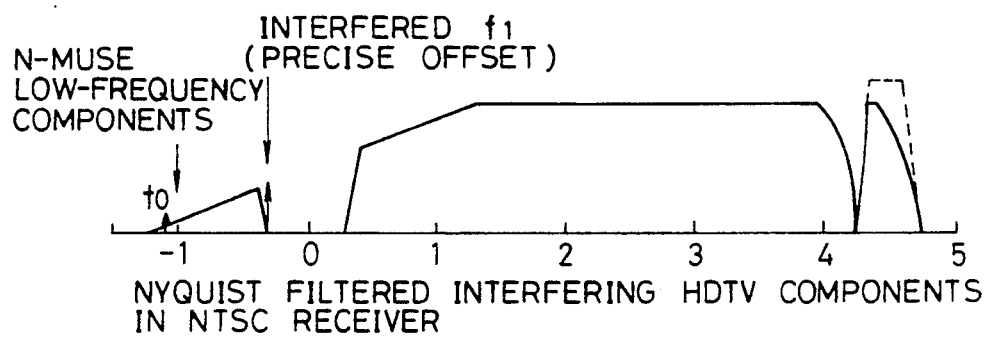
Figure 27D:
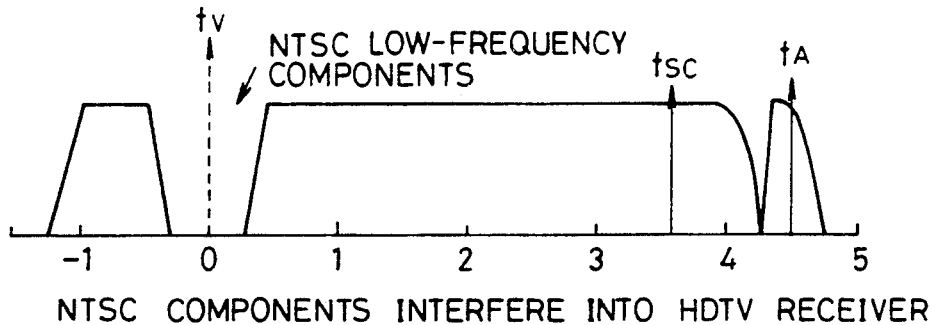

FIGS. 26A and 26B show arrangements of a modulation and a demodulation of a first variation of the third embodiment, respectively. This variation in FIGS. 26A and 26B uses two carriers to simplify the synchronizing demodulation.

In FIG. 26A, the low-band components are modulated onto the carrier of frequency $f_o$, and are produced as an SSB (Single Sideband Modulation) signal from a first BPF 2677. The carrier is also transmitted to facilitate the synchronous detection in the demodulator. On the other hand, the high-band components are modulated onto the carrier of frequency $f_1$, and are applied to a second BPF 2681 so that only the upper sideband is produced. The carrier is also transmitted. The carrier of frequency $f_1$ must play a role of DC (Direct Current) in the baseband with regard to the high-band components. Finally the two components are frequency multiplexed in order 2684.

The demodulator shown in FIG. 26B operates in the order reverse to that of the modulator. The low-band components are synchronously detected by using the carrier of frequency $f_o$ reproduced by a first PLL circuit 2694. A first LPF 2687 functions so as to delete the image interference and the $f_1$ carrier. The high-band components are synchronously detected by using the carrier of frequency $f_1$ reproduced by a second PLL circuit 2695. A second LPF 2690 functions so as to delete the image interference caused by the synchronous detection. In addition, a third LPF 2691 deletes the interference components. The two components are added at the last stage, i.e., an adder 2696.

FIGS. 27A–27D illustrate the channel interference that takes place between the HDTV and NTSC broadcasting RF signals of the same channel when the HDTV signal is transmitted by the modulator and demodulator shown in FIGS. 26A and 26B.

First, the interference from the HDTV broadcasting RF signal to the NTSC broadcasting RF signals is described. The low-band components which are the major factor of the interference are attenuated by approximately 20 dB through a Nyquist filter provided in an NTSC receiver, thus reducing the interference. The interference by the $f_1$ carrier can be reduced by lowering the carrier level and by setting the frequency $f_o$ as a precise offset frequency.

In contrast with this, the interference from the NTSC broadcasting RF signal to the HDTV broadcasting RF signal can be reduced as in the description with reference to FIG. 24B. The level of improvement is also about the same.

SECOND VARIATION OF THE THIRD EMBODIMENT

Figure 28A:
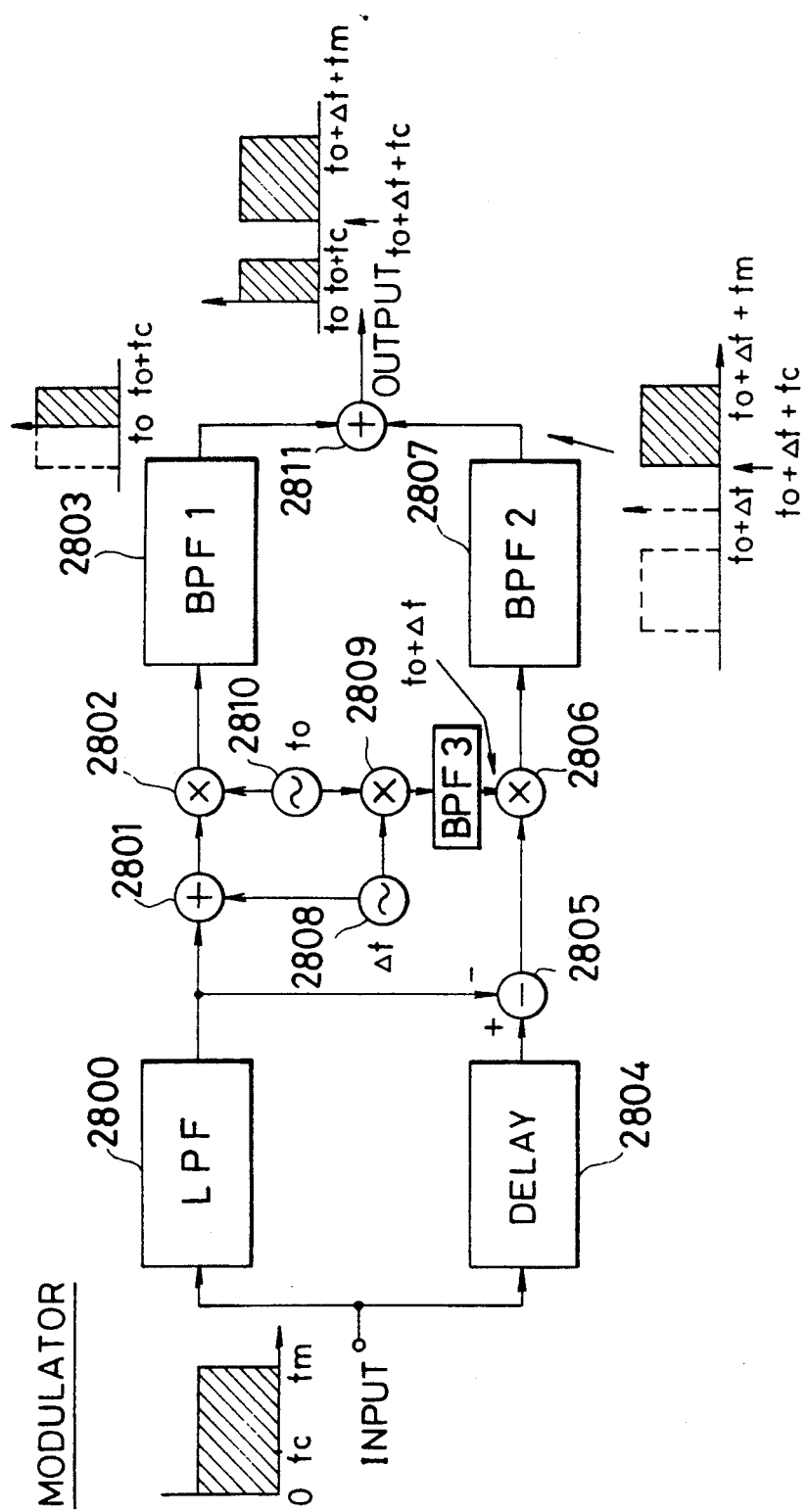
FIGS. 28A and 28B are block diagrams showing arrangements of the modulation and demodulation, respectively, of a second variation of the third embodiment.
Figure 28B:
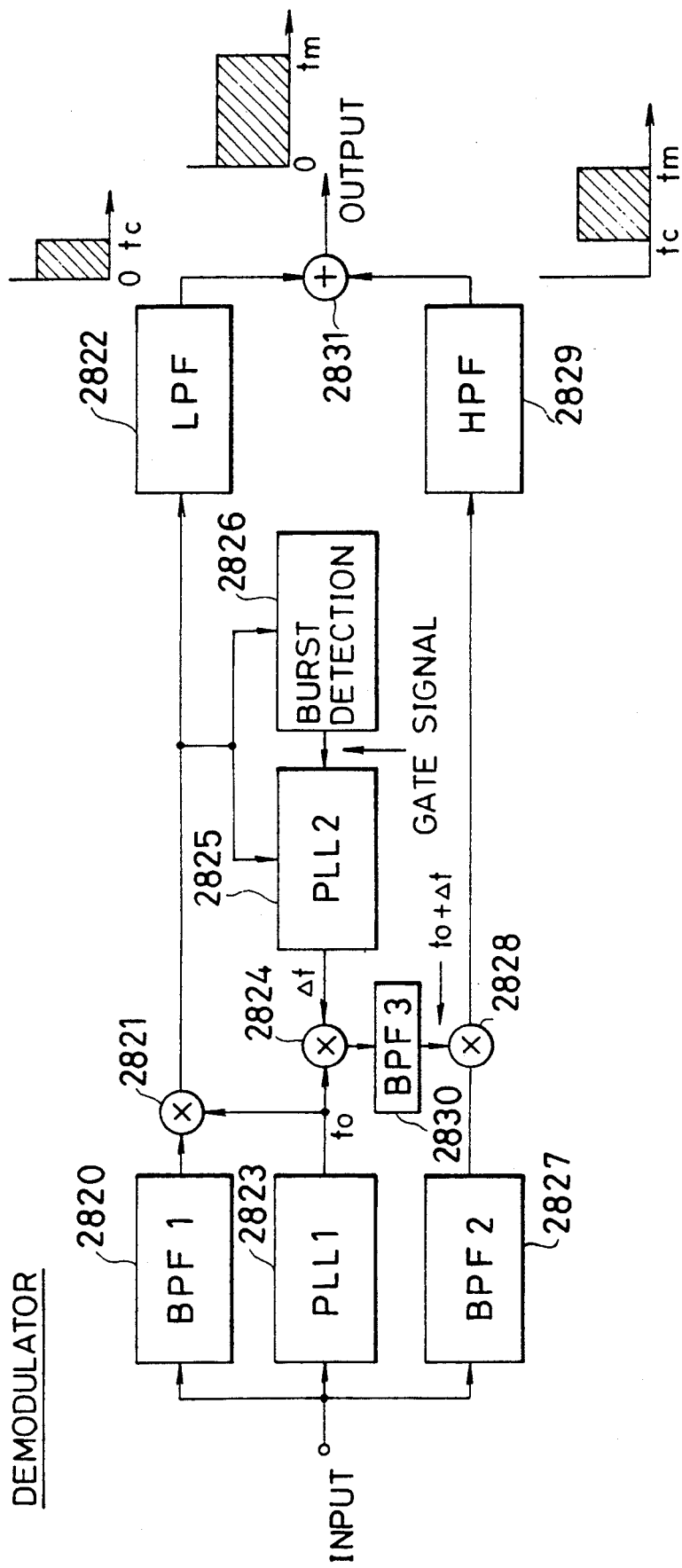

FIGS. 28A and 28B show arrangements of a modulation and a demodulation of a second variation of the third embodiment, respectively. Although the variation in FIGS. 26A and 26B uses two carriers to simplify the synchronous demodulation, this second variation achieves the modulation by only one carrier of frequency $f_o$. In this case, sinusoidal waves having a frequency corresponding to the frequency difference ($\Delta f$) between the modulation carrier of the high-band components and that of the low-band components are multiplexed in a burst form into idle lines in the vertical retrace interval.

In the demodulator shown in FIG. 28B, the low-band components are first synchronously demodulated by using the carrier of frequency $f_o$ reproduced by the first PLL circuit 2823. The $\Delta f$ burst is also demodulated and detected so to generate a gate signal. The gate signal intermittently controls the phase of a local oscillation of a second PLL circuit 2825 to reproduce the $\Delta f$ as a continuous wave. Subsequently, the $\Delta f$ and $f_o$ are multiplied so that $f_o + \Delta f$ is produced from a BPF 2830 in FIG. 28B, and the high-band components are synchronously demodulated by using the $f_o + \Delta f$.

According to this arrangement, the frequency allocations of the low band components and the high-band components can be rather easily adjusted. Furthermore, the relationship between the interference reduction and the cutoff frequency characteristics of the filters, which are in the trade-off relationship, can be optimized.

The interference behavior are similar to those illustrated in FIGS. 27A–27D except $f_1$.

4.2 DESCRIPTION OF A FOURTH EMBODIMENT

The fourth embodiment is characterized in that it separates the low-band components and high-band components of the input television signal, VSB-AM modulates the low-band components. Amplitude modulates the high-band components, and reverses the spectrum of the high-band components so as to provide a separation between the low-band and high-band modulated components, thus reducing the interference with the NTSC broadcasting RF signals of the same channel.

FOURTH EMBODIMENT

The fourth embodiment will be described with reference to the accompanying drawings.

Figure 29:
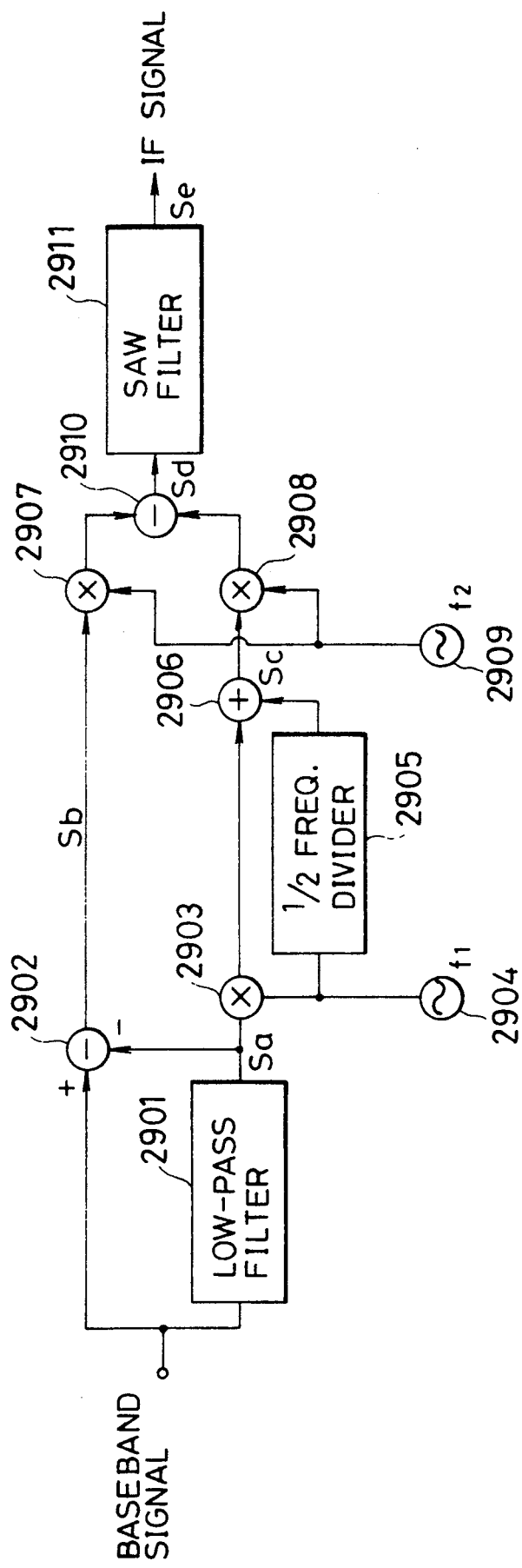
FIG. 29 is a block diagram showing an arrangement of a modulator according to the fourth embodiment of the present invention.

FIG. 29 is a block diagram showing an arrangement of a modulator according to the fourth embodiment of the present invention. In FIG. 29, a low-pass filter 2901 passes the low-band components of the video signal. Reference numeral 2902 designates a subtracter, and 2903 denotes a mixer. An oscillator 2904 oscillates at the difference frequency $f_1$ between carriers to be modulated by the high-band components and the low-band components. A frequency divider 2905 divides the frequency to $f_{178}$. Reference numerals 2906, 2907, 2908, 2909, 2910, and 2911 designate an adder, a mixer, a frequency converter, an IF frequency oscillator (oscillation frequency $f_2$), a synthesizer, and a SAW (Surface Acoustic Wave) band filter, respectively.

A baseband signal entering this modulator is first fed to the low-pass filter 2901 from which low-band component signal Sa is produced. At the same time, a high-band component signal Sb is produced from the subtracter 2902 by subtracting the low-band component signal Sa from the baseband signal.

The low-band component signal Sa is fed to the mixer 2903 so as to be modulated onto the carrier of frequency $f_1$. The modulated signal is applied to the adder 2906 and is added to the signal, for example, of $f_{178}$ frequency so as to facilitate the demodulation of the high-band components at the receiving end. After that, the frequency converter 2908 carries out the frequency conversion so that the carrier frequency is shifted to $f_1 + f_2$, and supplies the carrier of $f_1 + f_2$ to the synthesizer 2910.

On the other hand, the high-band component signal Sb is modulated onto the carrier of frequency $f_2$ by the mixer 2907, and is supplied to the synthesizer 2910.

The synthesized low-band component signal and high-band component signal have sidebands on either sides of the respective carriers. Each one of the sidebands is deleted by the SAW filter 2911 to form a television IF (Intermediate frequency) signal.

Figure 30A:
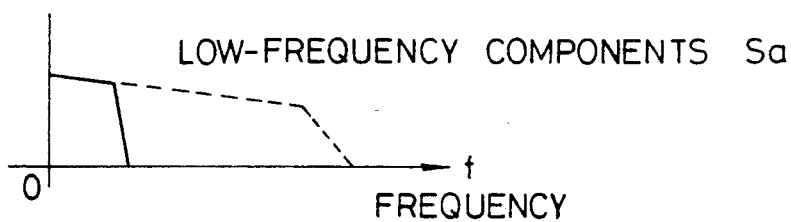
FIGS. 30A-30E are diagrams showing spectra of respective portions of the modulator shown in FIG. 29.
Figure 30B:
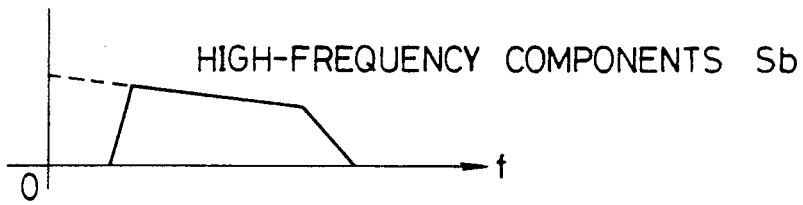
Figure 30C:
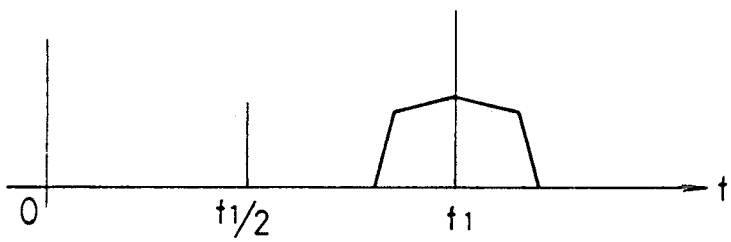
Figure 30D:
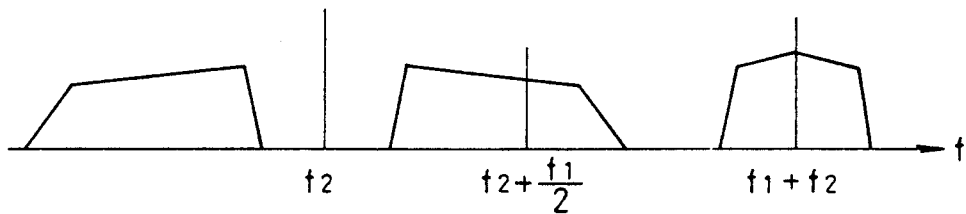
Figure 30E:
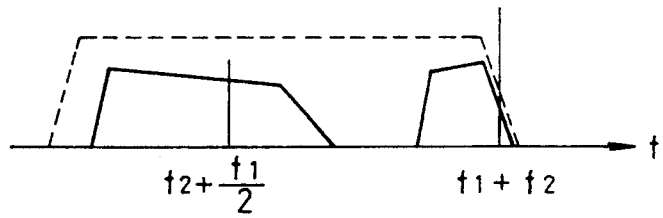

FIGS. 30A–30E show spectra of respective portions of the modulator shown in FIG. 29. In these figures, the characteristics of the SAW filter 2911 are shown in FIG. 30E by broken lines.

The HDTV IF signal produced from the modulator is converted into the frequency of a broadcasting channel (in the course of this conversion, the frequency allocation is reversed upside down). Then, at the receiving end, the signal is demodulated after it undergoes the frequency conversion into the IF signal.

Figure 31:
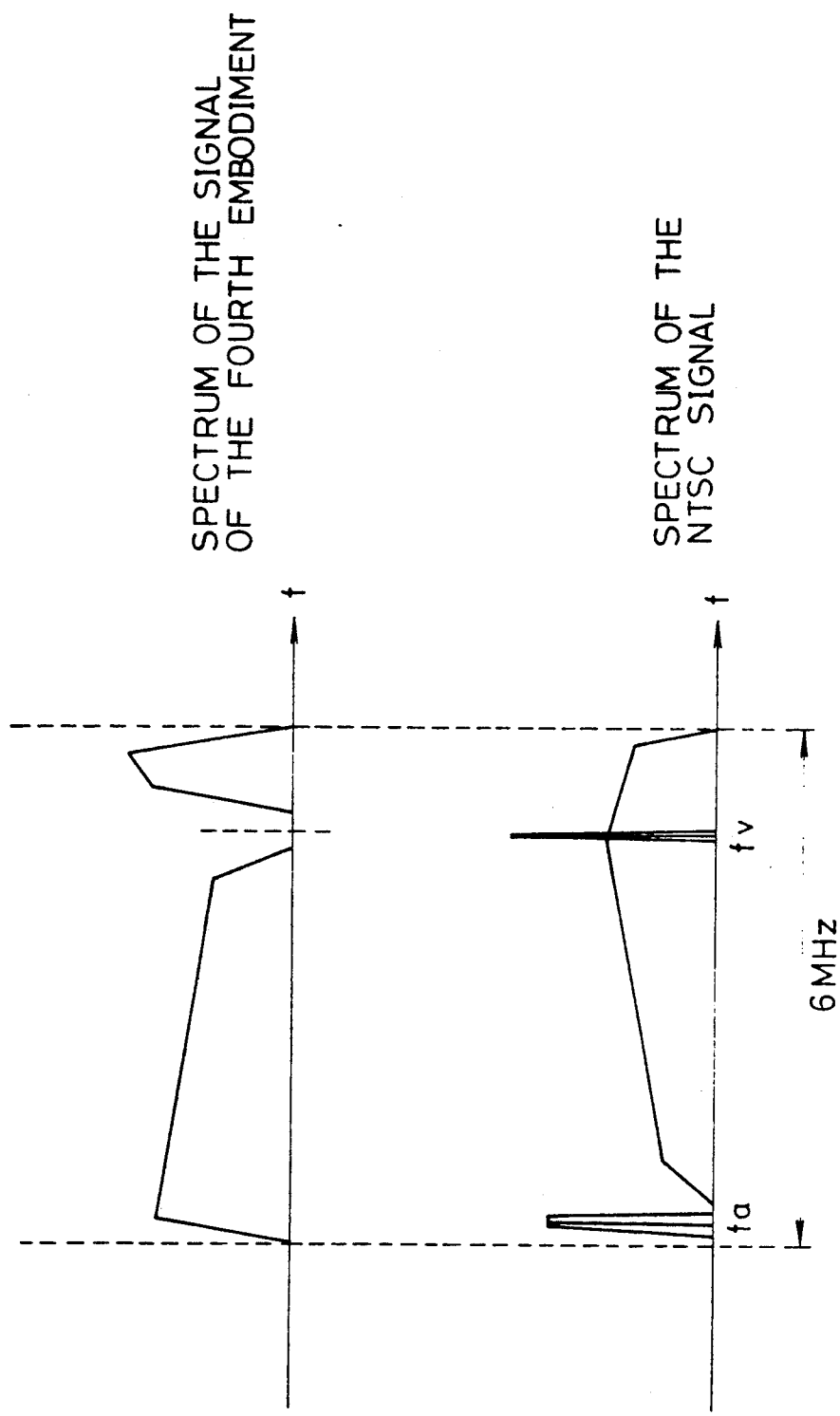
FIG. 31 is a diagram showing the frequency relationship, at the IF frequency band of a receiving end, between the HDTV modulation signal produced from the modulator shown in FIG. 29 and interference signals from the same channel of the conventional broadcasting system.

FIG. 31 shows the frequency relationship, at the IF frequency band of a receiving end, between the HDTV modulation signal produced from this modulator and interference signals from the same channel of the conventional broadcasting system.

In this embodiment, the frequency band around which the spectrum energy of the video carrier of the conventional broadcasting concentrates is not used. Consequently, the interference between the same channel from the conventional NTSC broadcasting RF signal to the HDTV broadcasting RF signal can be reduced.

In contrast with this, the interference from the HDTV broadcasting RF signal of the embodiment to the conventional NTSC broadcasting RF signal is as follows. The frequency band at the upper part of the channel to which the energy of the HDTV concentrates is attenuated by the Nyquist characteristics of an IF filter in a conventional NTSC receiver, thus reducing the interference to the screen image.

Furthermore, the mutual interference to the high frequency bands of their counterparts may occur by the high energy low-band components of the conventional and HDTV broadcasting systems. However, human vision is less sensitive to the high frequency interference, and so the interference seems to be reduced by the visual effect in this present embodiment.

Next, an embodiment of the demodulator for the modulated signal will be described with reference to FIG. 32.

Figure 32:
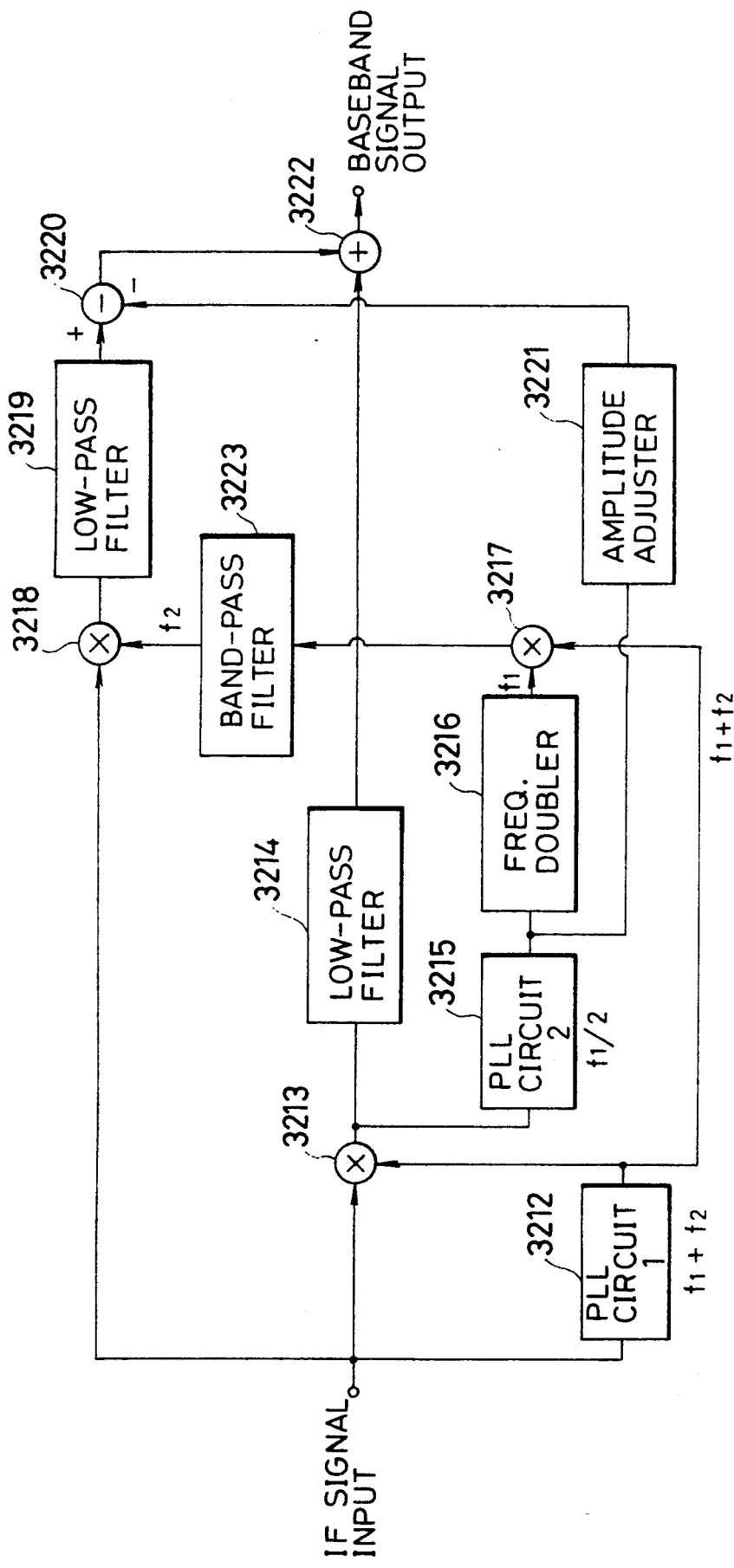
FIG. 32 is a block diagram showing an arrangement of a demodulator according to the fourth embodiment.
Figure 36A:
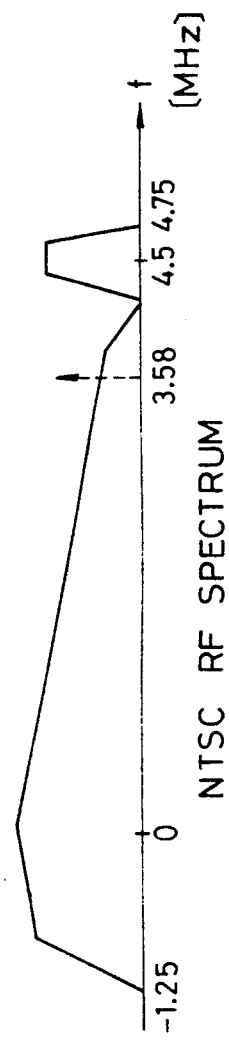
FIGS. 36A-36D illustrate the interference between the HDTV broadcasting signal and the NTSC broadcasting signals of the same channel when the HDTV RF signal of the fifth embodiment is transmitted by using a quadrature modulator as an analog modulator.
Figure 36B:
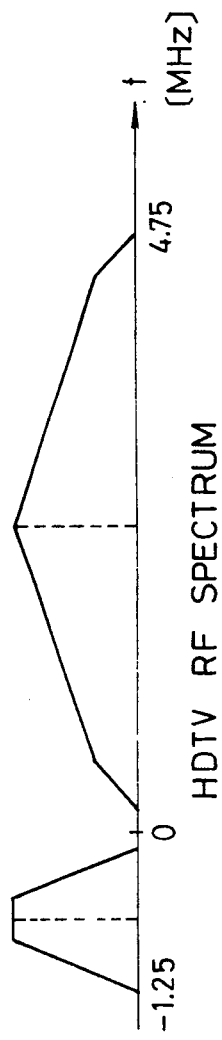
Figure 36C:
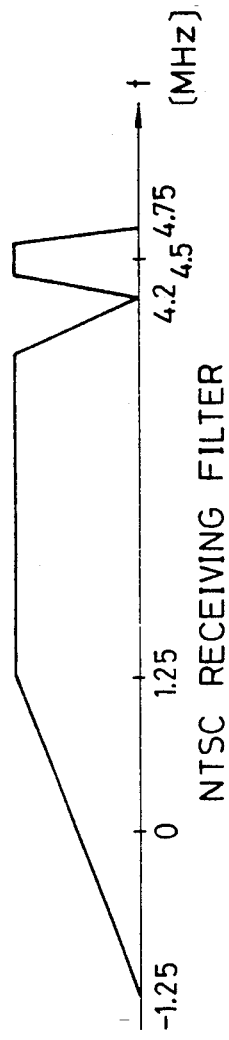
Figure 36D:
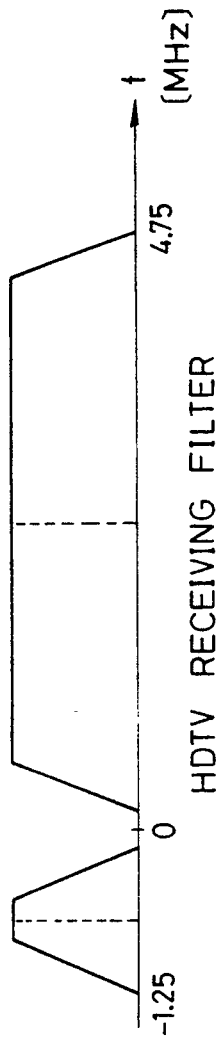

In FIG. 32, a PLL oscillating circuit 3212 generates a signal synchronizing in phase and frequency with the carrier of frequency $(f_1+f_2)$ of the low-band components. Reference numeral 3213 designates a multiplier, 3214 denotes a low-band filter for filtering the low-band components, 3215, a PLL oscillating circuit for synchronizing in phase and frequency with the pilot signal, 3216, a frequency doubler circuit, 3217, a frequency conversion circuit using a multiplier, and 3218 designates a demodulator using a multiplier.

Reference numeral 3219 designates a low-band filter for filtering high-band components of the demodulated signal. Reference numeral 3220 denotes a subtracter, 3221, a amplitude regulation circuit, 3222, a signal synthesizer, and 3223 designates a band-pass filter.

The demodulator shown in FIG. 32 operates as follows:

First, the IF signal is fed to the PLL circuit 212, which regenerates the carrier the frequency of which is $(f_1+f_2)$ in phase synchronization with the IF signal. The regenerated carrier and the input IF signal are supplied to the multiplier 3213, and the output of the multiplier 3213 is fed to the low-band filter 3214. Thus, the baseband low-band component signal is demodulated.

The output of the multiplier 3213 includes the pilot signal, which is extracted by a second PLL circuit 3215. The pilot signal is then doubled by the frequency doubler circuit 3216, and the signal of frequency $f_1$ is obtained. This signal is multiplied by the output of the first PLL circuit 3212, to produce the frequency $f_2$ component. The signal of frequency $f_2$ is extracted by the band-pass filter 3223 and is multiplied by the IF input signal to undergo the synchronous detection.

When the synchronously detected signal is passed through the low-band filter 3219 having the cutoff frequency of 4 MHz, the high-band component signal is obtained. This high-band component signal includes the pilot signal which must be canceled out. This cancellation is carried out by the subtracter 3220 by using the output of the PLL circuit 3215 the amplitude of which is adjusted by the amplitude adjusting circuit 3221.

In this case, a phase adjusting circuit is not necessary because the phase difference between the pilot signal and the output of the PLL circuit 3215 is maintained constant even if the frequency of the input signal changes.

The low-band component signal and the high-band component signal are synthesized by the synthesizer 3222, and the whole baseband signal is produced. Incidentally, although the present embodiment uses SSB modulation for modulating the high-band components, a similar effect can be achieved by using the known quadrature modulation.

4.3 FIFTH EMBODIMENT

A fifth embodiment is characterized in that it separates the low-band components and high-band components of the input television signal, digitally modulates the low-band components, analog modulates the high-band components, and provides a frequency gap between the digital modulation band and analog modulation band of the HDTV so that the video carrier of the same NTSC broadcasting channel is located between those two modulation bands. Thus, the low-band component spectrum, which is the major factor of the interference from the NTSC to HDTV broadcasting, is eliminated and the interference is reduced.

On the other hand, the interference from the HDTV to NTSC broadcasting is also reduced because the low-band components of the HDTV, which are the major factor of the interference from the HDTV to NTSC broadcasting, are located at the lowest part of the channel as the digital modulation band, and are reduced by a receiving filter incorporated in an NTSC receiver.

DESCRIPTION FIFTH EMBODIMENT

FIG. 33A shows a modulator and FIG. 33B shows a demodulator of the fifth embodiment. FIGS. 34A-34K illustrate one-dimensional spectra of various portions A-K shown in FIGS. 33A and 33B. FIGS. 35A-35D illustrate the characteristics of filters F1, F2, F3 and F3' shown in FIGS. 33A and 33B.

In the modulation processing, the modulation signal shown in FIG. 34A the bandwidth of which is fm is inputted to a first filter 3330 the LPF characteristics of which is shown in FIG. 35A, and the low-band components shown in FIG. 34B is obtained.

On the other hand, the high-band components shown in FIG. 34C can be obtained as the difference between the signals shown in FIGS. 34A and 34B. The low-band components are modulated by a digital modulator 3331. The spectrum of the signal produced by the digital modulation is shown in FIG. 34D. The digital modulation is carried out by using a modulation such as PSK (Phase-Shift Keying) or QAM (Quadrature Amplitude Modulation) under the condition that a carrier frequency is $f_1$ and a transmission bandwidth is B1.

At the same time, the high-band components are modulated onto the carrier of frequency $f_2$ by an analog modulator 3334, the spectrum of the output of which is shown in FIG. 34E or 34E'.

The spectrum shown in FIG. 34E is obtained when the signal shown in FIG. 34C is directly quadrature modulated. The spectrum shown in FIG. 34E' is obtained when the signal shown in FIG. 34C is first frequency shifted to the lower side by frequency fc (this is shown in FIG. 34C'), and then modulated by the analog modulator 3334. This reduces the required bandwidth.

Here, the quadrature modulation is used as an example. The SSB can be similarly used.

Finally, the modulated signal, the spectrum of which is shown in FIG. 34F or 34F', is produced by adding the digital modulation signal shown in FIG. 34D and the analog modulation signal shown in FIG. 34E or 34E'.

The two carriers the frequencies of which are $f_1$ and $f_2$, respectively, are chosen so that the video carrier of the same NTSC channel is fallen in the frequency gap between the digital modulation signal shown in FIG. 34D and the analog modulation signal shown in FIG. 34E or 34E'.

In the demodulation processing, the modulated signal shown in FIG. 34F or 34F' is converted into a digital modulation signal shown in FIG. 34G and an analog modulation signal shown in FIG. 34H or 34H' by using the second and third filters (BPFs) 3336 and 3338.

The digital modulation signal is demodulated by a digital demodulator 3337, and is produced as the low-band component signal shown in FIG. 34I. The analog modulation signal is demodulated by an analog demodulator 3339 which produces the signal shown in FIG. 34J or 34J'. The signal shown in FIG. 34J' is shifted to high-band side by frequency fc and becomes the high-band components shown in FIG. 34J'. The low-band components and the high-band components are added to produce the demodulated signal shown in FIG. 34K.

Incidentally, the embodiment described with reference to FIGS. 33A-35D can be applied not only to the HDTV broadcasting but also to other broadcasting.

FIGS. 36A-36D illustrate the interference with the same NTSC channel when the HDTV RF signal of the embodiment shown in FIGS. 33A-36D is transmitted. These figures show the spectra when a quadrature modulator is used as an analog modulator.

The interference from the HDTV to NTSC broadcasting RF signal can be reduced as follows: (1) the low-band components, which are the major factor of the interference and are located at the lowest part of the channel as digital modulation components, can be attenuated by a receiving filter in an NTSC receiver; and (2) the power of the digital modulation components is reduced to such a degree that transmission errors do not occur.

On the other hand, the interference from the NTSC to HDTV broadcasting RF signals can be prevented as follows: the low-band components of the NTSC signal, which are the major factor of the interference and are located at the frequencies between the digital modulation components and the analog modulation components of the HDTV broadcasting RF signal, are deleted by the second and third receiving filters 3336 and 3338 incorporated in the HDTV receiver. The middle-low components which are not removed can interfere with the digital modulation components. However, it poses no problem as long as the errors of the digital signal do not occur.

5. ENCODER/DECODER UTILIZING SYSTEMS

Figure 37:
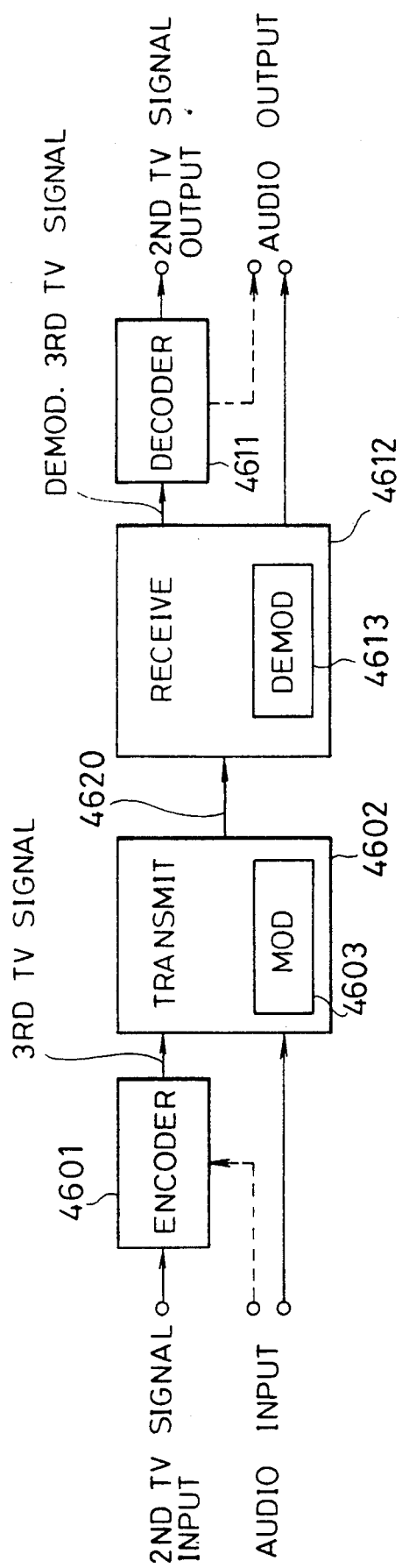
FIG. 37 is a block diagram showing an embodiment of a broad bandwidth television signal transmission system as an encoder/decoder utilizing system according to the present invention.

FIG. 37 shows an embodiment of a broad bandwidth television signal transmission system as an encoder/decoder utilizing system according to the present invention. In FIG. 37, reference numeral 4601 and 4611 denote the entire encoder including the portions 101 and 102 shown in FIG. 1A and the entire decoder including the portions 106 and 107 shown in FIG. 1B, respectively. The transmitting and receiving portions 4602 and 4612 correspond to the transmitting and receiving portions 103 and 105 in FIGS. 1A and 1B, respectively. Reference numerals 4602 and 4612 denote a transmitting portion having a modulator 4603 and a receiving portion having a demodulator 4613, respectively. Reference numeral 4620 denotes a transmission line such as a wireless transmission path including a broadcasting satellite system, a cable transmission system such as a CATV system, a coaxial cable system or a optical fiber cable system.

In FIG. 37, the encoder 4601 receives a second television signal input which is a high resolution television signal having a larger number of horizontal scanning lines, a broader frequency bandwidth and a larger aspect ratio of a display screen relative to a first television signal such as an NTSC television signal. The second television signal can be the 1125/60 color video signal which is applied to the analog to digital converter 401 in FIG. 4. The encoder 4601 outputs a third television signal, which is channel compatible with the first television signal, like the NTSC compatible signal from the digital to analog converter 408 in FIG. 4. The third television signal and an audio signal relating to the second television signal are applied to the transmitting portion 4602, in which the modulator 4603 modulates a transmitting carrier signal by the combined third television and audio signals.

The modulated output is transmitted through the transmission line 4620 to the receiving portion 4612, in which the demodulator 4613 demodulates the combined third television and audio signal. The demodulated third television signal is extracted from the combined third television and audio signal and applied to the decoder 4611, in which the second television signal is decoded and outputted. The demodulated audio signal is extracted from the combined third television and audio signal and used as the audio output signal.

The audio input signal may be applied to the encoder 4601 instead of the transmitting portion 4602, so that the audio signal is processed to be combined with the third television signal. In this connection, the audio output signal may be extracted in the decoder 4611 instead of the receiving portion 4612.

Figure 38:
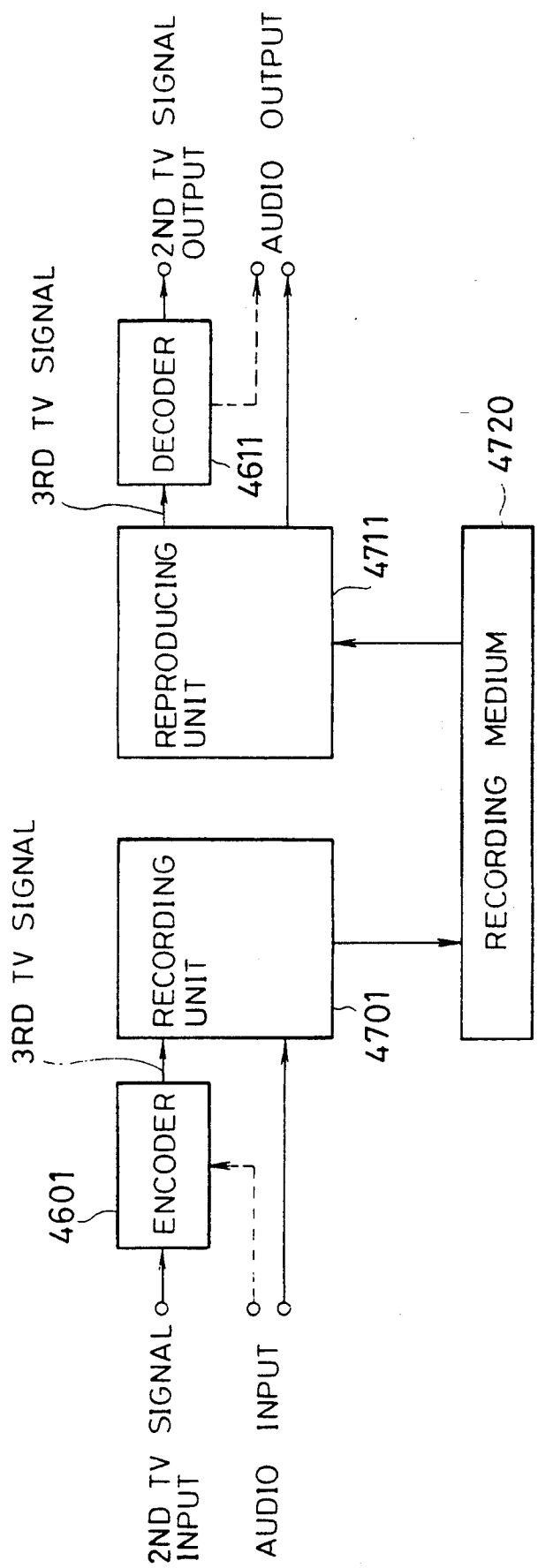
FIG. 38 is a block diagram showing an embodiment of a system for recording/reproducing a broad bandwidth television signal as an encoder/decoder utilizing system according to the present invention.

FIG. 38 shows an embodiment of a system for recording/reproducing a broad bandwidth television signal as an encoder/decoder utilizing system according to the present invention. In FIG. 38, the input second television signal is encoded by the encoder 4701 to output the third television signal which is channel compatible with the first television signal. The third television signal and the audio signal are applied to a recording unit 4701 for recording the combined third television and audio signal is recorded on a recording medium 4720 such as a magnetic disc or optical disc or a magnetic tape. The combined third television and audio signal thus recorded on the recording medium 4720 is reproduced by a reproducing unit 4711, from which the reproduced third television signal is derived. The third television signal is applied to the decoder 4611. The decoder 4611 decodes to output the second television signal. The audio output signal is derived from the reproducing unit 4720.

In FIG. 38, the audio signal can be processed in the encoder 4601 and the decoder 4611, as shown by the broken lines. In either embodiment, the audio signal can be processed in a conventional manner.

The invention has been described in detail with respect to preferred embodiments, and it will now be apparent from the foregoing to those skilled in the art that changes and modifications may be made without departing from the invention in its broader aspects, and it is intended therefore, in the appended claims to cover all such changes and modifications as fall within the true spirit of the invention.

What is claimed is:

1. An encoder for converting a second television signal into a third television signal, said second television signal being a broad bandwidth television signal having greater number of horizontal scanning lines and broader frequency bandwidth than those of a first television signal, said third television signal being a narrow bandwidth multiple sub-sampled time division multiplexed television signal the bandwidth of which is substantially equal to that of the first television signal, said encoder comprising:

multiple sub-sampling encoding means for converting, with bandwidth compression, a fourth television signal into a fifth television signal by using the multiple sub-sampling time division multiplexing technique, said fourth television signal having a greater number of horizontal scanning lines and broader frequency bandwidth than those of said second television signal, said fifth television signal having broader bandwidth than that of said first television signal and narrower bandwidth than that of said fourth television signal;

first converting means for converting said second television signal inputted to said first converting means into a sixth television signal having a signal format conforming to that of said fourth television signal, and for supplying the converted signal to said multiple sub-sampling encoding means; and second converting means for converting said fifth television signal outputted from said multiple sub-sampling encoding means into said third television signal.

2. An encoder as claimed in claim 1, wherein said first television signal is an NTSC standard television signal.

3. An encoder as claimed in claim 1, wherein said fourth television signal has substantially 1125 scanning lines, a field frequency of substantially 60 Hz, an aspect ratio of substantially 16:9, and a bandwidth of substantially 20 MHz.

4. An encoder as claimed in claim 1, wherein said second television signal has substantially 750 scanning lines, and an aspect ratio of substantially 16:9.

5. An encoder as claimed in claim 1, wherein said fifth television signal has a format conforming to that of the output of a standard MUSE encoder.

6. An encoder as claimed in claim 1, wherein said sixth television signal has a format conforming to that of the input of a standard MUSE encoder.

7. An encoder as claimed in claim 1, wherein said second television signal is produced by reducing the number of scanning lines of the fourth television signal.

8. An encoder as claimed in claim 1, wherein said multiple sub-sampling encoding means further includes an audio data signal of said third television signal.

9. An encoder as claimed in claim 1 further comprising a transmitting side transmission characteristic compensation portion comprising:

delay means having at least one of a plurality of delay times corresponding to a plurality of frequency bands specified in a signal transmission band; and weighting-synthesizing means for weighting and synthesizing an input signal to said delay means and a delayed signal produced from said delay means to produce a weighted-synthesized signal;

whereby the transmission characteristics for a plurality of said frequency bands in said signal transmission band is compensated.

10. An encoder as claimed in claim 9, wherein said transmission characteristic compensation portion further comprises horizontal band separating means and synthesizing means, and wherein said plurality of frequency bands are located at the regions the center frequencies of which are frame frequency fp multiplied by positive odd integers, and the delay time of said delay means is 1fp, said separating means divides an input signal into high-band components and low-band components, and applies the high-band components to said delay means, and said synthesizing means synthesizing said low-band components and the output of said weighting-synthesizing means to provide the synthesized signal as a compensated output signal.

11. An encoder as claimed in claim 10 further comprising motion detection means for detecting motion of images on the basis of the output signal from said time axis high-band emphasis means level adjusting means for adjusting the level of said second output signal in response to the motion detection signal outputted from said detection means, and motion detection signal transmission means for transmitting said motion detection signal to a receiving end, wherein said level adjusting means adjusts said second output signal from said synthesizer and produce the level adjusted signal as a third output signal.

12. An encoder as claimed in claim 9, wherein said transmission characteristic compensation portion further comprises a plurality of combination circuit means and a synthesizing means, each of said combination circuit means including said delay means having a delay time for each of said plurality of frequency bands, said weighting-synthesizing means, and a coefficient multiplying means, and wherein said synthesizing means synthesizes said input signal and respective output signals of said coefficient multiplying means, and outputs the synthesized signal as a second output.

13. An encoder as claimed in claim 12, wherein each of said combination circuit means further comprises a nonlinear circuit means for applying nonlinear processing to the output of said coefficient multiplying means, and wherein said synthesizing means synthesizes said input and respective output signals of said nonlinear circuit means.

14. An encoder as claimed in claim 12 further comprising a nonlinear circuit means, wherein said synthesizing means further comprises a first synthesizing means and a second synthesizing means, said first synthesizing means synthesizes the outputs of said weighting-synthesizing means, said nonlinear circuit means applies nonlinear processing to the output of said first synthesizing means, and said second synthesizing means synthesizes the input to said encoder and the output of said first synthesizing means.

15. A decoder for decoding a second television signal from a third television signal encoded by an encoder for converting a second television signal into a third television signal, said second television signal being a broad bandwidth television signal having greater number of horizontal scanning lines and broader frequency bandwidth than those of a first television signal, said third television signal being a narrow bandwidth multiple sub-sampled time division multiplexed television signal the bandwidth of which is substantially equal to that of the first television signal, said encoder having multiple sub-sampling encoding means for converting, with bandwidth compression, a fourth television signal into a fifth television signal by using the multiple sub-sampling time division multiplexing technique, said fourth television signal having a greater number of horizontal scanning lines and broader frequency bandwidth than those of said second television signal, said fifth television signal having broader bandwidth than that of said first television signal and narrower bandwidth than that of said fourth television signal; first converting means for converting said second television signal inputted to said first converting means into a sixth television signal having a signal format conforming to that of said fourth television signal, and for supplying the converted signal to said multiple sub-sampling encoding means; and second converting means for converting said fifth television signal outputted from said multiple sub-sampling encoding means into said third television signal; said decoder comprising:

multiple sub-sampling decoding means for decoding said sixth television signal from said fifth television signal which is bandwidth compressed by using said multiple sub-sampling time division multiplexing technique;

third converting means for converting said third television signal inputted thereto into said fifth television signal, and for supplying the converted signal to said multiple sub-sampling decoding means; and fourth converting means for converting said sixth television signal outputted from said multiple sub-sampling decoding means into said second television signal.

16. A decoder as claimed in claim 15, wherein said second television signal has substantially 750 scanning lines, and an aspect ratio of substantially 16:9.

17. A decoder as claimed in claim 15, wherein said fifth television signal has a format conforming to that of the output of a standard MUSE encoder.

18. A decoder as claimed in claim 15, wherein said sixth television signal has a format conforming to that of the input of a standard MUSE encoder.

19. A decoder as claimed in claim 15, wherein said multiple sub-sampling decoding means decodes an audio data signal when said third television signal contains said audio data signal.

20. A decoder as claimed in claim 15 further comprising a line number converter for converting said second television signal into said fourth television signal the number of scanning lines of which is 1125.

21. A decoder as claimed in claim 9 further comprising a receiving side transmission characteristic compensation portion comprising:

delay means having at least one of a plurality of delay times corresponding to a plurality of frequency bands specified in a signal transmission band; and weighting-synthesizing means for weighting and synthesizing an output signal of said delay means and an input signal to said weighting-synthesizing means to form a weighted-synthesized signal, which is fed to said delay means, and which is produced as the output signal of said transmission characteristic compensation portion;

whereby the transmission characteristics for a plurality of said frequency bands in said signal transmission band is compensated.

22. A decoder as claimed in claim 21, wherein said transmission characteristic compensation portion comprises a plurality of combination circuit means and a first synthesizing means, each of said combination circuit means including said delay means having delay time for each of said plurality of frequency bands, and a coefficient multiplying means, and wherein said first synthesizing means synthesizes respective output signals of said coefficient multiplying means, and said weighting-synthesizing means weights and synthesizes said input signal to said weighting-synthesizing means and the output of said first synthesizing means and outputs the synthesized signal as a compensated output.

23. A decoder as claimed in claim 22, wherein each of said combination circuit means further comprises a nonlinear circuit means for applying nonlinear processing to the output of said coefficient multiplying means, and wherein said first synthesizing means synthesizes respective output signals of said nonlinear circuit means.

24. A decoder as claimed in claim 22, wherein said transmission characteristic compensation portion further comprises nonlinear circuit means for applying nonlinear processing to the output of said first synthesizing means, wherein the output of said nonlinear circuit means is supplied to said weighting-synthesizing means.

25. A decoder as claimed in claim 21, wherein said transmission characteristic compensation portion further comprises horizontal band separating means and synthesizing means, and wherein said plurality of frequency bands are located at the regions the center frequencies of which are frame frequency fp multiplied by positive odd integers, and the delay time of said delay means is 1/fp, said separating means divides the input signal to said horizontal band separating means into high-band components and low-band components, and applies the high-band components to said weighting-synthesizing means, and said synthesizing means synthesizes said low-band components and the output of said weighting-synthesizing means to provide the synthesized signal as a compensated output signal.

26. A decoder as claimed in claim 25, wherein said transmission characteristic compensation portion further comprises receiving means for receiving a motion detection signal transmitted from a transmitting end, and level adjusting means for adjusting the level of a received signal in response to said motion detection signal, and wherein the level adjusted received signal is fed to said separating means.

27. A transmitting apparatus having an encoder for converting a second television signal into a third television signal, a transmitting side transmission characteristic compensation portion, and a transmitting portion for transmitting said third television signal thereby to improve the same channel interference characteristics with a first television signal broadcasting, said second television signal being a broad bandwidth television signal having greater number of horizontal scanning lines and broader frequency bandwidth than those of a first television signal, said third television signal being a narrow bandwidth multiple sub-sampled time division multiplexed television signal the bandwidth of which is substantially equal to that of the first television signal, said encoder comprising:

multiple sub-sampling encoding means for converting, with bandwidth compression, a fourth television signal into a fifth television signal by using the multiple sub-sampling time division multiplexing technique, said fourth television signal having a greater number of horizontal scanning lines and broader frequency bandwidth than those of said second television signal, said fifth television signal having broader bandwidth than that of said first television signal and narrower bandwidth than that of said fourth television signal;

first converting means for converting said second television signal inputted to said first converting means into a sixth television signal having a signal format conforming to that of said fourth television signal, and for supplying the converted signal to said multiple sub-sampling encoding means; and second converting means for converting said fifth television signal outputted from said multiple sub-sampling encoding means into said third television signal, said transmitting side transmission characteristic compensation portion comprising:

delay means having at least one of a plurality of delay times corresponding to a plurality of frequency bands specified in a signal transmission band; and weighting-synthesizing means for weighting and synthesizing an input signal to said delay means and a delayed signal produced from said delay means to produce a weighted-synthesized signal;

whereby the transmission characteristics for a plurality of said frequency bands in said signal transmission band is compensated, and said transmitting portion comprising:

separating means for separating said third television signal into low-band components and high-band components;

low-band component modulation and allocation means for assigning the lower sideband region of the frequency spectrum of the modulated transmission wave of said first television signal as the frequency band of the modulated transmission wave of said low-band components, said lower sideband region excluding the neighboring region of the video carrier of said first television signal;

high-band component modulation and allocation means for assigning the upper sideband region of the frequency spectrum of the modulated transmission wave of said first television signal as the frequency band of the modulated transmission wave of said high-band components, said upper sideband region excluding the neighboring region of the video carrier of said first television signal; and synthesizing means for synthesizing the output of said low-band component modulation and allocation means, and the output of said high-band component modulation and allocation means.

28. A transmitting apparatus as claimed in claim 27, wherein said modulated transmission wave of said low-band components is a VSB-AM wave, said modulated transmission wave of said high-band components is a SSB wave the carrier of which is a first carrier of said VSB-AM wave, and the higher components of said low-band components are located at the lowest part of a television channel.

29. A transmitting apparatus as claimed in claim 27, wherein said modulated transmission wave of said low-band components is a VSB-AM wave, said modulated transmission wave of said high-band components is a SSB wave the carrier of which is a second carrier of said VSB-AM wave different from a first carrier, and the lower components of said low-band components are located at the lowest part of a television channel.

30. A transmitting apparatus as claimed in claim 29, wherein said second carrier is suppressed, and instead, a pilot signal is multiplexed within the band of said SSB signal and is transmitted, said pilot signal having a frequency predetermined corresponding to the difference of frequencies of said first and second carriers.

31. A transmitting apparatus as claimed in claim 30, wherein the lower portion of said high-band components in said SSB signal is located at the uppermost part of a television channel.

32. A transmitting apparatus as claimed in claim 27, wherein said low-band component modulation and allocation means modulates a first carrier by said low-band components using a digital modulation, and said high-band component modulation and allocation means modulates a second carrier by said high-band components using a quadrature modulation.

33. A transmitting apparatus as claimed in claim 32, wherein said high-band component modulation and allocation means modulates said second carrier by a high-band converted signal using a quadrature modulation, said high-band converted signal being produced by frequency converting said high-band components so that the lowest frequency of said high-band components is substantially zero.

34. A transmitting apparatus as claimed in claim 32, wherein said digital modulation is PSK.

35. A transmitting apparatus as claimed in claim 32, wherein said analog modulation is QAM.

36. A receiving apparatus having a decoder for decoding a second television signal from a third television signal encoded by an encoder, a receiving side transmission characteristic compensation portion, and a receiving portion for receiving said third television signal, said encoder converting a second television signal into a third television signal, said second television signal being a broad bandwidth television signal having greater number of horizontal scanning lines and broader frequency bandwidth than those of a first television signal, said third television signal being a narrow bandwidth multiple sub-sampled time division multiplexed television signal the bandwidth of which is substantially equal to that of the first television signal, said encoder having: multiple sub-sampling encoding means for converting, with bandwidth compression, a fourth television signal into a fifth television signal by using the multiple sub-sampling time division multiplexing technique, said fourth television signal having a greater number of horizontal scanning lines and broader frequency bandwidth than those of said second television signal, said fifth television signal having broader bandwidth than that of said first television signal and narrower bandwidth than that of said fourth television signal; first converting means for converting said second television signal inputted to said first converting means into a sixth television signal having a signal format conforming to that of said fourth television signal, and for supplying the converted signal to said multiple sub-sampling encoding means; and second converting means for converting said fifth television signal outputted from said multiple sub-sampling encoding means into said third television signal;

said decoder comprising:

multiple sub-sampling decoding means for decoding said sixth television signal from said fifth television signal which is bandwidth compressed by using said multiple sub-sampling time division multiplexing technique;

third converting means for converting said third television signal inputted thereto into said fifth television signal, and for supplying the converted signal to said multiple sub-sampling decoding means; and fourth converting means for converting said sixth television signal outputted from said multiple sub-sampling decoding means into said second television signal, said transmission characteristic compensation portion comprising:

delay means having at least one of a plurality of delay times corresponding to a plurality of frequency bands specified in a signal transmission band; and weighting-synthesizing means for weighting and synthesizing an input signal to said delay means and a delayed signal produced from said delay means to produce a weighted-synthesized signal;

whereby the transmission characteristics for a plurality of said frequency bands in said signal transmission band is compensated, and said receiving portion comprising:

low-band component demodulation means for extracting the frequency band of the modulated transmission wave of said low-band components of said third television signal, and for demodulating said low-band components of said third television signal;

high-band component demodulation means for extracting the frequency band of the modulated transmission wave of said high-band components of said third television signal, and for demodulating said high-band components of said third television signal; and synthesizing means for synthesizing the output of said low-band component demodulation means and the output of said high-band component demodulation means, thereby to form said third television signal.

37. A receiving apparatus as claimed in claim 36 further comprising at least one carrier regeneration means.

38. A receiving apparatus as claimed in claim 37, wherein said carrier regeneration means reproduces a first carrier of the received VSB-AM wave including said low-band components, said low-band component demodulation means demodulates said VSB-AM wave, and said high-band component demodulation means demodulates the received SSB signal including said high-band components.

39. A receiving apparatus as claimed in claim 37, wherein said carrier regeneration means reproduces a first carrier of the received VSB-AM wave including said low-band components, and a second carrier of the received SSB signal including said high-band components, said low-band component demodulation means demodulates said VSB-AM wave by using said first carrier regenerated, and said high-band component demodulation means demodulates said SSB signal by using said second carrier regenerated.

40. A receiving apparatus as claimed in claim 37, wherein said carrier regeneration means reproduces a first carrier of the received VSB-AM wave including said low-band components and a pilot signal having a frequency predetermined corresponding to the difference of frequencies of said first carrier and a second carrier of the received television signal thereby to form said first and second carriers, said low-band component demodulation means demodulates said VSB-AM wave by using said first carrier regenerated, and said high-band component demodulation means demodulates said SSB signal by using said second carrier regenerated.

41. A receiving apparatus as claimed in claim 36, wherein said low-band component demodulation means demodulates said low-band components using a digital demodulation, and said high-band component demodulation means demodulates said high-band components using a quadrature demodulation.

42. A receiving apparatus as claimed in claim 41, wherein the demodulated signal of said quadrature modulation wave is further frequency converted to reproduce said high-band components.

43. A broad bandwidth television signal transmission system having an encoder for converting a second television signal into a third television signal at a transmitting end, and a decoder for decoding the second television signal from the third television signal encoded by said encoder at a receiving end, said second television signal being a broad bandwidth television signal having a greater number of horizontal scanning lines and a broader frequency bandwidth than those of a first television signal, said third television signal being a narrow bandwidth multiple sub-sampled time division multiplexed television signal the bandwidth of which is substantially equal to that of the first television signal, said encoder comprising:

multiple sub-sampling encoding means for converting, with bandwidth compression, a fourth television signal into a fifth television signal by using the multiple sub-sampling time multiplexing technique, said fourth television signal having a greater number of horizontal scanning lines and a broader frequency bandwidth than those of said second television signal, said fifth television signal having a broader bandwidth than that of said first television signal and a narrower bandwidth than that of said fourth television signal;

first converting means for converting said second television signal inputted to said first converting means into a sixth television signal having a signal format conforming to that of said fourth television signal, and for supplying the converted signal to said multiple sub-sampling encoding means;

second converting means for converting said fifth television signal outputted from said multiple sub-sampling encoding means into said third television signal;

delay means having at least one of a plurality of delay times corresponding to a plurality of frequency bands specified in a signal transmission band; and weighting-synthesizing means for weighting and synthesizing an input signal to said delay means and a delayed signal produced from said delay means to produce a weighted-synthesized signal;

whereby the transmission characteristics for a plurality of said frequency bands in said signal transmission band are compensated;

and said decoder comprising:

multiple sub-sampling decoding means for decoding said sixth television signal from said fifth television signal which is bandwidth compressed by using said multiple sub-sampling time division multiplexing technique;

third converting means for converting said third television signal inputted thereto into said fifth television signal, and for supplying the converted signal to said multiple sub-sampling decoding means; and fourth converting means for converting said sixth television signal outputted from said multiple sub-sampling decoding means into said second television signal;

wherein said sixth television signal has a format conforming to that of the input of a standard MUSE encoder;

said system further comprising on the transmitter side:

transmitting means for modulating a carrier signal by said third television signal from said encoder and for transmitting the modulated carrier signal; and said system further comprising on the receiver side:

receiving means receiving the transmitted modulated carrier signal and for demodulating the third television signal therefrom.

44. A broad bandwidth television signal transmission system as claimed in claim 43, wherein said modulated carrier signal is transmitted through a cable transmission system.

45. A broad bandwidth television signal transmission system as claimed in claim 43, wherein said modulated carrier signal is transmitted through a wireless transmission system.

46. A broad bandwidth television signal transmission system as claimed in claim 43 further comprising:

means for combining an audio signal relating to said second television signal in combination with said third television signal, so that said carrier signal is modulated by the combined signal; and means for extracting the audio signal; and means for extracting the audio signal from the received modulated carrier signal.

47. A broad bandwidth television signal recording-/reproducing system having an encoder for converting a second television signal into a third television signal at a transmitting end, and a decoder for decoding the second television signal from the third television signal encoded by said encoder at a receiving end, said second television signal being a broad bandwidth television signal having a greater number of horizontal scanning lines and a broader frequency bandwidth than those of a first television signal, said third television signal being a narrow bandwidth multiple sub-sampled time division multiplexed television signal, the bandwidth of which is substantially equal to that of the first television signal, said encoder comprising:

multiple sub-sampling encoding means for converting, with bandwidth compression, a fourth television signal into a fifth television signal by using the multiple sub-sampling time division multiplexing technique, said fourth television signal having a greater number of horizontal scanning lines and a broader frequency bandwidth than those of said second television signal, said fifth television signal having a broader bandwidth than that of said first television signal and a narrower bandwidth than that of said fourth television signal;

first converting means for converting said second television signal inputted to said first converting means into a sixth television signal having a signal format conforming to that of said fourth television signal, and for supplying the converted signal to said multiple sub-sampling encoding means;

second converting means for converting said fifth television signal outputted from said multiple sub-sampling encoding means into said third television signal;

delay means having at least one of a plurality of delay times corresponding to a plurality of frequency bands specified into a signal transmission band; and weighting-synthesizing means for weighting and synthesizing an input signal to said delay means and a delayed signal produced from said delay means to produce a weighted-synthesized signal;

whereby the transmission characteristics for a plurality of said frequency bands in said signal transmission band are compensated; and said decoder comprising:

multiple sub-sampling decoding means for decoding said sixth television signal from said fifth television signal which is bandwidth compressed by using said multiple sub-sampling time division multiplexing technique;

third converting means for converting said third television signal inputted thereto into said fifth television signal, and for supplying the converted signal to said multiple sub-sampling decoding means;

fourth converting means for converting said sixth television signal outputted from said multiple sub-sampling decoding means into said second television signal;

delay means having at least one of a plurality of delay times corresponding to a plurality of frequency bands specified in a signal transmission band; and weighting-synthesizing means for weighting and synthesizing an output signal of said delay means and an input signal to said weighting-synthesizing means for form a weighted-synthesized signal, which is fed to said delay means, and which is produced as the output signal of said transmission characteristic compensation portion;

whereby the transmission characteristics for a plurality of said frequency bands in said signal transmission band are compensated;

said system further comprising on the recording side:

recording means for recording said third television signal from said encoder to a recording medium; and said system further comprising on the reproducing side:

reproducing means for reproducing the third television signal from said recording medium.

48. A broad bandwidth television signal recording-/reproducing system as claimed in claim 47, wherein said recording medium is a magnetic disc.

49. A broad bandwidth television signal recording-/reproducing system as claimed in claim 47, wherein said recording medium is an optical disc.

50. A broad bandwidth television signal recording-/reproducing system as claimed in claim 47, wherein said recording medium is a magnetic tape.

51. A broad bandwidth television signal recording-/reproducing system as claimed in claim 47, further comprising:

means for recording said audio signal on said recording medium; and means for reproducing the recorded audio signal from said recording medium.

52. A television system having a transmitting apparatus having an encoder for converting a second television signal into a third television signal, a transmitting side transmission characteristic compensation portion, and a transmitting portion for transmitting said third television signal thereby to improve the same channel interference characteristics with a first television signal broadcasting, said second television signal being a broad bandwidth television signal having greater number of horizontal scanning lines and broader frequency bandwidth than those of a first television signal, said third television signal being a narrow bandwidth multiple sub-sampled time division multiplexed television signal the bandwidth of which is substantially equal to that of the first television signal, said encoder comprising:
- multiple sub-sampling encoding means for converting, with bandwidth compression, a fourth television signal into a fifth television signal by using the multiple sub-sampling time division multiplexing technique, said fourth television signal having a greater number of horizontal scanning lines and broader frequency bandwidth than those of said second television signal, said fifth television signal having broader bandwidth than that of said first television signal and narrower bandwidth than that of said fourth television signal;
- first converting means for converting said second television signal inputted to said first converting means into a sixth television signal having a signal format conforming to that of said fourth television signal, and for supplying the converted signal to said multiple sub-sampling encoding means; and
- second converting means for converting said fifth television signal outputted from said multiple sub-sampling encoding means into said third television signal, said transmitting side transmission characteristic compensation portion comprising:
- delay means having at least one of a plurality of delay times corresponding to a plurality of frequency bands specified in a signal transmission band; and
- weighting-synthesizing means for weighting and synthesizing an input signal to said delay means and a delayed signal produced from said delay means to produce a weighted-synthesized signal;
- whereby the transmission characteristics for a plurality of said frequency bands in said signal transmission band is compensated, and said transmitting portion comprising:
- separating means for separating said third television signal into low-band components and high-band components;
- low-band component modulation and allocation means for assigning the lower sideband region of the frequency spectrum of the modulated transmission wave of said first television signal as the frequency band of the modulated transmission wave of said low-band components, said lower sideband region excluding the neighboring region of the video carrier of said first television signal;
- high-band component modulation and allocation means for assigning the upper sideband region of the frequency spectrum of the modulated transmission wave of said first television signal as the frequency band of the modulated transmission wave of said high-band components, said upper sideband region excluding the neighboring region of the video carrier of said first television signal; and
- synthesizing means for synthesizing the output of said low-band component modulation and allocation means, and the output of said high-band component modulation and allocation means, said television system further comprising a receiving apparatus having a decoder for decoding said second television signal from said third television signal encoded by said encoder, a receiving side transmission characteristic compensation portion, and a receiving portion for receiving said third television signal, said decoder comprising:
- multiple sub-sampling decoding means for decoding said sixth television signal from said fifth television signal which is bandwidth compressed by using said multiple sub-sampling time division multiplexing technique;
- third converting means for converting said third television signal inputted thereto into said fifth television signal, and for supplying the converted signal to said multiple sub-sampling decoding means; and
- fourth converting means for converting said sixth television signal outputted from said multiple sub-sampling decoding means into said second television signal, said transmission characteristic compensation portion comprising:
- delay means having at least one of a plurality of delay times corresponding to a plurality of frequency bands specified in a signal transmission band; and
- weighting-synthesizing means for weighting and synthesizing an input signal to said delay means and a delayed signal produced from said delay means to produce a weighted-synthesized signal;
- whereby the transmission characteristics for a plurality of said frequency bands in said signal transmission band is compensated, and said receiving portion comprising:
- low-band component demodulation means for extracting the frequency band of the modulated transmission wave of said low-band components of said third television signal, and for demodulating said low-band components of said third television signal;
- high-band component demodulation means for extracting the frequency band of the modulated transmission wave of said high-band components of said third television signal, and for demodulating said high-band components of said third television signal; and
- synthesizing means for synthesizing the output of said low-band component demodulation means and the output of said high-band component demodulation means, thereby to form said third television signal.

53. A television system as claimed in claim 52, wherein said modulated carrier signal is transmitted through a cable transmission system.

54. A television system as claimed in claim 52, wherein said modulated carrier signal is transmitted through a wireless transmission system.

55. A television system as claimed in claim 52, further comprising:
- means for combining an audio signal relating to said second television signal in combination with said third television signal, so that said carrier signal is modulated by the combined signal; and
- means for extracting the audio signal; and
- means for extracting the audio signal from the received modulated carrier signal.

* * * * *

UNITED STATES PATENT AND TRADEMARK OFFICE
CERTIFICATE OF CORRECTION

PATENT NO. : 5,063,445

DATED : November 5, 1991

INVENTOR(S) : Taiji Nishizawa et al

It is certified that error appears in the above-identified patent and that said Letters Patent is hereby corrected as shown below:

Col. 2, line 68 "3.74" should be --43.74--.

Col. 7, line 65 "signal" should be --signal.--.

Col. 8, line 57 after "adjusting" insert --the signal to-- and delete "the signal to" which appears after "for".

Col. 9, line 28 "80" should be --480--.

Col. 10, line 47 "B" should be --12B--.

Col. 10, line 49 "15" should be --1215--.

Col. 12, line 7 (equation 3) "$\pi$" should be --$\prod$--.

Col. 12, line 23 "$H^{31}$" should be --$H^{-1}$--.

Col. 12, line 26 (equation 4) "$\pi$" should be --$\prod$--.

Col. 12, lines 40-60 "$\pi$" should be --$\prod$-- (6 occurences).

Col. 12, line 63 (equation 5) "$\pi$" should be --$\prod$--.

Col. 13, line 5 (equation 6) "$\pi$" should be --$\prod$--.

Col. 13, line 10 (equation 7) "$\pi$" should be --$\prod$--.

UNITED STATES PATENT AND TRADEMARK OFFICE
CERTIFICATE OF CORRECTION

PATENT NO. : 5,063,445

DATED : November 5, 1991

INVENTOR(S) : Taiji Nishizawa et al

It is certified that error appears in the above-identified patent and that said Letters Patent is hereby corrected as shown below:

Col. 13, line 33 (equation 8) "$\pi$" should be --$\Pi$--.

Col. 13, line 57 "$\pi$" should be --$\Pi$--.

Col. 13, line 64 (equation 11) "$\pi$" should be --$\Pi$--.

Col. 14, line 2 (equation 12) "$\pi$" should be --$\Pi$--.

Col. 14, line 17 (equation 13) "$\pi$" should be --$\Pi$--.

Col. 17, line 28 "$Z^{-1}$" should be --$Z^{-1}$:--.

Col. 19, line 68 delete "the" and "NTSC" should be --the NTSC--.

Col. 21, line 6 "uses" should be --use--.

Col. 22, line 9 after "are" insert --thus--.

Col. 22, line 58 "order" should be --adder--.

Col. 23, line 63 "components. Amplitude" should be --components, amplitude--.

Col. 24, line 14 "$f_{178}$" should be --$f_{1/2}$--.

Col. 24, line 28 "$f_{178}$" should be --$f_{1/2}$--.

UNITED STATES PATENT AND TRADEMARK OFFICE
CERTIFICATE OF CORRECTION

PATENT NO. : 5,063,445
DATED : November 5, 1991
INVENTOR(S) : Taiji Nishizawa et al It is certified that error appears in the above-identified patent and that said Letters Patent is hereby corrected as shown below:

Col. 25, line 32 "212" should be --3212--.

Col. 29, line 68 (claim 10) "1fp" should be --1/fp--.

Col. 30, line 10 (claim 11) "means" (first occurence) should be --means,--.

Col. 30, line 57 (claim 15) "having" should be --having:--.

Col. 31, line 40 (claim 21) "9" should be --15--.

Col. 37, line 64 (claim 47) "into" should be --in--.

Signed and Sealed this

Second Day of March, 1993

Attest:

STEPHEN G. KUNIN

Attesting Officer

Acting Commissioner of Patents and Trademarks